(12) United States Patent
Hori

(10) Patent No.: US 12,515,972 B2
(45) Date of Patent: Jan. 6, 2026

(54) MICROORGANISM HAVING HIGH ABILITY TO DEGRADE OIL AT LOW TEMPERATURE

(71) Applicant: National University Corporation Tokai National Higher Education and Research System, Nagoya (JP)

(72) Inventor: Katsutoshi Hori, Nagoya (JP)

(73) Assignee: National University Corporation Tokai National Higher Education and Research System, Aichi (JP)

( * ) Notice: Subject to any disclaimer, the term of this patent is extended or adjusted under 35 U.S.C. 154(b) by 745 days.

(21) Appl. No.: 17/640,296

(22) PCT Filed: Sep. 7, 2020

(86) PCT No.: PCT/JP2020/033836
§ 371 (c)(1),
(2) Date: Mar. 3, 2022

(87) PCT Pub. No.: WO2021/045235
PCT Pub. Date: Mar. 11, 2021

(65) Prior Publication Data
US 2022/0371930 A1 Nov. 24, 2022

(30) Foreign Application Priority Data

Sep. 6, 2019 (JP) .................. 2019-163252
Jan. 8, 2020 (JP) .................. 2020-001744

(51) Int. Cl.
| | | |
|---|---|---|
| C02F 3/34 | (2023.01) | |
| C02F 101/32 | (2006.01) | |
| C02F 103/32 | (2006.01) | |
| C12N 1/16 | (2006.01) | |
| C12N 1/20 | (2006.01) | |
| C12R 1/645 | (2006.01) | |

(52) U.S. Cl.
CPC .............. *C02F 3/347* (2013.01); *C02F 3/343* (2013.01); *C12N 1/165* (2021.05); *C12N 1/20* (2013.01); *C02F 2101/32* (2013.01); *C02F 2103/32* (2013.01); *C12R 2001/645* (2021.05)

(58) Field of Classification Search
CPC ...... C02F 3/347; C02F 3/343; C02F 2101/32; C02F 2103/32; C12N 1/165; C12N 1/20; C12N 1/205; C12N 1/16; C12R 2001/645; C12R 2001/01
See application file for complete search history.

(56) References Cited

U.S. PATENT DOCUMENTS 10,065,877 B2 * 9/2018 Hori .................. C02F 3/341

FOREIGN PATENT DOCUMENTS

| EP | 2816015 A1 | 12/2014 |
|---|---|---|
| EP | 3 712 247 A1 | 9/2020 |
| EP | 3 819 371 A1 | 5/2021 |
| JP | 2006-42774 A | 2/2006 |
| JP | 2015-192611 A | 11/2015 |
| WO | 2019/098255 A1 | 5/2019 |
| WO | 2020/009232 A1 | 1/2020 |

OTHER PUBLICATIONS

Kita et al., "Kitchen Wastewater Treatment System using Microorganisms Active in Oil Degradation," *Hitachi Chemical technical report* No. 46, pp. 49-54, 2006, 27 pages (w/English translation).
Oswal et al., "Palm oil mill effluent treatment by a tropical marine yeast," *Bioresource Technology* 85:35-37, Mar. 2002.
Parfene et al., "Lipolytic activity of lipases from different strains of *Yarrowia lipolytica* in hydrolysed vegetable fats at low temperature and water activity," *Romanian Biotechnological Letters* 16(6):46-52, Nov. 2011.
Yadav et al., "Differential induction, purification and characterization of cold active lipase from *Yarrowia lipolytica* NCIM 3639," *Bioresource Technology* 102:10663-10670, Sep. 2011.
Fickers et al., "The lipases from *Yarrowia lipolytica*: Genetics, production, regulation, biochemical characterization and biotechnological applications," *Biotechnology Advances* 29(6):632-644, Nov.-Dec. 2011 [Published online Apr. 28, 2011]. (13 pages).
Alpha/beta hydrolase protein [Yarrowia lipolytica], Database GenBank [online], RDW24695, 2018, https://www.ncbi.nlm.nih.gov/protein/RDW24695.1.
Putative lipase ATG15 [Yarrowia lipolytica], Database GenBank [online], RDW24490, 2018, https://www.ncbi.nlm.nih.gov/protein/RDW24490.1.
Second Office Action for corresponding Japanese Application No. 2021-544077 mailed Feb. 3, 2025 and its English Machine Translation.

* cited by examiner

*Primary Examiner* — Kade Ariani
(74) *Attorney, Agent, or Firm* — Renner, Otto, Boisselle & Sklar, LLP

(57) ABSTRACT

In an aspect, the present disclosure provides a novel microorganism having an ester degrading ability. In an aspect, the present disclosure provides a combination of novel microorganisms having an oil degrading ability. In an embodiment, the microorganism of the present invention includes a yeast belonging to the genus *Yarrowia*. In an embodiment, the microorganism of the present invention includes *Yarrowia lipolytica*. In an embodiment, the present disclosure provides a combination of a *Burkholderia* bacterium with a *Yarrowia* yeast. In an embodiment, provided is an oil degrading agent that comprises the microorganism of the present disclosure.

11 Claims, 27 Drawing Sheets

Specification includes a Sequence Listing.

(B)

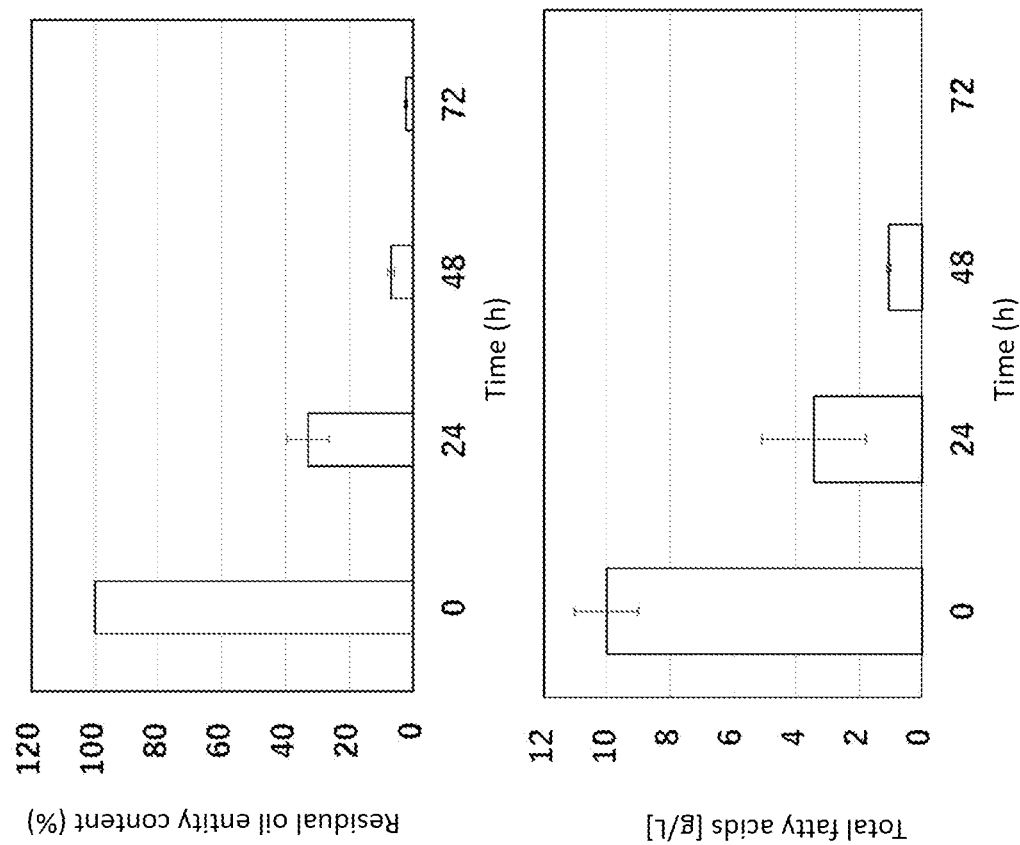
FIG. 10A KH-2AL1 15°C

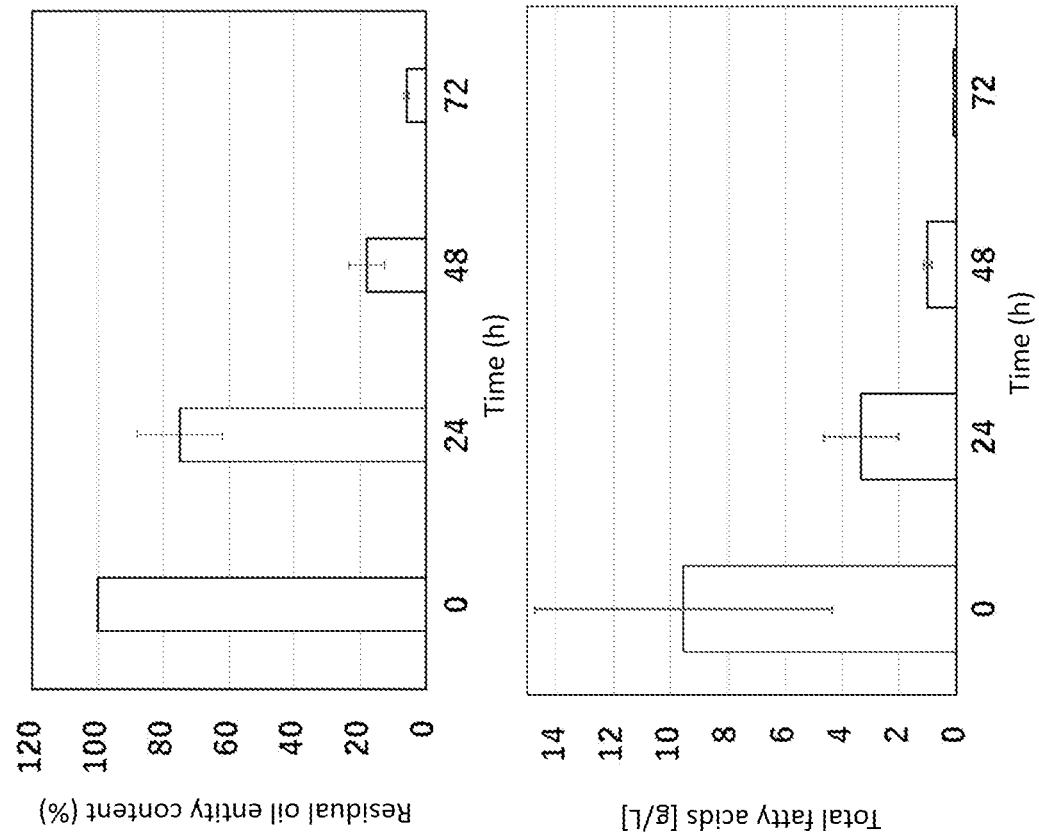
FIG 11A KH-2AL3 15°C

```
                         SEQUENCE LISTING

<160> NUMBER OF SEQ ID NOS: 8

<210> SEQ ID NO 1
<211> LENGTH: 963
<212> TYPE: DNA
<213> ORGANISM: Burkholderia arboris

<400> SEQUENCE: 1
gccgacaact acgcggcgac gcgttatccg atcatcctcg tgcacgggct caccggcacc      60
gacaagtacg ccggcgtgct cgagtactgg tacggcatcc aggaggatct gcagcagcat     120
ggcgcgaccg tctacgtcgc gaacctgtcg ggcttccaga gcgacgatgg cccgaacggg     180
cgcggcgaac agctgctcgc ctacgtgaag acggtactcg ccgcgacggg cgcgaccaag     240
gtcaatctcg tcggccacag ccagggcggg ctgacgtcgc gctatgtcgc ggccgtcgcg     300
cccgatctcg tcgcgtcggt gacgacgatc ggcacgccgc atcgcggctc cgagttcgcg     360
gatttcgtgc agagcgtgct cgcgtacgat ccgaccgggc tgtcgtcgac ggtgatcgcg     420
gcgttcgtca atgtgttcgg aatcctgacg agcagcagcc acaacacgaa ccaggatgcg     480
cttgcatcgc tgaagacgct gacgaccgct caggcggcga cctataacca gaactatccg     540
agcgcgggcc ttggtgcacc gggcagctgc cagaccggcg caccgacgga aacggtcggc     600
ggcaacacgc atctgctgta ttcgtgggcc ggcacggcga tccagccgac gctttcgctg     660
ttcggcgtga cgggtgcgaa ggacacgagc acgattccgc tcgtcgatcc cgcaaacgcg     720
ctcgacccgt cgacgctcgc gctgttcggc accggcacgg tgatgatcaa ccgtggctcg     780
ggtcagaacg acgggctcgt gtcgaagtgc agcgcgctgt acggcaaggt gctgagcacg     840
agctacaagt ggaaccacat cgacgagatc aaccagctgc tcggcgtgcg cggcgcgtat     900
```
gcggaagatc cggtcgcggt gatccgcacg catgcgaacc ggctgcagct cgcgggcgtg    960
taa                                                                  963

<210> SEQ ID NO 2
<211> LENGTH: 320
<212> TYPE: PRT
<213> ORGANISM: Burkholderia arboris

<400> SEQUENCE: 2

Ala Asp Asn Tyr Ala Ala Thr Arg Tyr Pro Ile Ile Leu Val His Gly
1               5                   10                  15

Leu Thr Gly Thr Asp Lys Tyr Ala Gly Val Leu Glu Tyr Trp Tyr Gly
            20                  25                  30

Ile Gln Glu Asp Leu Gln Gln His Gly Ala Thr Val Tyr Val Ala Asn
        35                  40                  45

Leu Ser Gly Phe Gln Ser Asp Asp Gly Pro Asn Gly Arg Gly Glu Gln
    50                  55                  60

Leu Leu Ala Tyr Val Lys Thr Val Leu Ala Ala Thr Gly Ala Thr Lys
65                  70                  75                  80

Val Asn Leu Val Gly His Ser Gln Gly Gly Leu Thr Ser Arg Tyr Val
                85                  90                  95

Ala Ala Val Ala Pro Asp Leu Val Ala Ser Val Thr Thr Ile Gly Thr
            100                 105                 110

Pro His Arg Gly Ser Glu Phe Ala Asp Phe Val Gln Ser Val Leu Ala
        115                 120                 125

Tyr Asp Pro Thr Gly Leu Ser Ser Thr Val Ile Ala Ala Phe Val Asn
    130                 135                 140

Val Phe Gly Ile Leu Thr Ser Ser Ser His Asn Thr Asn Gln Asp Ala
145                 150                 155                 160

Leu Ala Ser Leu Lys Thr Leu Thr Thr Ala Gln Ala Ala Thr Tyr Asn
                165                 170                 175

Gln Asn Tyr Pro Ser Ala Gly Leu Gly Ala Pro Gly Ser Cys Gln Thr
            180                 185                 190

Gly Ala Pro Thr Glu Thr Val Gly Gly Asn Thr His Leu Leu Tyr Ser
        195                 200                 205

Trp Ala Gly Thr Ala Ile Gln Pro Thr Leu Ser Leu Phe Gly Val Thr
    210                 215                 220

Gly Ala Lys Asp Thr Ser Thr Ile Pro Leu Val Asp Pro Ala Asn Ala
225                 230                 235                 240

Leu Asp Pro Ser Thr Leu Ala Leu Phe Gly Thr Gly Thr Val Met Ile
                245                 250                 255

Asn Arg Gly Ser Gly Gln Asn Asp Gly Leu Val Ser Lys Cys Ser Ala
            260                 265                 270

Leu Tyr Gly Lys Val Leu Ser Thr Ser Tyr Lys Trp Asn His Ile Asp
        275                 280                 285

Glu Ile Asn Gln Leu Leu Gly Val Arg Gly Ala Tyr Ala Glu Asp Pro
    290                 295                 300

Val Ala Val Ile Arg Thr His Ala Asn Arg Leu Gln Leu Ala Gly Val
305                 310                 315                 320

<210> SEQ ID NO 3
<211> LENGTH: 1149
<212> TYPE: DNA
<213> ORGANISM: Burkholderia arboris

<400> SEQUENCE: 3

```
aatgtcacct atcacgtcgc aggcatcccg accgccgtca ccgctcagca gttgctgtat     60
cgcaccaaca acgcgcagaa ccagcctgtc gtcaacgtga cgtcggtgat ccgcagccag    120
gtcagcaacg gccaggccat ttcgtaccag tcggcctacg attcgctgaa cccgtacgac    180
gagccgtcgc aggtgattgc cggcgaccgc gacgtgacca aggtcatcaa cgtcggcacg    240
ctgctctaca gtgcggagtc gatcccgctg tcgacgctgc tgctgctcgg ctacaacatc    300
atcgtgcccg atacggaagg ccagacggcg gacttcgcgg ccggccccga atacgggatg    360
acgacgctcg attcgatccg cgcggcgctt aatacgccgt cgacgggcct gaatccgtcg    420
agcaaggtcg cgatgatcgg ctattcgggc ggcgcaatcg cgacgaactg ggccgcgcag    480
ctcgcgccaa gttatgcgcc cgacatcaac aagcagctcg tcggcgcggc ggaaggcggc    540
gtgctggtcg atcccgcgca caacctgcgc tatgtcgacg gcagcatcgt gtggggcggc    600
gttgcggcgg ccgcgctggc cgggctgtcg cgcggctatg cgttcgacct gacgccgtat    660
ctcagcgata cgggcgtcgc cgtgttcaag gacatccaga accagtcgct tgcgtacatc    720
ctgccgaagt acacgggcct gcactggagc acgctgttca agccgcaata cgcgaacgac    780
atcaacagca tcccggcgta cgtgacgtat gcgaacaagg tgaacgcggg gctggccgca    840
tcgccgacga tcccgatgtt catcggccag ggcacggcag gcgcgctcga cggtaccttc    900
agcagccagg taggcgacgg cgtgatgctc gcgtacgacg tgcgcgccct ggcgcagaag    960
ttctgcgcca gcggcacgcc ggtcacgtac accgagtatc cgctggaaca tgcgggcgcg   1020
atcgtgccgt gggtggccgg gatgctgccc tggctctacg accgcttcaa cgggaaaacc   1080
gcgccgagca attgctggct gacgtcgctg ctgccgagca attcgctggc gcccgagacg   1140
ctgcactag                                                           1149
```

<210> SEQ ID NO 4
<211> LENGTH: 382
<212> TYPE: PRT
<213> ORGANISM: Burkholderia arboris

<400> SEQUENCE: 4

```
Asn Val Thr Tyr His Val Ala Gly Ile Pro Thr Ala Val Thr Ala Gln
1               5                   10                  15

Gln Leu Leu Tyr Arg Thr Asn Asn Ala Gln Asn Gln Pro Val Val Asn
            20                  25                  30

Val Thr Ser Val Ile Arg Ser Gln Val Ser Asn Gly Gln Ala Ile Ser
        35                  40                  45

Tyr Gln Ser Ala Tyr Asp Ser Leu Asn Pro Tyr Asp Glu Pro Ser Gln
    50                  55                  60

Val Ile Ala Gly Asp Arg Asp Val Thr Lys Val Ile Asn Val Gly Thr
65                  70                  75                  80

Leu Leu Tyr Ser Ala Glu Ser Ile Pro Leu Ser Thr Leu Leu Leu Leu
                85                  90                  95

Gly Tyr Asn Ile Ile Val Pro Asp Thr Glu Gly Gln Thr Ala Asp Phe
            100                 105                 110

Ala Ala Gly Pro Glu Tyr Gly Met Thr Thr Leu Asp Ser Ile Arg Ala
        115                 120                 125

Ala Leu Asn Thr Pro Ser Thr Gly Leu Asn Pro Ser Ser Lys Val Ala
    130                 135                 140

Met Ile Gly Tyr Ser Gly Gly Ala Ile Ala Thr Asn Trp Ala Ala Gln
145                 150                 155                 160
```

```
Leu Ala Pro Ser Tyr Ala Pro Asp Ile Asn Lys Gln Leu Val Gly Ala
                165                 170                 175

Ala Glu Gly Gly Val Leu Val Asp Pro Ala His Asn Leu Arg Tyr Val
            180                 185                 190

Asp Gly Ser Ile Val Trp Gly Val Ala Ala Ala Leu Ala Gly
        195                 200                 205

Leu Ser Arg Gly Tyr Ala Phe Asp Leu Thr Pro Tyr Leu Ser Asp Thr
        210                 215                 220

Gly Val Ala Val Phe Lys Asp Ile Gln Asn Gln Ser Leu Ala Tyr Ile
225                 230                 235                 240

Leu Pro Lys Tyr Thr Gly Leu His Trp Ser Thr Leu Phe Lys Pro Gln
                245                 250                 255

Tyr Ala Asn Asp Ile Asn Ser Ile Pro Ala Tyr Val Thr Tyr Ala Asn
            260                 265                 270

Lys Val Asn Ala Gly Leu Ala Ala Ser Pro Thr Ile Pro Met Phe Ile
        275                 280                 285

Gly Gln Gly Thr Ala Gly Ala Leu Asp Gly Thr Phe Ser Ser Gln Val
290                 295                 300

Gly Asp Gly Val Met Leu Ala Tyr Asp Val Arg Ala Leu Ala Gln Lys
305                 310                 315                 320

Phe Cys Ala Ser Gly Thr Pro Val Thr Tyr Thr Glu Tyr Pro Leu Glu
                325                 330                 335

His Ala Gly Ala Ile Val Pro Trp Val Ala Gly Met Leu Pro Trp Leu
            340                 345                 350

Tyr Asp Arg Phe Asn Gly Lys Thr Ala Pro Ser Asn Cys Trp Leu Thr
        355                 360                 365

Ser Leu Leu Pro Ser Asn Ser Leu Ala Pro Glu Thr Leu His
        370                 375                 380

<210> SEQ ID NO 5
<211> LENGTH: 1317
<212> TYPE: DNA
<213> ORGANISM: Yarrowia lipolytica
<220> FEATURE:
<221> NAME/KEY: CDS
<222> LOCATION: (1)..(1317)

<400> SEQUENCE: 5 gcc cct ccc ccg gcc ttc ctg gct gga aac ctc gaa gtc tac tct tcg    48
Ala Pro Pro Pro Ala Phe Leu Ala Gly Asn Leu Glu Val Tyr Ser Ser
1               5                   10                  15 ccc ccc aaa aga ggc tcc aag cga agt gtg tcc tcc aaa ctg atc acc    96
Pro Pro Lys Arg Gly Ser Lys Arg Ser Val Ser Ser Lys Leu Ile Thr
            20                  25                  30 cga ccc gtt gtc tac ctt cac cat ggt ctg ctg atg aac tcg gag gtc   144
Arg Pro Val Val Tyr Leu His His Gly Leu Leu Met Asn Ser Glu Val
        35                  40                  45 tgg gtt gtg aac acg gac gcc aaa aag tcg att gct ttt gct ctg gcc   192
Trp Val Val Asn Thr Asp Ala Lys Lys Ser Ile Ala Phe Ala Leu Ala
    50                  55                  60 gac ctg gga ttt gac gtc tgg ctc gga aac aac aga ggc aac aag tac   240
Asp Leu Gly Phe Asp Val Trp Leu Gly Asn Asn Arg Gly Asn Lys Tyr
65                  70                  75                  80 tcg cga aaa cac atg aaa tac aac ccc gag tcg cgc gag ttc tgg gat   288
Ser Arg Lys His Met Lys Tyr Asn Pro Glu Ser Arg Glu Phe Trp Asp
                85                  90                  95 ttc tgt ctc gac gac ttt gcg ctg ttt gat atc ccc gat tcc att gac   336
Phe Cys Leu Asp Asp Phe Ala Leu Phe Asp Ile Pro Asp Ser Ile Asp
```

```
                Phe Cys Leu Asp Asp Phe Ala Leu Phe Asp Ile Pro Asp Ser Ile Asp
                                100                 105                 110 tat att ctg tct gtg acc aaa cag aag tct ctg tct tac att gga ttc        384
Tyr Ile Leu Ser Val Thr Lys Gln Lys Ser Leu Ser Tyr Ile Gly Phe
            115                 120                 125 tcc cag ggt tca gcc cag gca ttt gca tct ctg gct atc cga cct cct        432
Ser Gln Gly Ser Ala Gln Ala Phe Ala Ser Leu Ala Ile Arg Pro Pro
130                 135                 140 ctc aac gat aag gtc aac cta ttc att gcc gtt gcc ccc gcc atg tct        480
Leu Asn Asp Lys Val Asn Leu Phe Ile Ala Val Ala Pro Ala Met Ser
145                 150                 155                 160 cct cct ggc ctg aga tcc aag att gtc aac tcc ctc atg aga gct tct        528
Pro Pro Gly Leu Arg Ser Lys Ile Val Asn Ser Leu Met Arg Ala Ser
                165                 170                 175 cca cag ctg ctg ttc ctc tgc ttt ggt cga aga gct atc ttg tca tcc        576
Pro Gln Leu Leu Phe Leu Cys Phe Gly Arg Arg Ala Ile Leu Ser Ser
            180                 185                 190 tct ccc ttc tgg gag tcg gtt ctg gac gca aaa ctg tat gct cga atc        624
Ser Pro Phe Trp Glu Ser Val Leu Asp Ala Lys Leu Tyr Ala Arg Ile
        195                 200                 205 atc gat gct gcc tgc aga atg ctg ttt gac tgg tac gga gag aac atc        672
Ile Asp Ala Ala Cys Arg Met Leu Phe Asp Trp Tyr Gly Glu Asn Ile
210                 215                 220 acc tgg ccc cag aag att gca gcc tac cac cac ctg tac tcg tac acc        720
Thr Trp Pro Gln Lys Ile Ala Ala Tyr His His Leu Tyr Ser Tyr Thr
225                 230                 235                 240 tct gtc aag tcc gtc gtg cat tgg ttc cag atc atc cga gca gcc tcc        768
Ser Val Lys Ser Val Val His Trp Phe Gln Ile Ile Arg Ala Ala Ser
                245                 250                 255 ttc cac atg ttt gag gat gtc atc aac tct ccc ctg gac cct cat ctg        816
Phe His Met Phe Glu Asp Val Ile Asn Ser Pro Leu Asp Pro His Leu
            260                 265                 270 tgc aag tac tcc act gtc acc cga tac ccc acc gag aac att cgg aca        864
Cys Lys Tyr Ser Thr Val Thr Arg Tyr Pro Thr Glu Asn Ile Arg Thr
        275                 280                 285 ccc att gct ctg atc tac ggc aag acc gac tcg ctg gtg gac att gac        912
Pro Ile Ala Leu Ile Tyr Gly Lys Thr Asp Ser Leu Val Asp Ile Asp
290                 295                 300 cag atg ctg tct act cta ccc tca tcc act att gca ttt gga gtc ccc        960
Gln Met Leu Ser Thr Leu Pro Ser Ser Thr Ile Ala Phe Gly Val Pro
305                 310                 315                 320 aaa cat gag cat ctc gat ctt ctg tgg gga gac gaa gcc gac act ctg       1008
Lys His Glu His Leu Asp Leu Leu Trp Gly Asp Glu Ala Asp Thr Leu
                325                 330                 335 gtt atc ccc aag att gtc gct ctg ctc gat tat tac aca cct gtg ccc       1056
Val Ile Pro Lys Ile Val Ala Leu Leu Asp Tyr Tyr Thr Pro Val Pro
            340                 345                 350 aga agt aac aag agc agc agt gac cat atc agc gag cgt cta ttt gag       1104
Arg Ser Asn Lys Ser Ser Ser Asp His Ile Ser Glu Arg Leu Phe Glu
        355                 360                 365 cct gct aac tcc aag gtc tcg ggt ctg gga ctc agc cag gac ctc aag       1152
Pro Ala Asn Ser Lys Val Ser Gly Leu Gly Leu Ser Gln Asp Leu Lys
370                 375                 380 tcg cca ttg tct ttg aaa aag aga tct ctc tcc aac tcc tca tcg atc       1200
Ser Pro Leu Ser Leu Lys Lys Arg Ser Leu Ser Asn Ser Ser Ser Ile
385                 390                 395                 400 cag gac tct cat aag gtc gga gga gac aca gac tcg gtt ctg agt ctc       1248
Gln Asp Ser His Lys Val Gly Gly Asp Thr Asp Ser Val Leu Ser Leu
                405                 410                 415
```

```
cga aac ctc act ccc aag ggg tac gct ctt gga agt gcc aag cca gtg      1296
Arg Asn Leu Thr Pro Lys Gly Tyr Ala Leu Gly Ser Ala Lys Pro Val
            420             425                 430 agt ggc act ctc aac cct tga                                          1317
Ser Gly Thr Leu Asn Pro
        435
```

<210> SEQ ID NO 6
<211> LENGTH: 438
<212> TYPE: PRT
<213> ORGANISM: Yarrowia lipolytica

<400> SEQUENCE: 6

```
Ala Pro Pro Pro Ala Phe Leu Ala Gly Asn Leu Glu Val Tyr Ser Ser
1               5                   10                  15

Pro Pro Lys Arg Gly Ser Lys Arg Ser Val Ser Ser Lys Leu Ile Thr
            20                  25                  30

Arg Pro Val Val Tyr Leu His His Gly Leu Leu Met Asn Ser Glu Val
        35                  40                  45

Trp Val Val Asn Thr Asp Ala Lys Lys Ser Ile Ala Phe Ala Leu Ala
    50                  55                  60

Asp Leu Gly Phe Asp Val Trp Leu Gly Asn Asn Arg Gly Asn Lys Tyr
65                  70                  75                  80

Ser Arg Lys His Met Lys Tyr Asn Pro Glu Ser Arg Glu Phe Trp Asp
                85                  90                  95

Phe Cys Leu Asp Asp Phe Ala Leu Phe Asp Ile Pro Asp Ser Ile Asp
            100                 105                 110

Tyr Ile Leu Ser Val Thr Lys Gln Lys Ser Leu Ser Tyr Ile Gly Phe
        115                 120                 125

Ser Gln Gly Ser Ala Gln Ala Phe Ala Ser Leu Ala Ile Arg Pro Pro
    130                 135                 140

Leu Asn Asp Lys Val Asn Leu Phe Ile Ala Val Ala Pro Ala Met Ser
145                 150                 155                 160

Pro Pro Gly Leu Arg Ser Lys Ile Val Asn Ser Leu Met Arg Ala Ser
                165                 170                 175

Pro Gln Leu Leu Phe Leu Cys Phe Gly Arg Arg Ala Ile Leu Ser Ser
            180                 185                 190

Ser Pro Phe Trp Glu Ser Val Leu Asp Ala Lys Leu Tyr Ala Arg Ile
        195                 200                 205

Ile Asp Ala Ala Cys Arg Met Leu Phe Asp Trp Tyr Gly Glu Asn Ile
    210                 215                 220

Thr Trp Pro Gln Lys Ile Ala Ala Tyr His His Leu Tyr Ser Tyr Thr
225                 230                 235                 240

Ser Val Lys Ser Val Val His Trp Phe Gln Ile Ile Arg Ala Ala Ser
                245                 250                 255

Phe His Met Phe Glu Asp Val Ile Asn Ser Pro Leu Asp Pro His Leu
            260                 265                 270

Cys Lys Tyr Ser Thr Val Thr Arg Tyr Pro Thr Glu Asn Ile Arg Thr
        275                 280                 285

Pro Ile Ala Leu Ile Tyr Gly Lys Thr Asp Ser Leu Val Asp Ile Asp
    290                 295                 300

Gln Met Leu Ser Thr Leu Pro Ser Ser Thr Ile Ala Phe Gly Val Pro
305                 310                 315                 320

Lys His Glu His Leu Asp Leu Leu Trp Gly Asp Glu Ala Asp Thr Leu
                325                 330                 335
```

```
Val Ile Pro Lys Ile Val Ala Leu Leu Asp Tyr Tyr Thr Pro Val Pro
            340                 345                 350

Arg Ser Asn Lys Ser Ser Ser Asp His Ile Ser Glu Arg Leu Phe Glu
        355                 360                 365

Pro Ala Asn Ser Lys Val Ser Gly Leu Gly Leu Ser Gln Asp Leu Lys
    370                 375                 380

Ser Pro Leu Ser Leu Lys Lys Arg Ser Leu Ser Asn Ser Ser Ser Ile
385                 390                 395                 400

Gln Asp Ser His Lys Val Gly Gly Asp Thr Asp Ser Val Leu Ser Leu
                405                 410                 415

Arg Asn Leu Thr Pro Lys Gly Tyr Ala Leu Gly Ser Ala Lys Pro Val
            420                 425                 430

Ser Gly Thr Leu Asn Pro
            435

<210> SEQ ID NO 7
<211> LENGTH: 1545
<212> TYPE: DNA
<213> ORGANISM: Yarrowia lipolytica
<220> FEATURE:
<221> NAME/KEY: CDS
<222> LOCATION: (1)..(1545)

<400> SEQUENCE: 7 ttg tac tcc cag ggt tac tca aac aca cat ggg gag aaa gat atg cct      48
Leu Tyr Ser Gln Gly Tyr Ser Asn Thr His Gly Glu Lys Asp Met Pro
1               5                   10                  15 agt gtc gtg ccc aat ctg gta ctc ccc gct aac ccc tca agt gac cac      96
Ser Val Val Pro Asn Leu Val Leu Pro Ala Asn Pro Ser Ser Asp His
            20                  25                  30 tca ttt gcg gta aaa cac atc tat cac cac aac acc gag gcc gac gcc     144
Ser Phe Ala Val Lys His Ile Tyr His His Asn Thr Glu Ala Asp Ala
        35                  40                  45 aac cac gga cgc atg gac gtg tct gga gag tgg gtt cgg gcc gcc cag     192
Asn His Gly Arg Met Asp Val Ser Gly Glu Trp Val Arg Ala Ala Gln
    50                  55                  60 aag gct cag cat ctc aac ctg ggc cag gac acc cac cgc tac atg gcc     240
Lys Ala Gln His Leu Asn Leu Gly Gln Asp Thr His Arg Tyr Met Ala
65                  70                  75                  80 tca aac gcc aga gac ccc tac acc aat ctg ccg ctc aag tcg cgg acc     288
Ser Asn Ala Arg Asp Pro Tyr Thr Asn Leu Pro Leu Lys Ser Arg Thr
                85                  90                  95 cag aag gtg aag cga tgg cgg cag cgc gac cca gat cac gtg gaa tct     336
Gln Lys Val Lys Arg Trp Arg Gln Arg Asp Pro Asp His Val Glu Ser
            100                 105                 110 tac ctc gaa gct gcg cgt ctc aac cct cag ctt tac ggc gcc atg gac     384
Tyr Leu Glu Ala Ala Arg Leu Asn Pro Gln Leu Tyr Gly Ala Met Asp
        115                 120                 125 ttt gac tgg gta gag gag gac att ctg gtg ccg gat gtc acc gac aga     432
Phe Asp Trp Val Glu Glu Asp Ile Leu Val Pro Asp Val Thr Asp Arg
    130                 135                 140 gat aca gtc gtg tcg ctg gcc gtc atg gcg tcc aac gcg tac gtt gac     480
Asp Thr Val Val Ser Leu Ala Val Met Ala Ser Asn Ala Tyr Val Asp
145                 150                 155                 160 gtg cca ttt aca ggt gac tgg acc aac gtg agt tgg aaa gaa act gga     528
Val Pro Phe Thr Gly Asp Trp Thr Asn Val Ser Trp Lys Glu Thr Gly
                165                 170                 175 ggc att ggc tgg cag agt gat gga gtg aga ggt cac att ttc gtg gac     576
Gly Ile Gly Trp Gln Ser Asp Gly Val Arg Gly His Ile Phe Val Asp
            180                 185                 190
```

```
cag acg ccc ggc tcg cct ctt gtt gtt att gct ctt aag ggc aca tcg      624
Gln Thr Pro Gly Ser Pro Leu Val Val Ile Ala Leu Lys Gly Thr Ser
        195                 200                 205 gcg gcc att ttc gac tct gga gga gac acc gtc atc aac gac aag acg      672
Ala Ala Ile Phe Asp Ser Gly Gly Asp Thr Val Ile Asn Asp Lys Thr
    210                 215                 220 aac gac aac ctg ttg ttc tcg tgt tgt tgt gcg cgt gtc tcg tac ttg      720
Asn Asp Asn Leu Leu Phe Ser Cys Cys Cys Ala Arg Val Ser Tyr Leu
225                 230                 235                 240 tgg aac aca gtg tgt gac tgc tac acc ggc gag tcg tac acg tgt gac      768
Trp Asn Thr Val Cys Asp Cys Tyr Thr Gly Glu Ser Tyr Thr Cys Asp
                245                 250                 255 caa gag tgt cta gag aag gag ctt tat gcc gag gac cgg tac tat cga      816
Gln Glu Cys Leu Glu Lys Glu Leu Tyr Ala Glu Asp Arg Tyr Tyr Arg
        260                 265                 270 gcc gtt ctc gac att tac cgc aat gta act cat ctg tac cct cag aaa      864
Ala Val Leu Asp Ile Tyr Arg Asn Val Thr His Leu Tyr Pro Gln Lys
    275                 280                 285 caa atc tgg gtc acc gga cat tcc ctg gga ggc gct ctg agt gca atg      912
Gln Ile Trp Val Thr Gly His Ser Leu Gly Gly Ala Leu Ser Ala Met
290                 295                 300 ttg ggt cgt acc tat ggt att cct gcc gtt ggt tac gag gca ccc gga      960
Leu Gly Arg Thr Tyr Gly Ile Pro Ala Val Gly Tyr Glu Ala Pro Gly
305                 310                 315                 320 gag ctg ctt ccc acc aag cga ctg cat ttg ccc agt cct cct ggt att     1008
Glu Leu Leu Pro Thr Lys Arg Leu His Leu Pro Ser Pro Pro Gly Ile
                325                 330                 335 ccc tgg tcc cag gaa cac atc tgg cac ttt gga cac acg gct gac ccc     1056
Pro Trp Ser Gln Glu His Ile Trp His Phe Gly His Thr Ala Asp Pro
        340                 345                 350 atc ttt atg ggc gtg tgt aac gga gca tcg tca tcc tgt tcc att gga     1104
Ile Phe Met Gly Val Cys Asn Gly Ala Ser Ser Ser Cys Ser Ile Gly
    355                 360                 365 ggc tac gcc atg gag acg tct tgc cac tcg ggt ctc caa tgc atg tac     1152
Gly Tyr Ala Met Glu Thr Ser Cys His Ser Gly Leu Gln Cys Met Tyr
370                 375                 380 gac gtg gtg acc gat aaa gga tgg cat ctg agc atg gtc aac cac agg     1200
Asp Val Val Thr Asp Lys Gly Trp His Leu Ser Met Val Asn His Arg
385                 390                 395                 400 att cat acg gtg att gac gag gtg ctg cta gcg tac aac gaa aca gct     1248
Ile His Thr Val Ile Asp Glu Val Leu Leu Ala Tyr Asn Glu Thr Ala
                405                 410                 415 gca tgc gtt cct cct ccc cct tgt caa gac tgt ttc aac tgg aac ttc     1296
Ala Cys Val Pro Pro Pro Pro Cys Gln Asp Cys Phe Asn Trp Asn Phe
        420                 425                 430 gtg atg ggt aat gac aag gac gac gac gat aag gat aag aag aag aag     1344
Val Met Gly Asn Asp Lys Asp Asp Asp Asp Lys Asp Lys Lys Lys Lys
    435                 440                 445 aag aag acg agc acg agt agt agt gtg gtg tcc aag act aag aca tcg     1392
Lys Lys Thr Ser Thr Ser Ser Ser Val Val Ser Lys Thr Lys Thr Ser
450                 455                 460 acc tct tct acc gtt gct act aac acg atg cct tcg ctt cct gat cct     1440
Thr Ser Ser Thr Val Ala Thr Asn Thr Met Pro Ser Leu Pro Asp Pro
465                 470                 475                 480 act tgt gtg gag aga aac tgg tat ggc aag tgt atc cgg tat gat ccg     1488
Thr Cys Val Glu Arg Asn Trp Tyr Gly Lys Cys Ile Arg Tyr Asp Pro
                485                 490                 495 gag att aag cag cag tat ggt gat agc cat acc gtg acc cat gtt act     1536
Glu Ile Lys Gln Gln Tyr Gly Asp Ser His Thr Val Thr His Val Thr
```

```
                 500            505            510
atg gct tag                                                        1545
Met Ala
```

<210> SEQ ID NO 8
<211> LENGTH: 514
<212> TYPE: PRT
<213> ORGANISM: Yarrowia lipolytica

<400> SEQUENCE: 8

```
Leu Tyr Ser Gln Gly Tyr Ser Asn Thr His Gly Glu Lys Asp Met Pro
1               5                   10                  15

Ser Val Val Pro Asn Leu Val Leu Pro Ala Asn Pro Ser Ser Asp His
            20                  25                  30

Ser Phe Ala Val Lys His Ile Tyr His His Asn Thr Glu Ala Asp Ala
        35                  40                  45

Asn His Gly Arg Met Asp Val Ser Gly Glu Trp Val Arg Ala Ala Gln
    50                  55                  60

Lys Ala Gln His Leu Asn Leu Gly Gln Asp Thr His Arg Tyr Met Ala
65                  70                  75                  80

Ser Asn Ala Arg Asp Pro Tyr Thr Asn Leu Pro Leu Lys Ser Arg Thr
                85                  90                  95

Gln Lys Val Lys Arg Trp Arg Gln Arg Asp Pro Asp His Val Glu Ser
            100                 105                 110

Tyr Leu Glu Ala Ala Arg Leu Asn Pro Gln Leu Tyr Gly Ala Met Asp
        115                 120                 125

Phe Asp Trp Val Glu Glu Asp Ile Leu Val Pro Asp Val Thr Asp Arg
    130                 135                 140

Asp Thr Val Val Ser Leu Ala Val Met Ala Ser Asn Ala Tyr Val Asp
145                 150                 155                 160

Val Pro Phe Thr Gly Asp Trp Thr Asn Val Ser Trp Lys Glu Thr Gly
                165                 170                 175

Gly Ile Gly Trp Gln Ser Asp Gly Val Arg Gly His Ile Phe Val Asp
            180                 185                 190

Gln Thr Pro Gly Ser Pro Leu Val Val Ile Ala Leu Lys Gly Thr Ser
        195                 200                 205

Ala Ala Ile Phe Asp Ser Gly Gly Asp Thr Val Ile Asn Asp Lys Thr
    210                 215                 220

Asn Asp Asn Leu Leu Phe Ser Cys Cys Cys Ala Arg Val Ser Tyr Leu
225                 230                 235                 240

Trp Asn Thr Val Cys Asp Cys Tyr Thr Gly Glu Ser Tyr Thr Cys Asp
                245                 250                 255

Gln Glu Cys Leu Glu Lys Glu Leu Tyr Ala Glu Asp Arg Tyr Tyr Arg
            260                 265                 270

Ala Val Leu Asp Ile Tyr Arg Asn Val Thr His Leu Tyr Pro Gln Lys
        275                 280                 285

Gln Ile Trp Val Thr Gly His Ser Leu Gly Gly Ala Leu Ser Ala Met
    290                 295                 300

Leu Gly Arg Thr Tyr Gly Ile Pro Ala Val Gly Tyr Glu Ala Pro Gly
305                 310                 315                 320

Glu Leu Leu Pro Thr Lys Arg Leu His Leu Pro Ser Pro Gly Ile
                325                 330                 335

Pro Trp Ser Gln Glu His Ile Trp His Phe Gly His Thr Ala Asp Pro
            340                 345                 350
```

-continued

```
Ile Phe Met Gly Val Cys Asn Gly Ala Ser Ser Cys Ser Ile Gly
        355                 360             365

Gly Tyr Ala Met Glu Thr Ser Cys His Ser Gly Leu Gln Cys Met Tyr
    370                 375             380

Asp Val Val Thr Asp Lys Gly Trp His Leu Ser Met Val Asn His Arg
385                 390                 395                 400

Ile His Thr Val Ile Asp Glu Val Leu Leu Ala Tyr Asn Glu Thr Ala
                405                 410                 415

Ala Cys Val Pro Pro Pro Cys Gln Asp Cys Phe Asn Trp Asn Phe
            420             425             430

Val Met Gly Asn Asp Lys Asp Asp Asp Lys Asp Lys Lys Lys Lys
        435             440             445

Lys Lys Thr Ser Thr Ser Ser Val Val Ser Lys Thr Lys Thr Ser
    450             455             460

Thr Ser Ser Thr Val Ala Thr Asn Thr Met Pro Ser Leu Pro Asp Pro
465             470             475             480

Thr Cys Val Glu Arg Asn Trp Tyr Gly Lys Cys Ile Arg Tyr Asp Pro
            485             490             495

Glu Ile Lys Gln Gln Tyr Gly Asp Ser His Thr Val Thr His Val Thr
            500             505             510

Met Ala
```

MICROORGANISM HAVING HIGH ABILITY TO DEGRADE OIL AT LOW TEMPERATURE

STATEMENT REGARDING SEQUENCE LISTING

The Sequence Listing associated with this application is provided in text format in lieu of a paper copy, and is hereby incorporated by reference into the specification. The name of the text file containing the Sequence Listing is 690224_405USPC_SEQUENCE LISTING.txt. The text file is 31.4 KB, was created on Mar. 2, 2022, and is being submitted electronically via EFS-Web.

TECHNICAL FIELD

The present disclosure relates to a microorganism having an ability to decompose ester (e.g., oil and fat) and/or fatty acid, and use thereof. More specifically, the present disclosure relates to a *Yarrowia* yeast (e.g., *Yarrowia lipolytica*) that decomposes oil and fat such as trans fatty acid-containing oil and trans fatty acid-containing fat which are conventionally difficult to decompose. The present disclosure also relates to a *Yarrowia* yeast that improves the ability to decompose oil entity of a *Burkholderia bacterium*. Furthermore, the present disclosure relates to a combination of microorganisms having an ability to decompose oil entity and use thereof. More particularly, the present disclosure relates to a combination of microorganisms having an improved ability to decompose oil entity as compared to at least one microorganism in the combination alone. The present disclosure also relates to enhancing expression of lipase by a combination of microorganisms. More particularly, the present disclosure relates to a combination of a *Burkholderia bacterium* and a *Yarrowia* yeast.

BACKGROUND ART

Wastewater from a food factory or oil and fat factory has high oil entity content. Such oil entity content causes deterioration in various biological treatment functions, such as a reduced capacity for treatment with activated sludge, imperfect separation of solids from liquids due to reduced precipitation, fouling of a membrane in membrane bioreactor (MBR), and suppression of methane fermentation in anaerobic digestion. For this reason, oil entity content is removed with, for example, a dissolved air flotation apparatus or the like as a preliminary step of biological treatment of wastewater with high oil entity content. Since kitchen wastewater produced by the restaurant industry also has high oil entity content, a grease trap for removing oil entity content is installed. Both dissolved air flotation apparatuses and grease traps face problems such as the apparatuses being a source of foul odor or pests, the cost associated with the collection/transport of the separated oil entity and industrial waste processing, labor and cost associated with maintenance, cleaning, and the like. While oil entity decomposing technologies using microorganisms have been considered as means for solving such problems and multiple related microbial formulations are commercially available, it is extremely difficult to reduce the concentration of oil entity content by microorganism decomposition to a desired level within a configurable retention time. For this reason, a dissolved air flotation apparatus or a conventional grease trap is currently used in most cases.

When oil entity content is high, fermentation of food waste also faces problems such as suppression of fermentation or high content of oil entity in wastewater in an extinguishing type of disposer. Further, oily sludge that is separated and collected with a dissolved air flotation apparatus or a grease trap is industrial waste, so treatment thereof is very costly. In this regard, decomposition of such oil entity content with microorganisms is being considered, but the reality is that the ability to decompose of microorganisms is also limited in the same manner as the aforementioned wastewater treatment.

The decomposition rate is an issue in the removal of oil entity content using microorganisms as described above. In particular, reduced activity due to low temperatures during winter often makes it challenging to apply microorganisms. Especially at low temperature during the winter, the decomposition rate of oil and fat by microorganisms is extremely low, such that wastewater treatment or waste treatment using specific microorganisms is considered impossible.

CITATION LIST

Non Patent Literature

[NPL 1] Yoshikazu KITA et al., Hitachi Chemical technical report: No. 46: pages 49 to 54 (2006)

SUMMARY OF INVENTION

Solution to Problem

As a result of diligent studies, the inventors have found a microorganism belonging to (the genus) *Yarrowia* which is a novel microorganism having unique esterase activity. In some aspects, this microorganism has been found to be capable of decomposing/assimilating trans fatty acid-containing oil and fat and/or trans fatty acid. In some aspects, this microorganism has been found to be capable of decomposing/assimilating oil and fat and/or fatty acid at a low temperature. In some aspects, this microorganism has been found to be capable of widely decomposing/assimilating short-chain to long-chain fatty acid and ester/oil and fat comprising them and the like. The inventors have also found a *Yarrowia* yeast that improves the ability to decompose oil entity of a *Burkholderia bacterium*. Furthermore, the inventors have found a combination of a *Burkholderia bacterium* and a *Yarrowia* yeast strongly decomposing oil and fat and fatty acid. The present disclosure also relates to application (e.g., treatment of oil entity or the like) of the combination of microorganisms of the present disclosure. The present disclosure provides an application of the microorganism of the present disclosure, a combination of new microorganisms having an ability to decompose oil entity, and a method of decomposing oil entity using this combination.

Therefore, the present disclosure provides the following.
(Item A1)
A *Yarrowia* yeast having an ability to decompose trans fatty acid.
(Item A2)
A *Yarrowia* yeast having an ability to assimilate trans fatty acid.
(Item A3)
A *Yarrowia* yeast having an ability to decompose trans fatty acid-containing oil and fat.
(Item A4)
A *Yarrowia* yeast having an ability to assimilate trans fatty acid-containing oil and fat.

(Item A5)

A *Yarrowia* yeast having an ability to decompose ester (e.g., oil and fat) and/or fatty acid at 15° C.

(Item A6)

A *Yarrowia* yeast having an ability to assimilate ester (e.g., oil and fat) and/or fatty acid at 15° C.

(Item A7)

The *Yarrowia* yeast of any one of the preceding items, wherein the ability to assimilate or decompose is retained at 15° C.

(Item A8)

A *Yarrowia* yeast having an ability to decompose short-chain to medium-chain fatty acid (C2 to C12)-containing ester.

(Item A9)

A *Yarrowia* yeast having an ability to decompose short-chain to long-chain fatty acid (C2 or greater)-containing oil and fat.

(Item A10)

A *Yarrowia* yeast having higher decomposition activity for 4-nitrophenyl ester of short-chain to medium-chain fatty acid (C2 to C12) than decomposition activity for 4-nitrophenyl ester of long-chain fatty acid (C13 or greater) and having an ability to decompose triglyceride of long-chain fatty acid (C13 or greater).

(Item A11)

The *Yarrowia* yeast of any one of the preceding items, which has two or more features specified in the preceding items A.

(Item A12)

The yeast of any one of the preceding items, which is *Yarrowia lipolytica*.

(Item A13)

The *Yarrowia* yeast of any one of the preceding items, which is a KH-2 strain identified by accession number NITE BP-02732 of a *Yarrowia* yeast, or a derivative strain thereof that has a feature of the *Yarrowia* yeast of any one or more of the preceding items A.

(Item A14) An oil entity decomposing agent comprising the *Yarrowia* yeast of any one of the preceding items.

(Item A15)

The oil entity decomposing agent of any one of the preceding items, further comprising an oil entity treating component.

(Item A16)

A composition comprising the *Yarrowia* yeast of any one of the preceding items or the oil entity decomposing agent of any one of the preceding items, which is for at least one use selected from the group consisting of:
  (a) for use in decomposing trans fatty acid;
  (b) for use in decomposing trans fatty acid-containing oil and fat;
  (c) for use in decomposing ester (e.g., oil and fat) and/or fatty acid at 15° C.;
  (d) for use in decomposing short-chain to medium-chain fatty acid (C2 to C12)-containing ester; and
  (e) for use in decomposing short-chain to long-chain fatty acid (C2 or greater)-containing oil and fat.

(Item A17)

A kit for use in decomposing ester (e.g., oil and fat), comprising the *Yarrowia* yeast of any one of the preceding items or the oil entity decomposing agent of any one of the preceding items, or the composition of any one of the preceding items, and an additional oil entity treating component.

(Item A18)

A method of decomposing and removing ester (e.g., oil and fat), comprising causing the *Yarrowia* yeast of any one of the preceding items, or the oil entity decomposing agent of any one of the preceding items, the composition of any one of the preceding items to act on a subject of treatment.

(Item A19)

The method of any one of the preceding items, wherein the subject of treatment comprises trans fatty acid or trans fatty acid-containing oil and fat.

(Item A20)

The method of any one of the preceding items, comprising at least one step selected from the group consisting of:
  (a) a step of decomposing trans fatty acid;
  (b) a step of decomposing trans fatty acid-containing oil and fat;
  (c) a step of decomposing ester (e.g., oil and fat) and/or fatty acid at 15° C.;
  (d) a step of decomposing short-chain to medium-chain fatty acid (C2 to C12)-containing ester; and
  (e) a step of decomposing short-chain to long-chain fatty acid (C2 or greater)-containing oil and fat.

(Item B1)

A composition for use in treating oil and fat by a combination of a *Yarrowia* yeast which produces lipase and a *Burkholderia* bacterium which produces lipase, comprising a *Burkholderia* bacterium.

(Item B2)

A composition for use in treating oil and fat by a combination of a *Yarrowia* yeast which produces lipase and a *Burkholderia* bacterium which produces lipase, comprising a *Yarrowia* yeast.

(Item B3)

A combination for use in treating oil and fat, comprising a combination of a *Burkholderia* bacterium and a *Yarrowia* yeast, wherein both the *Burkholderia* bacterium and the *Yarrowia* yeast produce lipase.

(Item B4)

The composition or combination of any one of the preceding items, wherein the *Yarrowia* yeast includes *Yarrowia lipolytica*.

(Item B5)

The composition or combination of any one of the preceding items, wherein the *Burkholderia* bacterium includes a bacterium in the genus *Burkholderia*.

(Item B6)

The composition or combination of any one of the preceding items, wherein the *Burkholderia* bacterium includes *Burkholderia arboris, Burkholderia ambifaria*, or *Burkholderia cepacia* complex.

(Item B7)

The composition or combination of any one of the preceding items, wherein the combination of a *Burkholderia* bacterium and a *Yarrowia* yeast has a higher ability to decompose oil and fat than an ability to decompose oil and fat calculated from a value of an ability to decompose oil and fat in single culture of each of the *Burkholderia* bacterium and the *Yarrowia* yeast.

(Item B8)

The composition or combination of any one of the preceding items, wherein a cell count of the *Burkholderia bacterium*:a cell count of the *Yarrowia* yeast is 1:20 to 20:1.

(Item B9)

The composition or combination of any one of the preceding items, wherein at least one of the *Burkholderia* bacterium and the *Yarrowia* yeast has an ability to decompose fatty acid at 15° C.

(Item B10)

The composition or combination of any one of the preceding items, wherein the *Burkholderia bacterium* is a KH-1 strain (bacterial strain identified by accession number NITE BP-02731) of *Burkholderia arboris*, a KH-1AL1 strain (bacterial strain identified by accession number NITE BP-02977) of *Burkholderia ambifaria*, a KH-1AL2 strain (bacterial strain identified by accession number NITE BP-02978) of *Burkholderia cepacia* complex, or a KH-1AL3 strain (bacterial strain identified by accession number NITE BP-02979) of *Burkholderia cepacia* complex, or a derivative strain thereof.

(Item B11)

The composition or combination of any one of the preceding items, wherein the *Yarrowia* yeast is a KH-2 strain (microorganism strain identified by accession number NITE BP-02732) of *Yarrowia lipolytica*, a KH-2AL1 strain (microorganism strain identified by accession number NITE BP-03091) of *Yarrowia lipolytica*, or a KH-2AL3 strain (microorganism strain identified by accession number NITE BP-03092) of *Yarrowia lipolytica*, or a derivative strain thereof.

(Item B12)

The composition or combination of any one of the preceding items, which is an oil entity decomposing agent.

(Item B13)

The oil entity decomposing agent of any one of the preceding items, further comprising an oil entity treating component.

(Item B14)

A method of decomposing and removing oil entity, comprising causing the composition or combination of any one of the preceding items or the oil entity decomposing agent of any one of the preceding items to act on a subject of treatment.

(Item B15)

A composition for use in improving lipase production of a *Yarrowia* yeast which produces lipase, comprising a *Burkholderia bacterium*.

(Item B16)

A composition for use in improving lipase production of a *Burkholderia bacterium* which produces lipase, comprising a *Yarrowia* yeast.

(Item B17)

A composition for use in reinforcing an ability to treat oil and fat of a *Yarrowia* yeast which produces lipase, comprising a *Burkholderia bacterium*.

(Item B18)

A composition for use in reinforcing an ability to treat oil and fat of a *Burkholderia bacterium* which produces lipase, comprising a *Yarrowia* yeast.

(Item B19)

A method of improving lipase production of at least one of a *Burkholderia bacterium* and a *Yarrowia* yeast, comprising mixing and culturing the *Burkholderia bacterium* and the *Yarrowia* yeast.

(Item B20)

Use of a *Burkholderia bacterium* for treating oil and fat by a combination of a *Yarrowia* yeast which produces lipase and a *Burkholderia bacterium* which produces lipase.

(Item B21)

Use of a *Yarrowia* yeast for treating oil and fat by a combination of a *Yarrowia* yeast which produces lipase and a *Burkholderia bacterium* which produces lipase.

(Item B22)

Use of a *Burkholderia bacterium* and a *Yarrowia* yeast for treating oil and fat by a combination of the *Burkholderia bacterium* and the *Yarrowia* yeast, wherein both the *Burkholderia bacterium* and the *Yarrowia* yeast produce lipase.

(Item B23)

The use of any one of the preceding items, wherein the *Yarrowia* yeast includes *Yarrowia lipolytica*.

(Item B24)

The use of any one of the preceding items, wherein the *Burkholderia bacterium* includes a bacterium in the genus *Burkholderia*.

(Item B25)

The use of any one of the preceding items, wherein the *Burkholderia bacterium* includes *Burkholderia arboris*, *Burkholderia ambifaria*, or *Burkholderia cepacia* complex.

(Item B26)

The use of any one of the preceding items, wherein the combination of a *Burkholderia bacterium* and a *Yarrowia* yeast has a higher ability to decompose oil and fat than an ability to decompose oil and fat calculated from a value of an ability to decompose oil and fat in single culture of each of the *Burkholderia bacterium* and the *Yarrowia* yeast.

(Item B27)

The use of any one of the preceding items, wherein a cell count of the *Burkholderia bacterium*:a cell count of the *Yarrowia* yeast is 1:20 to 20:1.

(Item B28)

The use of any one of the preceding items, wherein at least one of the *Burkholderia bacterium* and the *Yarrowia* yeast has an ability to decompose fatty acid at 15° C.

(Item B29)

The use of any one of the preceding items, wherein the *Burkholderia bacterium* is a KH-1 strain (bacterial strain identified by accession number NITE BP-02731), a KH-1AL1 strain (bacterial strain identified by accession number NITE BP-02977), a KH-1AL2 strain (bacterial strain identified by accession number NITE BP-02978), or a KH-1AL3 strain (bacterial strain identified by accession number NITE BP-02979) of a bacterium in the genus *Burkholderia*, or a derivative strain thereof.

(Item B30)

The use of any one of the preceding items, wherein the *Yarrowia* yeast is a KH-2 strain (microorganism strain identified by accession number NITE BP-02732) of *Yarrowia lipolytica*, a KH-2AL1 strain (microorganism strain identified by accession number NITE BP-03091) of *Yarrowia lipolytica*, or a KH-2AL3 strain (microorganism strain identified by accession number NITE BP-03092) of *Yarrowia lipolytica*, or a derivative strain thereof.

(Item B31)

The use of any one of the preceding items, combined with an additional oil entity treating component.

(Item B32)

The use of any one of the preceding items, comprising causing the combination of a *Burkholderia bacterium* and a *Yarrowia* yeast to act on a subject of treatment.

(Item B33)

Use of a *Burkholderia bacterium* for improving lipase production of a *Yarrowia* yeast which produces lipase.

(Item B34)

Use of a *Yarrowia* yeast for improving lipase production of a *Burkholderia bacterium* which produces lipase.

(Item B35)

Use of a *Burkholderia bacterium* for reinforcing an ability to treat oil and fat of a *Yarrowia* yeast which produces lipase.

(Item B36)

Use of a *Yarrowia* yeast for reinforcing an ability to treat oil and fat of a *Burkholderia bacterium* which produces lipase.

(Item B37)
Use of a *Burkholderia* bacterium and a *Yarrowia* yeast for improving lipase production of at least one of the *Burkholderia* bacterium and the *Yarrowia* yeast.

(Item B38)
A method for treating oil and fat by a combination of a *Yarrowia* yeast which produces lipase and a *Burkholderia* bacterium which produces lipase, comprising contacting a *Burkholderia* bacterium with a subject.

(Item B39)
A method for treating oil and fat by a combination of a *Yarrowia* yeast which produces lipase and a *Burkholderia* bacterium which produces lipase, comprising contacting a *Yarrowia* yeast with a subject.

(Item B40)
A method for treating oil and fat by a combination of a *Yarrowia* yeast which produces lipase and a *Burkholderia* bacterium which produces lipase, comprising contacting a combination of a *Burkholderia* bacterium and a *Yarrowia* yeast with a subject.

(Item B41)
The method of any one of the preceding items, wherein the *Yarrowia* yeast includes *Yarrowia lipolytica*.

(Item B42)
The method of any one of the preceding items, wherein the *Burkholderia* bacterium includes a bacterium in the genus *Burkholderia*.

(Item B43)
The method of any one of the preceding items, wherein the *Burkholderia* bacterium includes *Burkholderia arboris*, *Burkholderia ambifaria*, or *Burkholderia cepacia* complex.

(Item B44)
The method of any one of the preceding items, wherein the combination of a *Burkholderia* bacterium and a *Yarrowia* yeast has a higher ability to decompose oil and fat than an ability to decompose oil and fat calculated from a value of an ability to decompose oil and fat in single culture of each of the *Burkholderia* bacterium and the *Yarrowia* yeast.

(Item B45)
The method of any one of the preceding items, wherein a cell count of the *Burkholderia* bacterium:a cell count of the *Yarrowia* yeast is 1:20 to 20:1.

(Item B46)
The method of any one of the preceding items, wherein at least one of the *Burkholderia* bacterium and the *Yarrowia* yeast has an ability to decompose fatty acid at 15° C.

(Item B47)
The method of any one of the preceding items, wherein the *Burkholderia* bacterium is a KH-1 strain (bacterial strain identified by accession number NITE BP-02731), a KH-1AL1 strain (bacterial strain identified by accession number NITE BP-02977), a KH-1AL2 strain (bacterial strain identified by accession number NITE BP-02978), or a KH-1AL3 strain (bacterial strain identified by accession number NITE BP-02979) of a bacterium in the genus *Burkholderia*, or a derivative strain thereof.

(Item B48)
The method of any one of the preceding items, wherein the *Yarrowia* yeast is a KH-2 strain (microorganism strain identified by accession number NITE BP-02732) of *Yarrowia lipolytica*, a KH-2AL1 strain (microorganism strain identified by accession number NITE BP-03091) of *Yarrowia lipolytica*, or a KH-2AL3 strain (microorganism strain identified by accession number NITE BP-03092) of *Yarrowia lipolytica*, or a derivative strain thereof.

(Item B49)
The method of any one of the preceding items, using an additional oil entity treating component.

(Item B50)
The method of any one of the preceding items, which is a method of decomposing and removing oil entity.

(Item B51)
A method for improving lipase production of a *Yarrowia* yeast which produces lipase, comprising adding a *Burkholderia* bacterium to a subject.

(Item B52)
A method for improving lipase production of a *Burkholderia* bacterium which produces lipase, comprising adding a *Yarrowia* yeast to a subject.

(Item B53)
A method for reinforcing an ability to treat oil and fat of a *Yarrowia* yeast which produces lipase, comprising adding a *Burkholderia* bacterium to a subject.

(Item B54)
A method for reinforcing an ability to treat oil and fat of a *Burkholderia* bacterium which produces lipase, comprising adding a *Yarrowia* yeast to a subject.

(Item C1)
A *Yarrowia* yeast having an ability to decompose trans fatty acid.

(Item C2)
A *Yarrowia* yeast having an ability to decompose trans fatty acid-containing oil and fat.

(Item C3)
A *Yarrowia* yeast having an ability to decompose ester and/or fatty acid at 15° C.

(Item C4)
A *Yarrowia* yeast having an ability to decompose short-chain to medium-chain fatty acid-containing ester.

(Item C5)
A *Yarrowia* yeast having an ability to decompose short-chain to long-chain fatty acid-containing oil and fat.

(Item C6)
A *Yarrowia* yeast having higher decomposition activity for 4-nitrophenyl ester of short-chain to medium-chain fatty acid (C2 to C12) than decomposition activity for 4-nitrophenyl ester of long-chain fatty acid (C13 or greater) and having an ability to decompose triglyceride of long-chain fatty acid (C13 or greater).

(Item C7)
A *Yarrowia* yeast having an ability to improve lipase production of a *Burkholderia* bacterium which produces lipase.

(Item C8)
A *Yarrowia* yeast having an ability to impart a higher ability to decompose oil and fat or fatty acid than an ability to decompose oil and fat or fatty acid in single culture of a *Burkholderia* bacterium to the *Burkholderia* bacterium.

(Item C9)
The *Yarrowia* yeast of any one of the preceding items, wherein the *Burkholderia* bacterium includes a bacterium in the genus *Burkholderia*.

(Item C10)
The *Yarrowia* yeast of any one of the preceding items, wherein the *Burkholderia* bacterium includes *Burkholderia arboris*, *Burkholderia ambifaria*, or *Burkholderia cepacia* complex.

(Item C11)
A *Yarrowia* yeast having:
a feature of the *Yarrowia* yeast of any one or more of items C1 to 6; and
a feature of the *Yarrowia* yeast of any one or more of items C7 to 10.

(Item C12)
The *Yarrowia* yeast of any one of the preceding items, which is *Yarrowia lipolytica*.
(Item C13)
The *Yarrowia* yeast of any one of the preceding items, which is a KH-2 strain (microorganism strain identified by accession number NITE BP-02732) of *Yarrowia lipolytica*, a KH-2AL1 strain (microorganism strain identified by accession number NITE BP-03091) of *Yarrowia lipolytica*, or a KH-2AL3 strain (microorganism strain identified by accession number NITE BP-03092) of *Yarrowia lipolytica*, or a derivative strain thereof that has a feature of the *Yarrowia* yeast of any one of the preceding items.
(Item C14)
An oil entity decomposing agent comprising the *Yarrowia* yeast of any one of the preceding items.
(Item C15)
The oil decomposing agent of any one of the preceding items, further comprising an oil entity treating component.
(Item C16)
A composition comprising the *Yarrowia* yeast or the oil entity decomposing agent of any one of the preceding items, which is for at least one use selected from the group consisting of:
 (a) for use in decomposing trans fatty acid;
 (b) for use in decomposing trans fatty acid-containing oil and fat;
 (c) for use in decomposing ester and/or fatty acid at 15° C.;
 (d) for use in decomposing short-chain to medium-chain fatty acid (C2 to C12)-containing ester; and
 (e) for use in decomposing short-chain to long-chain fatty acid (C2 or greater)-containing oil and fat.
(Item C17)
A kit for use in decomposing ester, comprising the *Yarrowia* yeast or the oil entity decomposing agent of any one of the preceding items, or the composition of any one of the preceding items, and an additional oil entity treating component.
(Item C18)
A method of decomposing and removing ester, comprising causing the *Yarrowia* yeast, the oil entity decomposing agent, or the composition of any one of the preceding items to act on a subject of treatment.
(Item C19)
The method of any one of the preceding items, wherein the subject of treatment comprises trans fatty acid or trans fatty acid-containing oil and fat.
(Item C20)
The method of any one of the preceding items, comprising at least one step selected from the group consisting of:
 (a) a step of decomposing trans fatty acid;
 (b) a step of decomposing trans fatty acid-containing oil and fat;
 (c) a step of decomposing ester and/or fatty acid at 15° C.;
 (d) a step of decomposing short-chain to medium-chain fatty acid (C2 to C12)-containing ester; and
 (e) a step of decomposing short-chain to long-chain fatty acid (C2 or greater)-containing oil and fat.
(Item C21)
A composition for use in treating oil and fat or fatty acid by a combination of a *Yarrowia* yeast which produces lipase and a *Burkholderia* bacterium which produces lipase, comprising a *Burkholderia* bacterium.
(Item C22)
A composition for use in treating oil and fat or fatty acid by a combination of a *Yarrowia* yeast which produces lipase and a *Burkholderia* bacterium which produces lipase, comprising a *Yarrowia* yeast.
(Item C23)
A combination for use in treating oil and fat or fatty acid, comprising a combination of a *Burkholderia* bacterium and a *Yarrowia* yeast, wherein both the *Burkholderia* bacterium and the *Yarrowia* yeast produce lipase.
(Item C24)
The composition or combination of any one of the preceding items, wherein the *Yarrowia* yeast includes *Yarrowia lipolytica*.
(Item C25)
The composition or combination of any one of the preceding items, wherein the *Burkholderia* bacterium includes a bacterium in the genus *Burkholderia*.
(Item C26)
The composition or combination of any one of the preceding items, wherein the *Burkholderia* bacterium includes *Burkholderia arboris*, *Burkholderia ambifaria*, or *Burkholderia cepacia* complex.
(Item C27)
The composition or combination of any one of the preceding items, wherein the combination of a *Burkholderia* bacterium and a *Yarrowia* yeast has a higher ability to decompose oil and fat or fatty acid than an ability to decompose oil and fat or fatty acid calculated from a value of an ability to decompose oil and fat or fatty acid in single culture of each of the *Burkholderia* bacterium and the *Yarrowia* yeast.
(Item C28)
The composition or combination of any one of the preceding items, wherein a cell count of the *Burkholderia bacterium*:a cell count of the *Yarrowia* yeast is 1:20 to 20:1.
(Item C29)
The composition or combination of any one of the preceding items, wherein at least one of the *Burkholderia* bacterium and the *Yarrowia* yeast has an ability to decompose fatty acid at 15° C.
(Item C30)
The composition or combination of any one of the preceding items, wherein the *Burkholderia* bacterium is a KH-1 strain (bacterial strain identified by accession number NITE BP-02731), a KH-1AL1 strain (bacterial strain identified by accession number NITE BP-02977), a KH-1AL2 strain (bacterial strain identified by accession number NITE BP-02978), or a KH-1AL3 strain (bacterial strain identified by accession number NITE BP-02979) of a bacterium in the genus *Burkholderia*, or a derivative strain thereof.
(Item C31)
The composition or combination of any one of the preceding items, wherein the *Yarrowia* yeast is a KH-2 strain (microorganism strain identified by accession number NITE BP-02732) of *Yarrowia lipolytica*, a KH-2AL1 strain (microorganism strain identified by accession number NITE BP-03091) of *Yarrowia lipolytica*, or a KH-2AL3 strain (microorganism strain identified by accession number NITE BP-03092) of *Yarrowia lipolytica*, or a derivative strain thereof.
(Item C32)
The composition or combination of any one of the preceding items, which is an oil entity decomposing agent.
(Item C33)
The oil entity decomposing agent of any one of the preceding items, further comprising an oil entity treating component.

(Item C34)

A method of decomposing and removing oil entity, comprising causing the composition or combination or the oil entity decomposing agent of any one of the preceding items to act on a subject of treatment.

(Item C35)

A composition for use in improving lipase production of a *Yarrowia* yeast which produces lipase, comprising a *Burkholderia bacterium*.

(Item C36)

A composition for use in improving lipase production of a *Burkholderia bacterium* which produces lipase, comprising a *Yarrowia* yeast.

(Item C37)

A composition for use in reinforcing an ability to treat oil and fat or fatty acid of a *Yarrowia* yeast which produces lipase, comprising a *Burkholderia bacterium*.

(Item C38)

A composition for use in reinforcing an ability to treat oil and fat or fatty acid of a *Burkholderia bacterium* which produces lipase, comprising a *Yarrowia* yeast.

(Item C39)

A method of improving lipase production of at least one of a *Burkholderia bacterium* and a *Yarrowia* yeast, comprising mixing and culturing the *Burkholderia bacterium* and the *Yarrowia* yeast.

The present disclosure is intended so that one or more of the features described above can be provided not only as the explicitly disclosed combinations, but also as other combinations. Additional embodiments and advantages of the present disclosure are recognized by those skilled in the art by reading and understanding the following detailed description as needed.

Advantageous Effects

The microorganism or the combination of microorganisms of the present disclosure and a composition or a combination providing the same can achieve rapid decomposition of oil and fat and/or fatty acid. Thus, said microorganism or combination of microorganisms and said composition or combination can be applied in a broad range of situations, such as cleanup of an environmental contamination by oil entity, food waste treatment, composting treatment, waste treatment such as wastewater treatment, and composting, and can deal with a broad range of oil entity concentration. Said microorganism or combination of microorganisms and said composition or combination are also capable of decomposing trans fatty acid and trans fatty acid-containing oil and fat, and thus are capable of treating an oil entity-containing subject, particularly wastewater discharged from a food factory or the like.

The present disclosure can also solve the problem of oil entity which is difficult to decompose, i.e., oil entity type. The microorganism of the present disclosure and a composition comprising the same can decompose trans fatty acid and oil and fat containing the same generated in the hydrogenation process of oil entity, and attain an effect of being able to treat especially margarine, fat spread, shortening, or the like containing a large amount of such fatty acid-containing oil and fat, which could not be treated with conventional microorganisms. In particular, the microorganism of the present disclosure and a composition comprising the same provide an effect of achieving decomposition of trans fatty acid, which is available at a practical level as yeast (microorganism) that is the primary microorganisms for treating wastewater or waste.

BRIEF DESCRIPTION OF DRAWINGS

FIG. 10A shows decomposition of canola oil by a KH-2AL1 strain in 15° C. culture (pH of 7.0). The figure shows the result of measuring oil entity content (residual oil entity content) corresponding to a normal hexane value with an oil entity content measuring reagent kit and calculating the percentage considering the measurement value at 0 hours as 100% (top row), and the result of quantifying the total fatty acids (total of fatty acid in triglyceride and free fatty acid) by gas chromatography (bottom row) at 0 hours, 24 hours, 48 hours, and 72 hours after starting the culture.

FIG. 11A shows decomposition of canola oil by a KH-2AL3 strain in 15° C. culture (pH of 7.0). The figure shows the result of measuring oil entity content (residual oil entity content) corresponding to a normal hexane value with an oil entity content measuring reagent kit and calculating the percentage considering the measurement value at 0 hours as 100% (top row), and the result of quantifying the total fatty acids (total of fatty acid in triglyceride and free fatty acid) by gas chromatography (bottom row) at 0 hours, 24 hours, 48 hours, and 72 hours after starting the culture.

Figure 16:
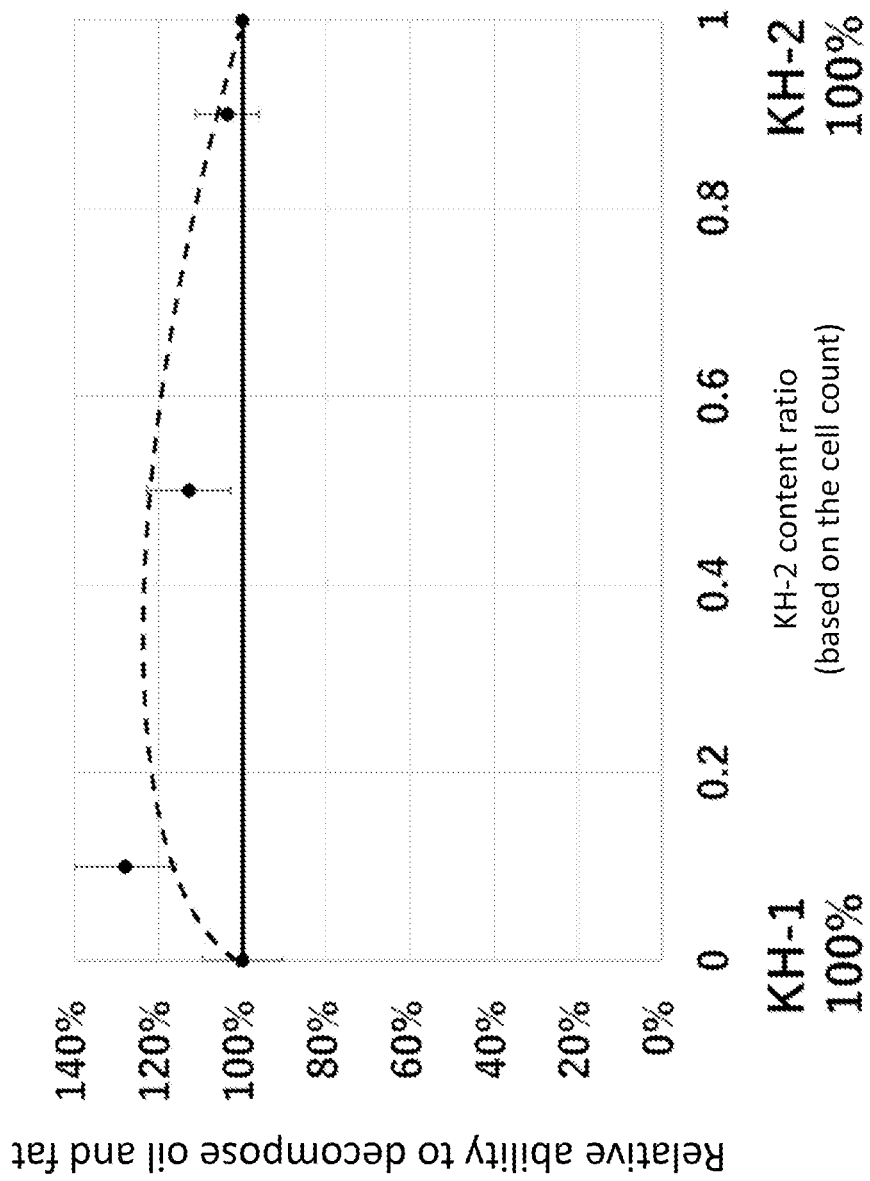
FIG. 16 shows decomposition of canola oil at various mixing ratios of a KH-1 strain and a KH-2 strain at 15° C. The figure shows the result of quantifying the amount of decrease (amount of decomposition) in the total fatty acids (total of fatty acid in triglyceride and free fatty acid) at 48 hours after starting the culture at each ratio of KH-1 strain:KH-2 strain=10:0, 9:1, 5:5, 1:9, and 0:10 at a total cell concentration of $5 \times 10^5$ cells/mL by gas chromatography, and comparing the result with the ability to decompose oil and fat calculated from a value of an ability to decompose oil and fat in single culture of each of the KH-1 strain and the KH-2 strain. The vertical axis indicates a relative ability to decompose oil and fat at each mixing ratio as compared to the ability to decompose oil and fat (100%) calculated from a value of an ability to decompose oil and fat in single culture of each of the KH-1 strain and the KH-2 strain, and the horizontal axis indicates a KH-2 strain content ratio (based on the cell count).

The figure shows the result of quantifying the amount of decrease (amount of decomposition) in the total fatty acids (total of fatty acid in triglyceride and free fatty acid) at 18 hours after starting the culture at each ratio (based on the cell count) of KH-1 strain:KH-2 strain=10:0, 9:1, 5:5, 1:9, and 0:10 at a total cell concentration of $5\times10^5$ cells/mL by gas chromatography. The vertical axis indicates the amount of decomposition of the total fatty acids, and the horizontal axis indicates the mixing ratio of KH-1 strain:KH-2 strain (based on the cell count). The straight broken line indicates the ability to decompose oil and fat calculated from a value of an ability to decompose oil and fat in single culture of each of the KH-1 strain and the KH-2 strain. A similar tendency to FIG. 16 is also shown when a result in comparison with the ability to decompose oil and fat calculated from a value of an ability to decompose oil and fat in single culture of each of the KH-1 strain and the KH-2 strain is calculated as in FIG. 16.

Figure 18:
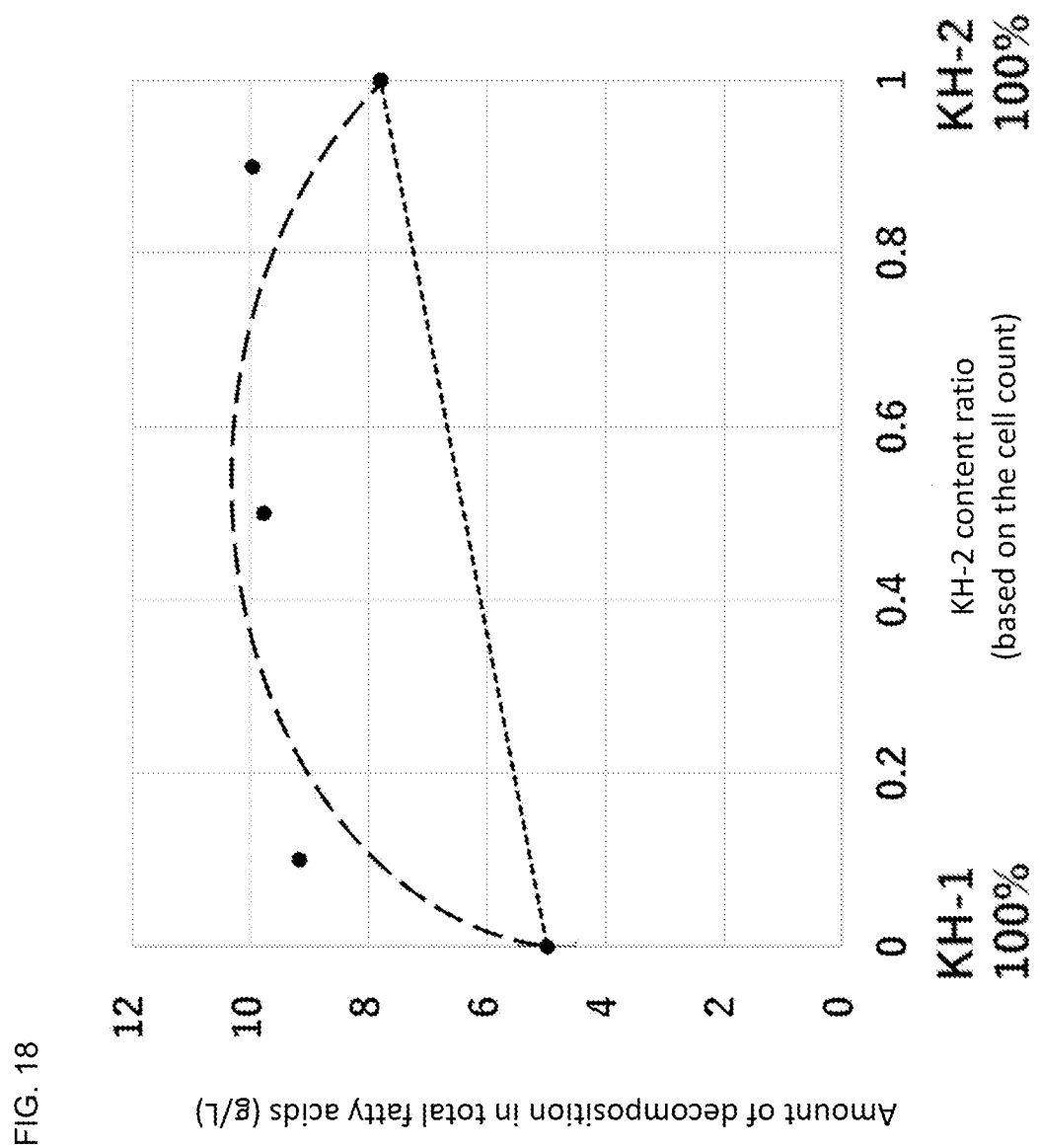

FIG. 18 shows decomposition of oleic acid at various mixing ratios of a KH-1 strain and a KH-2 strain at 28° C. The figure shows the result of quantifying the amount of decrease (amount of decomposition) in the total fatty acids at 18 hours after starting the culture at each ratio (based on the cell count) of KH-1 strain:KH-2 strain=10:0, 9:1, 5:5, 1:9, and 0:10 at a total cell concentration of $5\times10^5$ cells/mL by gas chromatography. The vertical axis indicates the amount of decomposition of the total fatty acids, and the horizontal axis indicates the mixing ratio of KH-1 strain: KH-2 strain (based on the cell count). The straight broken line indicates the ability to decompose oil and fat calculated from a value of the ability to decompose oil and fat in single culture of each of the KH-1 strain and the KH-2 strain.

Figure 19:
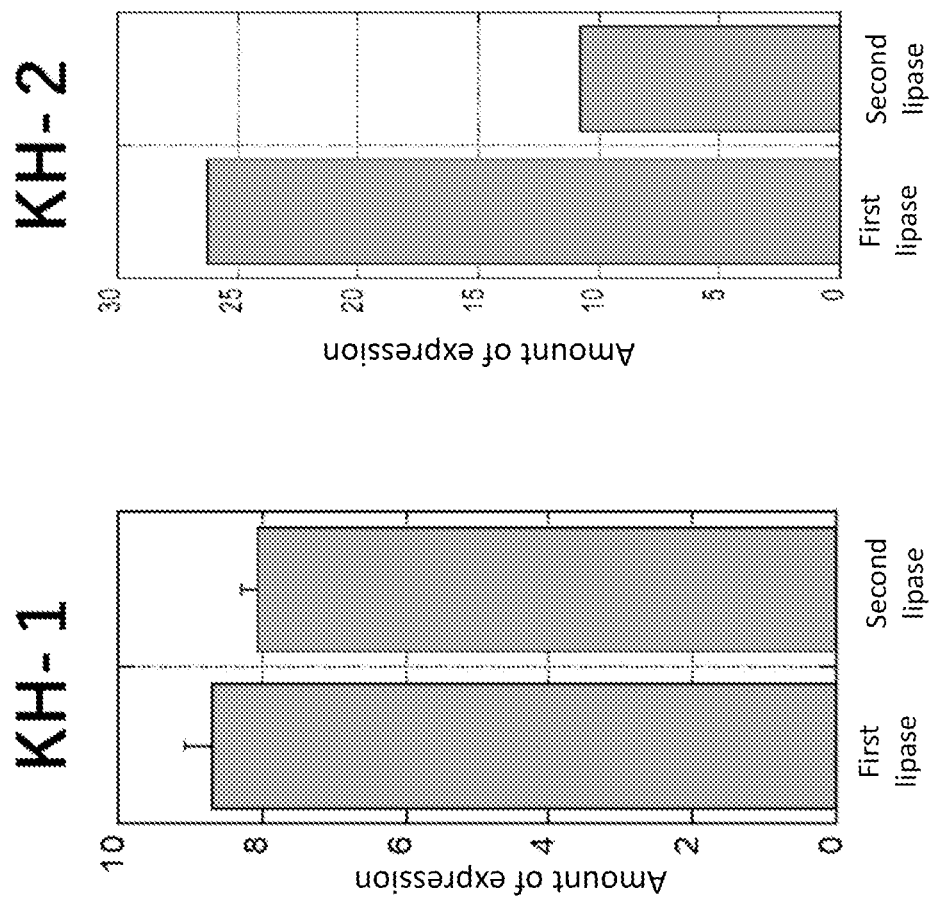

FIG. 19 shows the amount of expression of the gene in each microorganism in a symbiotic system of KH-1 strain+ KH-2 strain. The left panel shows the result from the KH-1 strain when cultured for 71 hours, and the vertical axis indicates the relative amount of expression of the gene in symbiotic system culture of KH-1 strain+KH-2 strain considering the amount of RNA expression of each gene in single culture of the KH-1 strain as 1. The first lipase of the KH-1 strain is represented by the base sequence of SEQ ID NO: 1 and the amino acid sequence of SEQ ID NO: 2. The second lipase of the KH-1 strain is represented by the base sequence of SEQ ID NO: 3 and the amino acid sequence of SEQ ID NO: 4. The right panel shows the result from the KH-2 strain when cultured for 48 hours, and the vertical axis indicates the relative amount of expression of the gene in symbiotic system culture of KH-1 strain+KH-2 strain considering the amount of RNA expression of each gene in single culture of the KH-2 strain as 1. The first lipase of the KH-2 strain is represented by the base sequence of SEQ ID NO: 5 and the amino acid sequence of SEQ ID NO: 6. The second lipase of the KH-2 strain is represented by the base sequence of SEQ ID NO: 7 and the amino acid sequence of SEQ ID NO: 8.

Figure 20:
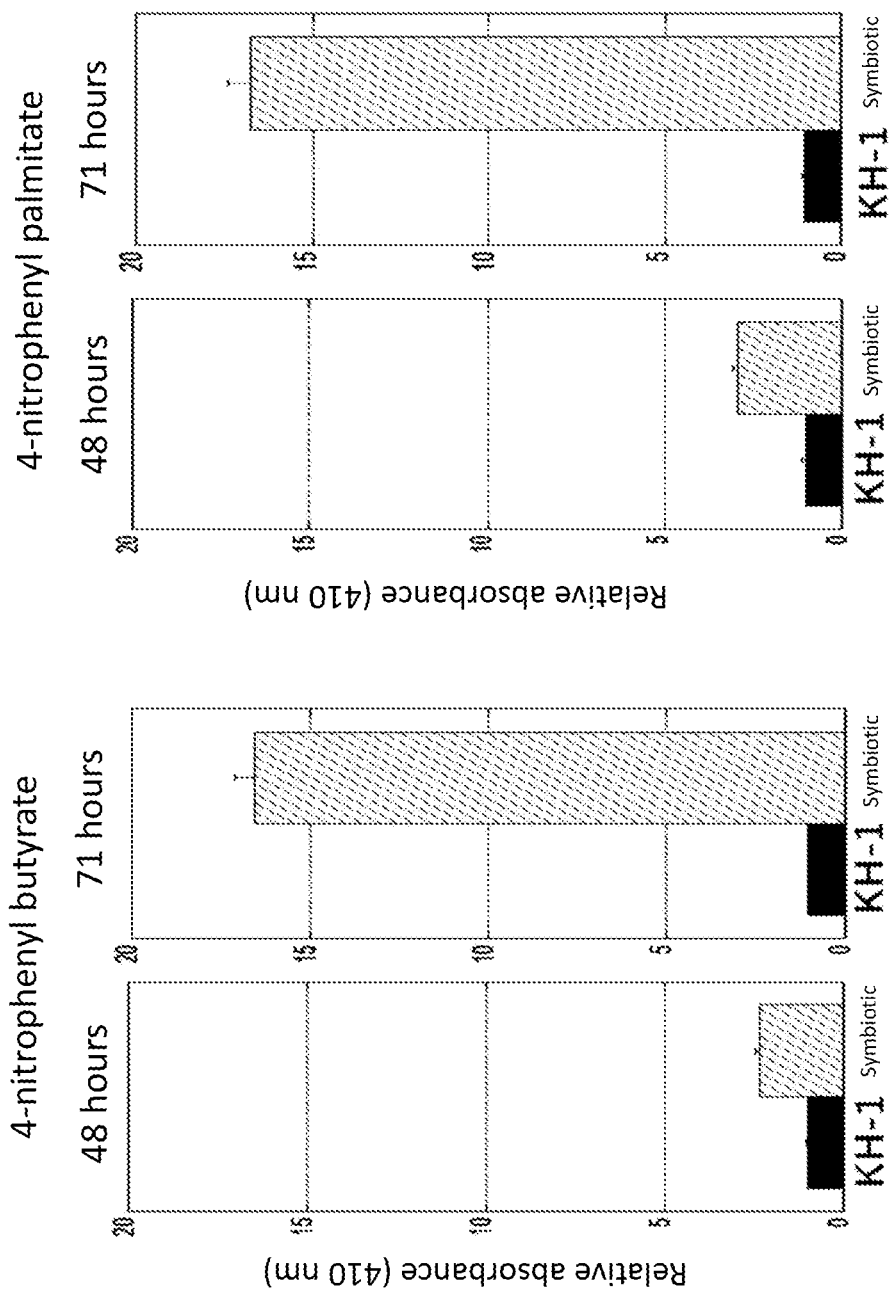

FIG. 20 shows the activity of a culture supernatant of a KH-1 strain alone or a symbiotic system of KH-1 strain+ KH-2 strain to decompose a model substrate (4-nitrophenyl butyrate and 4-nitrophenyl palmitate). The left panel shows the activity evaluated with 4-nitrophenyl butyrate, and the right panel shows the activity evaluated with 4-nitrophenyl palmitate. In each panel, the left side shows the result of 48 hour culture, and the right side shows the result of 71 hour culture. The vertical axis indicates the relative value of the absorbance in symbiotic system culture of KH-1 strain+ KH-2 strain considering the absorbance at 410 nm in single culture of the KH-1 strain as 1.

DESCRIPTION OF EMBODIMENTS

The present disclosure is described hereinafter while showing the best mode thereof. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. Further, the terms used herein should be understood as being used in the meaning that is commonly used in the art, unless specifically noted otherwise. Therefore, unless defined otherwise, all terminologies and scientific technical terms that are used herein have the same meaning as the general understanding of those skilled in the art to which the present disclosure pertains. In case of a contradiction, the present specification (including the definitions) takes precedence.

The definitions of the terms and/or basic technical concepts that are particularly used herein are described hereinafter when appropriate. Although the indication of "strain" in strain names such as a KH-1 strain may be omitted herein, those skilled in the art appropriately understand that there is an indication of strain depending on the context.

(Definitions, Etc.)

As used herein, "esterase" refers to a hydrolase that decomposes ester into acid and alcohol in a chemical reaction with water. As used herein, esterase typically refers to a hydrolase that decomposes fatty acid ester into fatty acid and alcohol in a chemical reaction with water.

As used herein, "lipase" refers to an enzyme, which is a type of esterase and reversibly catalyzes a reaction that hydrolyzes and decomposes neutral fat (glycerol ester) into fatty acid and glycerol. Examples of lipase include triglycerol lipase classified by an enzyme commission number (EC number) as EC 3.1.1.3.

As used herein, "symbiotic system" refers to a combination of a plurality of types of microorganisms existing in the same environment or system. "causing symbiosis" refers to causing a combination of a plurality of types of microorganisms to exist in the same environment or system. For example, a symbiotic system is used to mean any combination of a plurality of types of microorganisms that exist while being mixed in a certain composition, a plurality of types of microorganisms that exist while being carried on a carrier in a certain composition, and a plurality of types of microorganisms which is formed as a result of separately adding each microorganism species to a certain environment. In one embodiment, the microorganism species in a symbiotic system may be in a state in which they can be in contact with each other (including fusion and inclusion). In one embodiment, a symbiotic system can be in a state in which an environment resulting from the action (e.g., release, decomposition) by at least one microorganism species in the symbiotic system can be utilized by other microorganism species in the symbiotic system. In this case, a contact between said microorganism species may be possible, or may not be possible (for example, each microorganism is placed in the upstream and the downstream in the system). Examples of the environment resulting from the action by at least one microorganism species in the symbiotic system include an environment in which a certain component has been decreased, an environment in which a certain component (such as a component resulting from decomposition by a certain microorganism species or a secondary component resulting from the action (e.g., reaction) of this component) has been increased, and an environment in which a certain factor (such as pH) has been changed. Particularly, the case where a product resulting from decomposition of a chemical substance by one or more of microorganisms constituting a symbiotic system is a growth substrate such as a carbon source for other microorganism is a typical example of a symbiotic system. In a mixture system of microorganisms, since microorganisms having an ability to decompose/assimilate the same growth substrate are in a competitive relationship for the substrate in many cases, it is generally considered that a symbiotic system is difficult to establish. As used herein, "capable of symbiosis" refers to a combination of a plurality of types of microorganisms having an ability to be capable of forming a symbiotic system.

As used herein, "ability to decompose oil and fat calculated from a value of an ability to decompose oil and fat in single culture of each" refers to a numerical value obtained by calculation based on a value obtained with respect to the ability to decompose oil and fat of a single microorganism that constitutes a combination of microorganisms (e.g., a *Burkholderia* bacterium and a *Yarrowia* yeast) while taking into consideration the degree of contribution of each of the microorganisms in a mixture. Examples thereof typically include, but are not limited to, a value of an ability to decompose oil and fat calculated from the sum of values each obtained by multiplying a value of an ability to decompose oil and fat obtained based on a value of the result of culturing each of the microorganisms under the same condition (medium composition, time, temperature and the like) by a simple ratio. In this case, the above-described value may be expressed as the "sum of abilities to decompose oil and fat calculated from a value of an ability to decompose oil and fat in single culture of each". In other cases, a value which takes into consideration the degree of contribution based on the initial ratio in mixing may be used. In this case, the above-described value may be expressed as the "ability to decompose oil and fat calculated from an initial value of an ability to decompose oil and fat in single culture of each". For example, the "ability to decompose oil and fat calculated from a value of an ability to decompose oil and fat in single culture of each" of a combination consisting of one type of *Burkholderia* bacterium and one type of *Yarrowia* yeast wherein the total cell concentration is $1\times10^5$ cells/mL can be calculated by [(the ability to decompose oil and fat when $1\times10^5$ cells/mL of this *Burkholderia* bacterium are subjected to single culture)×(the mixing ratio of this *Burkholderia* bacterium)+(the ability to decompose oil and fat when $1\times10^5$ cells/mL of this *Yarrowia* yeast are subjected to single culture)×(the mixing ratio of this *Yarrowia* yeast)]. The cell concentration in single culture which is the basis of calculation is not particularly limited, can be suitably selected by those skilled in the art, and can be calculated by multiplying by a suitable coefficient (which may be 1). As another example, the ability may be calculated from a value of the ability to decompose oil and fat based on the amount of microorganisms that are initially added (the growth rate of microorganisms may be taken into consideration as needed). "Ability to decompose fatty acid calculated from a value of an ability to decompose fatty acid in single culture of each" and "sum of abilities to decompose fatty acid calculated from a value of an ability to decompose fatty acid in single culture of each" are also understood in the same context.

As used herein, "oil and fat" refers to an oily substance, including an ester group-containing compound formed by a dehydration condensation between a hydroxyl group-containing compound and fatty acid. While the hydroxyl group-containing compound is typically glycerin, other examples thereof include polyglycerin and the like. As used herein, an ester group-containing compound formed by a dehydration condensation between glycerin and fatty acid is referred to as "glyceride" in the same manner as the meaning that is generally used in the art. If the hydroxyl group-containing compound has a plurality of hydroxyl groups, the compound falls under the ester group-containing compound herein as long as at least one of the hydroxyl groups forms an ester by a dehydration condensation with a fatty acid. As used herein, oil and fat may include cis fatty acid-containing oil and fat, trans fatty acid-containing oil and fat, or both.

For example, kitchen wastewater produced by the restaurant industry, wastewater from a food factory, or the like contains oil and fat. Grease traps and dissolved air flotation apparatuses that are treatment facilities for removing oil and fat by solid-liquid separation are sources of foul odor or pests, and have many problems such as cost and labor associated with maintenance such as collection and transport of the separated oil entity and cleaning or cost of coagulants required for the same. The combination of microorganisms of the present disclosure and a composition or a combination providing the same can be used for eliminating oil entity within a grease trap or factory wastewater treatment facility.

The present disclosure provides a microbial formulation for a grease trap and for factory wastewater. When applied particularly to factory wastewater, the utilization ratio of a dissolved air flotation apparatus can be reduced or even replaced. Kitchen wastewater produced by the restaurant industry not only contains oil and fat at generally 1 g/L or greater and up to a high concentration of 10 g/L or greater, but also wastewater within many grease traps has a very short retention time of about 10 minutes. The microorganism of the present disclosure can also be used in such an environment.

Food waste, animal farming waste, sludge from wastewater treatment plants, and the like also contain a large amount of oil and fat. While treatment of such solid waste often utilizes microorganisms, high oil entity content results in difficulty in treatment and oil entity content remaining. The combination of microorganisms of the present disclosure and a composition or a combination providing the same can also be applied to decomposition treatment of oil entity content in such waste.

As used herein, "oil entity" includes oil and fat and fatty acid.

As used herein, "fatty acid" is a compound with 2 to 100 carbon atoms and at least one carboxyl group. Typically, a carbon chain in a fatty acid is linear, but can be branched or comprise a ring. Typically, a fatty acid comprises one carboxyl group, but can comprise a plurality of carboxyl groups. A carbon chain in a fatty acid can comprise a C=C double bond. "Trans fatty acid" is used in the meaning that is generally used in the art, referring to unsaturated fatty acid with a trans double bond.

As used herein, "trans fatty acid-containing oil and fat" refers to a compound formed by dehydration condensation between trans fatty acid and hydroxyl group-containing compound. Trans fatty acid encompasses elaidic acid, vaccenic acid, and the like, but when mentioned herein, the type of trans fatty acid is not particularly limited. The ratio of trans fatty acid that is present in trans fatty acid-containing oil and fat is not particularly limited. "Trans" and "cis" configurations of double bonds are used in the meaning that is generally used in the art. The following structure, where four substituents ($R_1$, $R_2$, $R_3$, and $R_4$) are bound to two carbon atoms forming a double bond

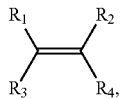

[Chemical Formula 1]

is referred to as a cis configuration if $R_1$ and $R_2$, or $R_3$ and $R_4$ are groups other than hydrogen, and the remaining two substituents are hydrogen atoms, and is referred to as a trans configuration if $R_1$ and $R_4$, or $R_3$ and $R_2$ are groups other than hydrogen, and the remaining two substituents are hydrogen atoms. Trans fatty acid is naturally present at a trace amount as conjugated linoleic acid or vaccenic acid. For example, fat content of ruminants contains a relatively large amount. Trans fatty acid can be generated in the hydrogenation process for manufacturing saturated fatty acid from unsaturated fatty acid and purification of vegetable oil containing a large amount of unsaturated fatty acid. For this reason, margarine, fat spread, shortening, and the like can contain a relatively large amount of trans fatty acid.

As used herein, "short-chain to medium-chain fatty acid-containing ester" refers to ester of fatty acid comprising one or more of short-chain fatty acid or medium-chain fatty acid. "Short-chain fatty acid", "medium-chain fatty acid", and "long-chain fatty acid" are used in the meaning that is generally used in the art, referring to fatty acid having 2 to 6 carbons, 7 to 12 carbons, and 13 or more carbons, respectively. Short-chain fatty acid encompasses acetic acid (2 carbons), butyric acid (4 carbons), caproic acid (6 carbons), and the like. Medium-chain fatty acid encompasses caprylic acid (8 carbons), capric acid (10 carbons), lauric acid (12 carbons), and the like. Long-chain fatty acid encompasses myristic acid (14 carbons), palmitic acid (16 carbons), palmitelaidic acid (16 carbons), stearic acid (18 carbons), oleic acid (18 carbons), elaidic acid (18 carbons), linoleic acid (18 carbons), vaccenic acid (18 carbons), linolenic acid (18 carbons), and the like.

As used herein, "normal hexane value" is the amount of nonvolatile substance extracted with normal hexane and refers to an indicator that indicates the amount of oil entity content (oil and fat, hydrolysate thereof, etc.) in water. A normal hexane value can be calculated, for example, in accordance with JIS K 0102. A normal hexane value can also be calculated by using a simple measuring reagent kit from measuring poly(N-isopropylacrylamide) extracted substances.

As used herein, "assimilation" refers to utilization as a nutrient source. The substance subjected to assimilation (e.g., oil and fat) is decomposed, and eliminated or decreased as a result.

As used herein, "decomposition", when used in the context of ester (e.g., oil and fat) and/or fatty acid, refers to causing subjected ester (e.g., oil and fat) and/or fatty acid to become smaller molecules, such as being degraded into glycerol and (free) fatty acid. Conversion of fatty acid into fatty acid with fewer carbon atoms and conversion into carbon dioxide and water are also referred to as decomposition.

As used herein, "ability to decompose ester" or "esterase activity" refers to the activity to hydrolyze ester into alcohols and acid (e.g., free fatty acid). For example, an "ability to decompose ester" or "esterase activity" may be measured by contacting a microorganism, a combination of microorganisms, or a culture supernatant thereof with ester of 4-nitrophenol and fatty acid and measuring the amount of 4-nitrophenol generated by a hydrolysis reaction, or may be measured in the same manner as measurement of the ability to decompose oil and fat as described herein. In addition, it is understood that an "ability to decompose short-chain to medium-chain fatty acid-containing ester" and an "ability to decompose short-chain to long-chain fatty acid-containing oil and fat", which are more specific abilities of the "ability to decompose ester" or "esterase activity", can also be measured in the same manner.

As used herein, (a microorganism or the like) "having lipase activity" refers to having the activity to hydrolyze oil and fat generated from a dehydration condensation between glycerol and fatty acid into glycerol and free fatty acid. Such lipase activity is also referred to as triglyceride lipase activity as used herein. For example, the presence or absence of lipase activity can be confirmed by a decrease in oil and fat (such as animal and vegetable oil such as canola oil, or triolein) contained in a medium added with a microorganism.

As used herein, a microorganism "which produces lipase" refers to a microorganism which extracellularly or intracellularly produces lipase. Particularly, when lipase is extracellularly produced, it is referred to as secreting lipase or secreting and producing lipase. In this case, secreted lipase may be released into an external environment away from a microbial cell, or may stay on a cell surface layer by some type of interaction with the cell surface layer. For example, a microorganism which produces lipase can be measured and identified by the following decomposition tests. It is sufficient to show the ability to decompose in one of the following tests. Decomposition does not necessarily need to be observed in all of the tests.

- test for checking whether microorganisms have the ability to assimilate oil and fat at a predetermined temperature (e.g., 15° C., 28° C.);
- test for checking whether a clear zone is observed around a colony formed on an agar medium containing oil and fat at a predetermined temperature (e.g., 15° C., 28° C.);
- test for culturing microorganisms by providing oil and fat as a carbon source at a predetermined temperature (e.g., 15° C., 28° C.) and measuring the amount of decrease in the normal hexane value in the culture supernatant;
- test for culturing microorganisms by providing oil and fat as a carbon source at a predetermined temperature (e.g., 15° C., 28° C.) and measuring the change over time in the amount of oil and fat and free fatty acid in the culture supernatant by thin-layer chromatography. The microorganisms have the ability to decompose if the amount of oil and fat decreases with passage of time. Alternatively, the microorganisms are considered as having the ability to decompose once the amount of free fatty acid increases;
- test for culturing microorganisms by providing oil and fat as a carbon source at a predetermined temperature (e.g., 15° C., 28° C.) and measuring the concentration of free fatty acid in the culture supernatant by instrumental analysis such as gas chromatography, gas chromatography mass spectrometry, or nigh performance liquid chromatography. The microorganisms are considered as having the ability to decompose once the amount of free fatty acid increases;
- test for preparing a test water comprising oil and fat as the primary organic matter (e.g., 70% by weight or greater among all organic mattes) and measuring the biochemical oxygen demand (BOD);

analyzing the protein in the culture supernatant or cultured cell by electrophoresis or mass spectrometry and checking whether lipase is contained;

Confirming the expression of the lipase gene in a microorganism by quantifying or detecting the mRNA thereof; and analyzing the "lipase activity" of a microorganism, a combination of microorganisms, or a culture supernatant thereof in accordance with the measurement method of "esterase activity" described above.

The present specification provides more detailed individual measuring methods. Those skilled in the art can also perform such measurements by using any other equipment or condition.

As used herein, "ability to decompose ester at 15° C." refers to (a microorganism or the like) having the activity to hydrolyze ester into alcohols and acid at a low temperature. The ability to decompose oil and fat at 15° C. may be measured by contacting the microorganism of the present disclosure (including a derivative strain of a KH-2 strain) with ester of 4-nitrophenol and acid (e.g., free fatty acid) at 15° C. and measuring the amount of 4-nitrophenol generated by a hydrolysis reaction, or may be measured in the same manner as measurement of the ability to decompose oil and fat at 15° C. as described herein.

As used herein, "ability to decompose oil and fat at 15° C." refers to (a microorganism or the like) having the activity to hydrolyze oil and fat into glycerol and free fatty acid at a low temperature. The ability to decompose oil and fat at 15° C. can be measured and identified by the following tests. It is sufficient to show the ability to decompose in one of the following tests. Decomposition does not necessarily need to be observed in all of the tests.

test for checking whether microorganisms have the ability to assimilate oil and fat at 15° C.;

test for checking whether a clear zone is observed around a colony formed on an agar medium containing oil and fat at 15° C.;

test for culturing microorganisms at 15° C. by providing oil and fat as a carbon source and measuring the amount of decrease in the normal hexane value in the culture supernatant;

test for culturing microorganisms at 15° C. by providing oil and fat as a carbon source and measuring the change over time in the amount of oil and fat and free fatty acid in the culture supernatant by thin-layer chromatography. The microorganisms have the ability to decompose if the amount of oil and fat decreases with passage of time. Alternatively, the microorganisms are considered as having the ability to decompose once the amount of free fatty acid increases;

test for culturing microorganisms at 15° C. by providing oil and fat as a carbon source and measuring the concentration of free fatty acid in the culture supernatant by instrumental analysis such as gas chromatography, gas chromatography mass spectrometry, or high performance liquid chromatography. The microorganisms are considered as having the ability to decompose once the concentration of free fatty acid increases; and test for preparing a test water comprising oil and fat as the primary organic matter (e.g., 70% by weight or greater among all organic mattes) and measuring the biochemical oxygen demand (BOD).

The present specification provides more detailed individual measuring methods. Those skilled in the art can also perform such measurements by using any other equipment or condition.

As used herein, "ability to assimilate trans fatty acid-containing oil and fat" refers to activity to assimilate trans fatty acid-containing oil and fat. As used herein, "assimilate trans fatty acid-containing oil and fat" is used in the meaning that is generally used in the art, referring to microorganisms taking in trans fatty acid-containing oil and fat as a nutrient source such as a carbon source. "Assimilate" also includes hydrolysis into glycerol and free fatty acid as well a change to a part of another substance. The ability to assimilate trans fatty acid-containing oil and fat can be measured and identified by the following tests. It is sufficient to show the ability to assimilate in one of the following tests. Assimilation does not necessarily need to be observed in all of the tests.

test for checking whether microorganisms can grow in a medium comprising trans fatty acid-containing oil and fat as the sole carbon source;

test for checking whether a colony is formed in a medium comprising trans fatty acid-containing oil and fat as the sole carbon source;

test for measuring, with the growth, a decrease in the normal hexane value in the culture supernatant;

test for measuring, with the growth, the total amount of the total fatty acids (sum of fatty acid in oil and fat and free fatty acid) in the culture supernatant after conversion into methyl ester by gas chromatography; and test for measuring, with the growth, the amount of oil and fat and free fatty acid in the culture supernatant by thin-layer chromatography.

The present specification provides more detailed individual measuring methods. Those skilled in the art can also perform such measurements by using any other equipment or condition.

As used herein, "ability to decompose trans fatty acid-containing oil and fat" refers to activity to hydrolyze trans fatty acid-containing oil and fat into glycerol and free fatty acid. The ability to decompose trans fatty acid-containing oil and fat can be measured and identified by the following tests. It is sufficient to show the ability to decompose in one of the following tests. Decomposition does not necessarily need to be observed in all of the tests.

test for checking whether microorganisms have the ability to assimilate trans fatty acid-containing oil and fat;

test for measuring the amount of oil and fat and free fatty acid in the culture supernatant by thin-layer chromatography;

test for culturing microorganisms by providing trans fatty acid-containing oil and fat as a carbon source and measuring the amount of decrease in the normal hexane value in the culture supernatant;

test for measuring the concentration of free fatty acid and fatty acid in oil and fat contained in the culture supernatant after conversion into methyl ester by gas chromatography;

test for measuring the concentration of free fatty acid in the culture supernatant by gas chromatography mass spectrometry;

test for measuring the concentration of free fatty acid in the culture supernatant by high performance liquid chromatography;

test for checking whether a clear zone is observed around a colony formed on an agar medium containing trans fatty acid-containing oil and fat; and test for preparing a test water comprising trans fatty acid-containing oil and fat as the primary organic matter (e.g., 70% by weight or greater among all organic matters) and measuring the biochemical oxygen demand (BOD).

The present specification provides more detailed individual measuring methods. Those skilled in the art can also perform such measurements by using any other equipment or condition.

As used herein, "ability to assimilate trans fatty acid" refers to the ability to assimilate trans fatty acid (e.g., elaidic acid, palmitelaidic acid, and/or vaccenic acid). The ability to assimilate trans fatty acid can be measured and identified by the following tests. It is sufficient to show the ability to assimilate in one of the following tests. Assimilation does not necessarily need to be observed in all of the tests.

- test for checking whether microorganisms can grow in a medium comprising trans fatty acid as the sole carbon source;
- test for checking whether a colony is formed in a medium comprising trans fatty acid as the sole carbon source;
- test for culturing microorganisms by providing trans fatty acid as a carbon source and measuring, with the growth, a decrease in the normal hexane value in the culture supernatant;
- test for measuring, with the growth, the concentration of trans fatty acid in the culture supernatant by gas chromatography;
- test for measuring, with the growth, the concentration of trans fatty acid in the culture supernatant by gas chromatography mass spectrometry;
- test for measuring, with the growth, the concentration of trans fatty acid in the culture supernatant by high performance liquid chromatography; and
- test for measuring, with the growth, the amount of trans fatty acid in the culture supernatant by thin-layer chromatography.

The present specification provides more detailed individual measuring methods. Those skilled in the art can also perform such measurements by using any other equipment or condition.

As used herein, "ability to decompose trans fatty acid" refers to the ability to decompose trans fatty acid (e.g., elaidic acid, palmitelaidic acid, and/or vaccenic acid). The ability to decompose trans fatty acid can be measured and identified by the following tests. It is sufficient to show the ability to decompose in one of the following tests. Decomposition does not necessarily need to be observed in all of the tests.

- test for checking whether microorganisms have the ability to assimilate trans fatty acid;
- test for measuring the amount of trans fatty acid in the culture supernatant by thin-layer chromatography;
- test for culturing microorganisms by providing trans fatty acid as a carbon source and measuring a decrease in the normal hexane value in the supernatant;
- test for measuring the concentration of trans fatty acid in the culture supernatant by gas chromatography;
- test for measuring the concentration of trans fatty acid in the culture supernatant by gas chromatography mass spectrometry;
- test for measuring the concentration of trans fatty acid in the culture supernatant by high performance liquid chromatography;
- test for checking whether a clear zone is observed around a colony formed in an agar medium containing trans fatty acid; and
- test for preparing a test waster comprising trans fatty acid as the primary organic matter (e.g., 70% by weight or greater among all organic mattes) and measuring the biochemical oxygen demand (BOD).

The present specification provides more detailed individual measuring methods. Those skilled in the art can also perform such measurements by using any other equipment or condition.

As used herein, "ability to assimilate oil and fat" refers to activity to assimilate oil and fat. As used herein, "assimilate oil and fat" is used in the meaning that is generally used in the art, referring to microorganisms taking in oil and fat or a decomposition product thereof as a nutrient source such as a carbon source. "Assimilate" also includes hydrolysis into glycerol and free fatty acid as well a change to a part of another substance. The ability to assimilate oil and fat can be measured and identified by the following tests. It is sufficient to show the ability to assimilate in one of the following tests. Assimilation does not necessarily need to be observed in all of the tests.

- test for checking whether microorganisms can grow in a medium comprising oil and fat as the sole carbon source;
- test for checking whether a colony is formed in a medium comprising oil and fat as the sole carbon source;
- test for measuring, with the growth, a decrease in the normal hexane value in the culture supernatant;
- test for measuring, with the growth, the total amount of the total fatty acids (sum of fatty acid in oil and fat and free fatty acid) in the culture supernatant after conversion into methyl ester by gas chromatography; and
- test for measuring, with the growth, the amount of oil and fat and free fatty acid in the culture supernatant by thin-layer chromatography.

The present specification provides more detailed individual measuring methods. Those skilled in the art can also perform such measurements by using any other equipment or condition.

As used herein, "ability to decompose oil and fat" refers to activity to hydrolyze oil and fat into glycerol and free fatty acid. The ability to decompose oil and fat can be measured and identified by the following tests. It is sufficient to show the ability to decompose in one of the following tests. Decomposition does not necessarily need to be observed in all of the tests.

- test for checking whether microorganisms have the ability to assimilate oil and fat;
- test for measuring the amount of oil and fat and free fatty acid in the culture supernatant by thin-layer chromatography;
- test for culturing microorganisms by providing oil and fat as a carbon source and measuring the amount of decrease in the normal hexane value in the culture supernatant;
- test for measuring the concentration of free fatty acid and fatty acid in oil and fat contained in the culture supernatant after conversion into methyl ester by gas chromatography;
- test for measuring the concentration of free fatty acid in the culture supernatant by gas chromatography mass spectrometry;
- test for measuring the concentration of free fatty acid in the culture supernatant by high performance liquid chromatography;
- test for checking whether a clear zone is observed around a colony formed on an agar medium containing oil and fat; and
- test for preparing a test water comprising fatty acid-containing oil and fat as the primary organic matter (e.g., 70% by weight or greater among all organic matters) and measuring the biochemical oxygen demand (BOD).

The present specification provides more detailed individual measuring methods. Those skilled in the art can also perform such measurements by using any other equipment or condition.

As used herein, "ability to assimilate fatty acid" refers to the ability to assimilate fatty acid. The ability to assimilate fatty acid can be measured and identified by the following tests. It is sufficient to show the ability to assimilate in one of the following tests. Assimilation does not necessarily need to be observed in all of the tests.

- test for checking whether microorganisms can grow in a medium comprising fatty acid as the sole carbon source;
- test for checking whether a colony is formed in a medium comprising fatty acid as the sole carbon source;
- test for culturing microorganisms by providing fatty acid as a carbon source and measuring, with the growth, a decrease in the normal hexane value in the culture supernatant;
- test for measuring, with the growth, the concentration of fatty acid in the culture supernatant by gas chromatography;
- test for measuring, with the growth, the concentration of fatty acid in the culture supernatant by gas chromatography mass spectrometry;
- test for measuring, with the growth, the concentration of fatty acid in the culture supernatant by high performance liquid chromatography; and
- test for measuring, with the growth, the amount of fatty acid in the culture supernatant by thin-layer chromatography.

The present specification provides more detailed individual measuring methods. Those skilled in the art can also perform such measurements by using any other equipment or condition.

As used herein, "ability to decompose fatty acid" refers to the ability to decompose fatty acid. The ability to decompose fatty acid can be measured and identified by the following tests. It is sufficient to show the ability to decompose in one of the following tests. Decomposition does not necessarily need to be observed in all of the tests.

- test for checking whether microorganisms have the ability to assimilate fatty acid;
- test for measuring the amount of fatty acid in the culture supernatant by thin-layer chromatography;
- test for culturing microorganisms by providing fatty acid as a carbon source and measuring a decrease in the normal hexane value in the supernatant;
- test for measuring the concentration of fatty acid in the culture supernatant by gas chromatography;
- test for measuring the concentration of fatty acid in the culture supernatant by gas chromatography mass spectrometry;
- test for measuring the concentration of fatty acid in the culture supernatant by high performance liquid chromatography;
- test for checking whether a clear zone is observed around a colony formed in an agar medium containing fatty acid; and
- test for preparing a test waster comprising fatty acid as the primary organic matter (e.g., 70% by weight or greater among all organic mattes) and measuring the biochemical oxygen demand (BOD).

The present specification provides more detailed individual measuring methods. Those skilled in the art can also perform such measurements by using any other equipment or condition.

As used herein, "oil entity treating component" refers to a component that assists in the assimilation and decomposition of oil and fat and/or fatty acid. Specific examples thereof include components that promote dispersion of oil and fat and/or fatty acid such as surfactants, components that decompose oil and fat into fatty acid and glycerol, components that decompose fatty acid, components that decompose glycerol, as well as components that adsorb and remove oil entity from a subject of treatment, and the like.

As used herein, "oil entity decomposing agent" refers to a formulation that is capable of decomposing oil and fat and/or fatty acid alone or in the combination of microorganisms of the present disclosure, comprising the microorganism of the present disclosure or at least one microorganism of the combination of microorganisms of the present disclosure as an active ingredient. Even if a formulation that is capable of decomposing oil and fat and/or fatty acid in the combination of microorganisms of the present disclosure is a composition comprising only one microorganism (e.g., either a *Burkholderia bacterium* or a *Yarrowia* yeast) of the combination of microorganisms of the present disclosure, wherein the composition itself does not exhibit a desired ability to decompose oil and fat and/or fatty acid, this composition can be an oil entity decomposing agent if the composition exhibits a desired ability to decompose oil and fat and/or fatty acid when the composition is used to form the combination of microorganisms of the present disclosure. In the present disclosure, an oil entity decomposing agent can be used in combination with an oil entity treating component. The timing of combined use of an oil entity decomposing agent and an oil entity treating component in such a case can be simultaneous use, or one can be used before the other. An oil entity decomposing agent can further contain a component (e.g., carbon source or nitrogen source) for enhancing the activity of the microorganism strain that is used or esterase (e.g., lipase) derived from the microorganism strain, surfactant, dry protection agent, component for maintaining microorganisms for a long period of time, antiseptic, excipient, reinforcing agent, antioxidant, or the like.

A "derivative strain", "similar strain", or "mutant strain" as used herein preferably, but is not intended to be limited to, comprises a gene (e.g., 16S rDNA or 26S rDNA) comprising a region that is substantially homologous to a DNA of the target microorganism. In various embodiments, such a strain has a full genomic sequence that is at least 30%, 40%, 50%, 60%, 70%, 80%, 90%, 95%, or 99% identical in comparison to the full genomic sequence of the original strain after alignment with a computer homology program that is known in the art. This refers to a microorganism altered by a mutation, substitution, deletion, and/or addition to a gene, wherein the derivative strain still exhibits the biological function of the original microorganism, but not necessarily to the same degree. In one embodiment, a microorganism having a biological function (e.g., the ability to decompose oil entity, the ability to reinforce the lipase production or the ability to decompose oil entity of the other microorganism, or the like) that is equal to or greater than that of the original microorganism is provided as such a derivative strain, similar strain, or mutant strain in the present disclosure. For example, a gene mutation can be introduced by using any known mutagen, UV, plasma, or the like. In one embodiment, a "derivative strain", "similar strain", or "mutant strain" is a strain of the same genus and/or species as the original strain. For example, the biological function of such a microorganism can be examined by a suitable and available in vitro assay that is described herein or known in the art. As used herein, "similarity" of genes or base sequences refers to the degree of similarity of two or more genetic sequences with one another and refers to a high degree of similarity with another sequence with identity. "Similarity" is a numerical value that takes into account similar bases in addition to identity into the calculation. In this regard, a similar base refers to instances with a partial match in a mixed base (e.g., R=A+G, M=A+C, W=A+T, S=C+G, Y=C+T, K=G+T, H=A+T+C, B=G+T+C, D=G+A+T, V=A+C+G, N=A+C+G+T).

As used herein, "protein", "polypeptide", "oligopeptide", and "peptide" are used herein to have the same meaning and refer to a polymer of amino acids with any length. The polymer may be linear, branched, or cyclic. An amino acid may be a naturally-occurring, non-naturally-occurring, or altered amino acid. The terms may also encompass those assembled into a complex of multiple polypeptide chains. The terms also encompass naturally-occurring or artificially modified amino acid polymers. Examples of such an alteration include disulfide bond formation, glycosylation, lipidation, acetylation, phosphorylation, or any other manipulation or alteration (e.g., conjugation with a labeling component). The definition also encompasses, for example, polypeptides comprising one or more analogs of an amino acid (e.g., including non-naturally-occurring amino acids and the like), peptide-like compounds (e.g., peptoids), and other known alterations in the art. As used herein, "amino acid" is a general term for organic compounds with an amino group and a carboxyl group. When a protein or enzyme according to an embodiment of the present disclosure comprises a "specific amino acid sequence", any of the amino acids in the amino acid sequence may be chemically modified. Further, any of the amino acids in the amino acid sequence may be forming a salt or a solvate. Further, any of the amino acids in the amino acid sequence may have an L form or a D form. Even for such cases, the protein according to an embodiment of the present disclosure is considered as comprising the "specific amino acid sequence" described above. Examples of known chemical modifications applied to an amino acid comprised in a protein in vivo include modifications of the N-terminus (e.g., acetylation, myristoylation, and the like), modifications of the C-terminus (e.g., amidation, addition of glycosylphosphatidylinositol and the like), modifications of a side chain (e.g., phosphorylation, glycosylation, and the like) and the like. An amino acid may be naturally-occurring or non-naturally-occurring, as long as the objective of the present disclosure is met.

As used herein, "polynucleotide", "oligonucleotide", and "nucleic acid" are used herein to have the same meaning and refer to a polymer of nucleotides of any length. The terms also encompass "oligonucleotide derivative" or "polynucleotide derivative". "Base sequence" or "nucleic acid sequence" means the order of contiguous nucleic acid bases in a "polynucleotide", an "oligonucleotide", or a "nucleic acid". The "oligonucleotide derivative" and "polynucleotide derivative" are interchangeably used and refer to an oligonucleotide or polynucleotide comprising a derivative of a nucleotide or having a bond between nucleotides that is different from ordinary bonds. Specific examples of such oligonucleotides include: 2'-O-methyl-ribonucleotide; oligonucleotide derivatives with a phosphodiester bond in an oligonucleotide converted into phosphorothioate bond; oligonucleotide derivatives with a phosphodiester bond in an oligonucleotide converted into an N3'-P5' phosphoramidate bond; oligonucleotide derivatives with a ribose and a phosphodiester bond in an oligonucleotide converted into a peptide nucleic acid bond; oligonucleotide derivatives with a uracil in an oligonucleotide substituted with a C-5 propynyl uracil; oligonucleotide derivatives with a uracil in an oligonucleotide substituted with a C-5 thiazole uracil; oligonucleotide derivatives with a cytosine in an oligonucleotide substituted with a C-5 propynyl cytosine; oligonucleotide derivatives with a cytosine in an oligonucleotide substituted with a phenoxazine-modified cytosine; oligonucleotide derivatives with a ribose in DNA substituted with a 2'-O-propylribose; oligonucleotide derivatives with a ribose in an oligonucleotide substituted with a 2'-methoxyethoxy ribose; and the like. Unless noted otherwise, specific base sequences are intended to encompass sequences that are explicitly set forth, as well as their conservatively altered variants (e.g., degenerate codon substitutes) and complementary sequences. Specifically, a degenerate codon substitute can be achieved by making a sequence in which the third position of one or more selected (or all) codons is substituted with a mixed base and/or deoxyinosine residue (Batzer et al., Nucleic Acid Res. 19: 5081 (1991); Ohtsuka et al., J. Biol. Chem. 260: 2605-2608 (1985); Rossolini et al., Mol. Cell. Probes 8: 91-98 (1994)). As used herein, "nucleic acid" is also interchangeably used with gene, cDNA, mRNA, oligonucleotide, and polynucleotide. As used herein, "nucleotide" may be naturally-occurring or non-naturally-occurring.

As used herein, "gene" refers to an agent that defines a genetic trait. A "gene" may refer to a "polynucleotide", "oligonucleotide", and "nucleic acid".

As used herein, "homology" of genes refers to the degree of identity of two or more genetic sequences with respect to one another, and having "homology" generally refers to having a high degree of identity or similarity. Therefore, the identity or similarity of sequences is higher when homology of two genes is high. Whether two types of genes have homology can be found by direct comparison of sequences or by a hybridization method under stringent conditions for nucleic acids. When two genetic sequences are directly compared, the genes are homologous typically if DNA sequences are at least 50% identical, preferably at least 70% identical, and more preferably at least 80%, 90%, 95%, 96%, 97%, 98%, or 99% identical between the genetic sequences.

Amino acids may be mentioned herein by either their commonly known three letter symbols or their one character symbols recommended by the IUPAC-IUB Biochemical Nomenclature Commission. Similarly, nucleotides may be mentioned by their commonly recognized one character codes. Comparison of similarity, identity, and homology of an amino acid sequence and a base sequence is calculated herein by using a sequence analysis tool BLAST with default parameters. For example, identity can be searched using BLAST 2.7.1 (published on Oct. 19, 2017) of the NCBI. Herein, values for "identity" generally refer to a value obtained when aligned under the default conditions using BLAST described above. However, when a higher value is obtained by changing a parameter, the highest value is considered the value of identity. When identity is evaluated in a plurality of regions, the highest value thereamong is considered the value of identity. "Similarity" is a value calculated by taking into consideration a similar amino acid in addition to identity.

In one embodiment of the present disclosure, the numerical value of identity or the like, i.e., "70% or greater", can be, for example, 70% or greater, 75% or greater, 80% or greater, 85% or greater, 90% or greater, 95% or greater, 96% or greater, 97% or greater, 98% or greater, 99% or greater, or 100% or greater, or within a range between any two of numerical values of such starting points. The "identity" described above computes the ratio of the number of homologous amino acids or bases in two or more amino acids or base sequences in accordance with a known method described above. Specifically, amino acids or base sequences in a group of amino acids or base sequences to be compared are aligned before computing the ratio, and a space is introduced in a part of the amino acids or base sequences if needed to maximize the ratio of identical amino acids or bases. A method for alignment, ratio computation method, comparison method, and computer program associated therewith are conventional and well known in the art (e.g., aforementioned BLAST or the like). As used herein, "identity" and "similarity" can be represented by a value measured by NCBI's BLAST, unless specifically noted otherwise. Blastp can be used with the default settings as the algorithm for comparing amino acids or base sequences with BLAST. Measurement results are quantified as Positives or Identities. When "similarity" is used instead of "identity" in such a case, the numerical value also takes into consideration those that fall under the definition of "similar" "amino acid" or "base" described herein. As used herein, polynucleotides, oligonucleotides, nucleic acids, peptides, or proteins having homology, identity, and/or similarity in the sequences therebetween can be referred to as "variant" with respect to one another.

As used herein, "polynucleotide which hybridizes under a stringent condition" refers to commonly used, well-known conditions in the art. Such a polynucleotide can be obtained by using colony hybridization, plaque hybridization, Southern blot hybridization, or the like while using a polynucleotide selected from the polynucleotides of the present disclosure as a probe. Specifically, the polynucleotide refers to a polynucleotide that can be identified by using a filter with immobilized DNA from a colony or plaque and performing hybridization at 65° C. in the presence of 0.7 to 1.0 M NaCl, and then using an SSC (saline-sodium citrate) solution with 0.1 to 2× concentration (composition of an SSC solution with 1× concentration is 150 mM sodium chloride and 15 mM sodium citrate) to wash the filter under the condition of 65° C. For "stringent condition", the following are examples of conditions that can be used. (1) low ionic strength and a high temperature are used for washing (e.g., 0.015 M sodium chloride/0.0015 M sodium citrate/0.1% sodium dodecyl sulfate at 50° C.), (2) a denaturing agent such as formamide is used in hybridization (e.g., 50% (v/v) formamide, 0.1% bovine serum albumin/0.1% ficoll/0.1% polyvinyl pyrrolidone/50 mM sodium phosphate buffer with a pH of 6.5, 750 mM sodium chloride, and 75 mM sodium citrate at 42° C.), or (3) a solution comprising 20% formamide, 5×SSC, 50 mM sodium phosphate (pH of 7.6), 5×Denhardt's solution, 10% dextran sulfate, and 20 mg/ml denatured sheared salmon sperm DNA is incubated overnight at 37° C. and then a filter is washed with 1×SSC at about 37 to 50° C. The formamide concentration may be 50% or greater. Washing time can be 5, 15, 30, 60, or 120 minutes or longer. A plurality of elements such as temperature and salt concentration are conceivable as elements affecting the stringency of hybridization reactions. Ausubel et al., Current Protocols in Molecular Biology, Wiley Interscience Publishers, (1995) can be referred for details. "Highly stringent condition" is, for example, 0.0015 M sodium chloride, 0.0015 M sodium citrate, and 65 to 68° C. or 0.015 M sodium chloride, 0.0015 M sodium citrate, 50% formamide, and 42° C. Hybridization can be performed in accordance with the method described in experimental publications such as Molecular Cloning 2nd ed., Current Protocols in Molecular Biology, Supplement 1-38, DNA Cloning 1: Core Techniques, A Practical Approach, Second Edition, Oxford University Press (1995). In this regard, a sequence comprising only an A sequence or only a T sequence is preferably excluded from a sequence that hybridizes under a stringent condition. A moderately stringent condition can be readily determined by those skilled in the art based on, for example, the length of a DNA, and is shown in Sambrook et al., Molecular Cloning: A Laboratory Manual, Third Ed., Vol. 1, 7.42-7.45 Cold Spring Harbor Laboratory Press, 2001, including, for a nitrocellulose filters, use of hybridization conditions of a pre-wash solution of 1.0 mM EDTA (pH of 8.0), 0.5% SDS, and 5×SSC, and about 50% formamide and 2×SSC to 6×SSC at about 40 to 50° C. (or other similar hybridization solutions such as a Stark's solution in about 50% formamide at about 42° C.) and washing conditions of 0.5×SSC, 0.1% SDS at about 60° C. Thus, the polypeptides used in the present disclosure also encompass polypeptides encoded by a nucleic acid molecule that hybridizes under highly or moderately stringent conditions to a nucleic acid molecule encoding a polypeptide described in the present disclosure in particular.

As used herein, "biological function" refers to a specific function that a certain microorganism can have in the context of the microorganism. Examples thereof include, but are not limited to, decomposition (e.g., decomposition at a low temperature) of ester (e.g., oil and fat), production of lipase, decomposition of oil entity, the ability to enhance lipase production of other microorganisms, the ability to enhance the oil entity decomposition activity of other microorganisms, and the like. A biological function can be exerted by a corresponding "biological activity" herein. As used herein, "biological activity" refers to activity that a certain microorganism can have under a certain environment, and encompasses activities exerting various functions (e.g., activity to decompose oil entity at 15° C.). Such a biological activity can be measured by technologies that are well known in the art. Therefore, "activity" refers to various measurable indicators that affect a response (i.e., has a measurable effect in response to some exposure or stimulation), and can include, for example, the amount of a protein upstream or downstream after some stimulation or event or other similar scales of function of the microorganism of the present disclosure.

As used herein, the "amount" of an analyte in a sample generally refers to an absolute value reflecting the mass of the analyte that can be detected in a volume of the sample. However, amount is also intended as a relative amount as compared to the amount of another analyte. For example, the amount of an analyte in a sample can be an amount that is greater than a control level or a normal level of an analyte that is generally present in the sample.

The term "about" refers to the indicated value plus or minus 10%.

As used herein, "kit" refers to a unit providing parts to be provided (e.g., composition comprising the microorganism of the present disclosure, additional component, buffer, user manual, and the like) which are generally separated into two or more segments. Such a kit form is preferred when providing a composition, which should not be provided in a mixed state for stability or the like and is preferably used by mixing immediately prior to use. Preferably, such a kit advantageously comprises an instruction or user manual describing how the provided parts (e.g., composition comprising a microorganism or addition component) or the like are used or how the parts should be processed. When a kit is used herein, the kit generally comprises an instruction or the like describing the method of use of the microorganism or composition of the present disclosure, or the like.

As used herein, "instruction" is a document to explain the method of use of the microorganism of the present disclosure or the combination of microorganisms of the present disclosure to users. The instruction provides description for instructing the method of use of the microorganism of the present disclosure or the combination of microorganisms of the present disclosure. If required, the instruction is prepared in accordance with a format specified by a regulatory authority of the country in which the method of the present disclosure is practiced (e.g., Ministry of Health, Labour and Welfare, Ministry of Agriculture, Forestry and Fisheries, or the like in Japan, Food and Drug Administration (FDA) or Department of Agriculture (USDA) in the U.S., or the like), with an explicit description showing approval by the regulatory authority. An instruction can be provided in, but not limited to, paper media. An instruction can also be provided in a form such as electronic media (e.g., web sites provided on the Internet or emails).

(Preferred Embodiments)

Preferred embodiments of the present disclosure are described below. Embodiments provided below are provided to facilitate the understanding of the present disclosure. It is understood that the scope of the present disclosure should not be limited to the following descriptions. Thus, it is apparent that those skilled in the art can make appropriate modifications within the scope of the present disclosure by referring to the descriptions herein. It is understood that the following embodiments of the present disclosure can be used alone or in combination.

(Microorganism Having a New Ability)

In one aspect, the present disclosure provides a microorganism having an ability that was newly found with respect to decomposition of oil and fat and/or fatty acid. In particular, the microorganism of the present disclosure has one or more features of the following: having lipase activity for triglyceride comprising long-chain fatty acid (fatty acid comprising 13 or more carbon atoms (e.g., fatty acid comprising 14 to 22 carbon atoms)); having higher hydrolysis activity for 4-nitrophenyl ester of short-chain to medium-chain fatty acid (fatty acid comprising 2 to 12 carbon atoms) than hydrolysis activity for 4-nitrophenyl ester of long-chain fatty acid; having an ability to decompose short- to long-chain fatty acid (fatty acid comprising 2 or more carbon atoms)-containing oil and fat; having an ability to decompose short- to medium-chain fatty acid (fatty acid comprising 2 to 12 carbon atoms)-containing ester; having an ability to assimilate ester (e.g., oil and fat) and/or fatty acid at 15° C.; having an ability to decompose ester (e.g., oil and fat) and/or fatty acid at 15° C.; having an ability to assimilate trans fatty acid-containing oil and fat; having an ability to decompose trans fatty acid-containing oil and fat; having an ability to assimilate trans fatty acid (e.g., elaidic acid, palmitelaidic acid, and/or vaccenic acid); and/or having an ability to decompose trans fatty acid (e.g., elaidic acid, palmitelaidic acid, and/or vaccenic acid); having an ability to improve lipase production of a *Burkholderia bacterium*; and having an ability to improve the ability to decompose fatty acid and/or oil and fat of a *Burkholderia bacterium*. In one aspect, the present disclosure provides a new microorganism with an ability to decompose ester (e.g., oil and fat). The microorganism of the present disclosure can have a wide range of hydrolysis activity for oil and fat of short-chain to long-chain fatty acid. In one aspect, the present disclosure provides a new microorganism having an ability to improve the lipase production and/or the ability to decompose oil entity (including fatty acid and oil and fat) of a *Burkholderia bacterium* when combined with a *Burkholderia bacterium*.

In one embodiment, the microorganism of the present disclosure is a yeast in the genus *Yarrowia*. Microorganisms in the genus *Yarrowia* are eumycetes, whose trophozoite shows unicellularity during a certain period of a life cycle. Microorganisms in the genus *Yarrowia* have a cell wall. In terms of the form, microorganisms in the genus *Yarrowia* have a round shape or an oval shape that is less characteristic. The genus *Yarrowia* includes species such as bubula, deformans, *lipolytica*, porcina, and yakushimensis. In one embodiment, the microorganism of the present disclosure is *Yarrowia lipolytica*. The inventors identified a new bacterial strain of a microorganism that was found by studying the ability to decompose/assimilate trans fatty acid and the ability to decompose ester (e.g., oil and fat) at a low temperature as *Yarrowia lipolytica*. The bacteria were deposited with the National Institute of Technology and Evaluation, Patent Microorganisms Depositary and accepted on Jun. 4, 2018, and a certificate of deposit was issued on Jun. 12, 2018. The accession number is NITE BP-02732. The inventors also identified further bacterial strains (KH-2AL1 strain and KH-2AL3 strain) of *Yarrowia lipolytica*. The bacteria were deposited with the National Institute of Technology and Evaluation, Patent Microorganisms Depositary and accepted on Dec. 23, 2019, and a certificate of deposit was issued on Jan. 16, 2020. The accession numbers are NITE BP-03091 and NITE BP-03092, respectively. In one embodiment, the microorganism of the present disclosure is a KH-2 strain (bacterial strain identified by accession number NITE BP-02732), a KH-2AL1 strain (bacterial strain identified by accession number NITE BP-03091), or a KH-2AL3 strain (bacterial strain identified by accession number NITE BP-03092) of a *Yarrowia* yeast, or a derivative strain thereof. In still another aspect of the present disclosure, the *Yarrowia* yeast of the present disclosure can be a yeast in the genus *Candida*, the genus *Zygoascus*, the genus *Ogataea*, the genus *Pichia*, or the genus *Aciculoconidium*. Examples of such a yeast in the genus *Candida* include *deformans, oslonensis, galli, phangngensis, hollandica, alimentaria, hispaniensis* and *incommunis*. Examples of such a yeast in the genus *Zygoascus* include *steatolyticus* var. *steatolyticus*. Examples of such a yeast in the genus *Aciculoconidium* include *aculeatum*.

In one embodiment, the microorganism of the present disclosure is a derivative strain of a KH-2 strain (bacterial strain identified by accession number NITE BP-02732), a KH-2AL1 strain (bacterial strain identified by accession number NITE BP-03091), or a KH-2AL3 strain (bacterial strain identified by accession number NITE BP-03092) of a *Yarrowia* yeast. In this regard, a derivative strain does not need to be a strain obtained based on a KH-2 strain, a KH-2AL1 strain, or a KH-2AL3 strain of a *Yarrowia* yeast, and refers to a microorganism that exhibits a biological function of a KH-2 strain, a KH-2AL1 strain, or a KH-2AL3 strain of a *Yarrowia* yeast, but not necessarily to the same degree. In one embodiment, a microorganism that is a derivative strain of the present disclosure exhibits a biological function selected from the group consisting of having lipase activity, an ability to assimilate (decompose) ester (e.g., trans fatty acid-containing oil and fat) at a low temperature (e.g., 25° C. or less, 20° C. or less, 15° C. or less, 10° C. or less, 5° C. or less, or the like), an ability to assimilate (decompose) trans fatty acid (e.g., elaidic acid, palmitelaidic acid, and/or vaccenic acid), an ability to improve lipase production of a *Burkholderia bacterium*, and an ability to improve the ability to decompose fatty acid and/or oil and fat of a *Burkholderia bacterium* in the same manner as a KH-2 strain, a KH-2AL1 strain, or a KH-2AL3 strain of a *Yarrowia* yeast, but the degree of the biological function can be different from the KH-2 strain, the KH-2AL1 strain, or the KH-2AL3 strain. In one embodiment, a microorganism that is a derivative strain of the present disclosure is a yeast in the genus *Yarrowia*, more specifically, can be *Yarrowia lipolytica*.

The microorganism of the present disclosure (including derivative strains of a KH-2 strain, a KH-2AL1 strain, or a KH-2AL3 strain) can be isolatable on an inorganic salt agar medium, which comprises ester (e.g., oil and fat) as the sole carbon source and has a pH adjusted to 6 to 8. In one embodiment, the microorganism of the present disclosure (including derivative strains of a KH-2 strain, a KH-2AL1 strain, or a KH-2AL3 strain) can be identifiable by checking for formation of a clear zone (hollow) around a colony appearing on an agar medium containing ester (e.g., oil and fat) in a dispersed manner. In one embodiment, the microorganism of the present disclosure (including derivative strains of a KH-2 strain, a KH-2AL1 strain, or a KH-2AL3 strain) can form a colony and grow on an agar medium supplemented with 10 g/L of canola oil as a carbon source at 15° C. or 28° C., preferably at 15° C. It can be useful, but is not intended to be limited to, that the microorganism of the present disclosure has an ability to assimilate (decompose) ester (e.g., oil and fat) or resistance to ester (e.g., oil and fat) at minimum extent.

In one embodiment, the microorganism of the present disclosure (including derivative strains of a KH-2 strain, a KH-2AL1 strain, or a KH-2AL3 strain) has esterase activity. In one embodiment, the microorganism of the present disclosure (including derivative strains of a KH-2 strain, a KH-2AL1 strain, or a KH-2AL3 strain) has lipase activity for triglyceride comprising long-chain fatty acid (fatty acid comprising 13 or more carbon atoms (e.g., fatty acid comprising 14 to 22 carbon atoms)). In one embodiment, the microorganism of the present disclosure (including derivative strains of a KH-2 strain, a KH-2AL1 strain, or a KH-2AL3 strain) has esterase activity for ester (e.g., triglyceride) comprising short- to medium-chain fatty acid (fatty acid comprising 2 to 12 carbon atoms). In one embodiment, the microorganism of the present disclosure (including derivative strains of a KH-2 strain, a KH-2AL1 strain, or a KH-2AL3 strain) has higher hydrolysis activity for 4-nitrophenyl ester of short-chain to medium-chain fatty acid (fatty acid comprising 2 to 12 carbon atoms) than hydrolysis activity for 4-nitrophenyl ester of long-chain fatty acid. In one embodiment, the microorganism of the present disclosure (including derivative strains of a KH-2 strain, a KH-2AL1 strain, or a KH-2AL3 strain) has an ability to decompose or assimilate ester (e.g., oil and fat) and/or fatty acid at 15° C. In one embodiment, the microorganism of the present disclosure (including derivative strains of a KH-2 strain, a KH-2AL1 strain, or a KH-2AL3 strain) retains the ability to assimilate or decompose trans fatty acid (e.g., elaidic acid, palmitelaidic acid, and/or vaccenic acid) or trans fatty acid-containing oil and fat at 15° C.

In one embodiment, the microorganism of the present disclosure (including derivative strains of a KH-2 strain, a KH-2AL1 strain, or a KH-2AL3 strain) has hydrolysis activity for 4-nitrophenyl ester of short-chain to medium-chain fatty acid (fatty acid comprising 2 to 12 carbon atoms) which is 1-fold, 1.5-fold, 2-fold, 5-fold, 10-fold, 20-fold, 50-fold, 100-fold, 200-fold, or 500-fold higher than the hydrolysis activity for 4-nitrophenyl ester of long-chain fatty acid (fatty acid comprising 13 or more carbon atoms) when 1 ml of supernatant prepared by inoculating the microorganism into an inorganic salt medium supplemented with 1% (v/v) canola oil so that the initial bacterial optical density would be $OD_{660}$=0.05 and then culturing the inoculated microorganism for 24 hours at 28° C., for 48 hours at 28° C., or for 48 hours at 15° C., followed by centrifugation to remove microorganisms, 1 ml of substrate solution prepared by dissolving 0.05 mol of fatty acid 4-nitrophenyl ester in 12 ml of 3% (v/v) Triton® X-100 solution, and 1 ml of 150 mM GTA buffer (pH of 7.0) are mixed and an absorbance at 410 nm is monitored for 1 minute while agitating.

In one embodiment, the microorganism of the present disclosure (including derivative strains of a KH-2 strain, a KH-2AL1 strain, or a KH-2AL3 strain) has an ability to assimilate trans fatty acid (e.g., elaidic acid, palmitelaidic acid, and/or vaccenic acid) or trans fatty acid-containing oil and fat. In one embodiment, the microorganism of the present disclosure (including derivative strains of a KH-2 strain, a KH-2AL1 strain, or a KH-2AL3 strain) has an ability to decompose trans fatty acid (e.g., elaidic acid, palmitelaidic acid, and/or vaccenic acid). In one embodiment, the microorganism of the present disclosure (including derivative strains of a KH-2 strain, a KH-2AL1 strain, or a KH-2AL3 strain) has an ability to decompose trans fatty acid-containing oil and fat.

In one embodiment, the microorganism of the present disclosure (including derivative strains of a KH-2 strain, a KH-2AL1 strain, or a KH-2AL3 strain) has lipase activity to decompose triolein. In one embodiment, the microorganism of the present disclosure (including derivative strains of a KH-2 strain, a KH-2AL1 strain, or a KH-2AL3 strain) has lipase activity to decompose trielaidin.

In one embodiment, the microorganism of the present disclosure (including derivative strains of a KH-2 strain, a KH-2AL1 strain, or a KH-2AL3 strain) has an ability to decompose or assimilate various fatty acids (oleic acid, elaidic acid, palmitelaidic acid, vaccenic acid) including trans fatty acid at a low temperature.

In one embodiment, the microorganism of the present disclosure (including derivative strains of a KH-2 strain, a KH-2AL1 strain, or a KH-2AL3 strain) can have an ability to decompose oil and fat which assimilates and/or decomposes trans fatty acid-containing oil and fat in a medium comprising trans fatty acid (e.g., elaidic acid)-containing oil and fat at a pH of 7.0 and at 15° C. or 28° C.

In one embodiment, the microorganism of the present disclosure (including derivative strains of a KH-2 strain, a KH-2AL1 strain, or a KH-2AL3 strain) has an ability to decompose trans fatty acid so that the elaidic acid concentration in the supernatant after 24 hours or after 46 hours culture wherein the microorganism is inoculated into an inorganic salt medium comprising Triton® X-100 and elaidic acid at concentrations of 0.25% by weight and 0.2% by weight, respectively, at a bacterial optical density that would result in $OD_{660}$=0.5 or 0.8 and cultured at a pH of 7.0 and 28° C. (e.g., the elaidic acid concentration in the supernatant after 24 hours wherein the microorganism is inoculated into an inorganic salt medium comprising Triton® X-100 and elaidic acid at concentrations of 0.25% by weight and 0.2% by weight, respectively, at a bacterial optical density that would result in $OD_{660}$=0.5 and cultured at a pH of 7.0 and 28° C., or the elaidic acid concentration in the supernatant after 46 hours culture wherein the microorganism is inoculated into an inorganic salt medium comprising Triton® X-100 and elaidic acid at concentrations of 0.25% by weight and 0.2% by weight, respectively, at a bacterial optical density that would result in $OD_{660}$=0.8 and cultured at a pH of 7.0 and 28° C.) would be less than 1500 mg/L, less than 1200 mg/L, less than 1000 mg/L, less than 900 mg/L, less than 800 mg/L, less than 700 mg/L, less than 600 mg/L, less than 500 mg/L, less than 400 mg/L, less than 300 mg/L, less than 200 mg/L, less than 150 mg/L, less than 100 mg/L, less than 70 mg/L, less than 50 mg/L, less than 20 mg/L, less than 10 mg/L, or less than 5 mg/L. The microorganism of the present disclosure (including derivative strains of a KH-2 strain, a KH-2AL1 strain, or a KH-2AL3 strain) preferably has an ability to reduce the elaidic acid concentration in the supernatant to less than 800 mg/L, less than 700 mg/L, less than 600 mg/L, or less than 500 mg/L, especially less than 700 mg/L when determined under this condition. A microorganism having such an ability to decompose trans fatty acid can be advantageously used in various applications of the present disclosure.

In one embodiment, the microorganism of the present disclosure (including derivative strains of a KH-2 strain, a KH-2AL1 strain, or a KH-2AL3 strain) has an ability to decompose trans fatty acid so that the elaidic acid concentration in the supernatant would be less than 1500 mg/L, less than 1200 mg/L, less than 1000 mg/L, less than 900 mg/L, less than 800 mg/L, less than 700 mg/L, less than 600 mg/L, less than 500 mg/L, less than 400 mg/L, less than 300 mg/L, less than 200 mg/L, less than 150 mg/L, less than 100 mg/L, less than 70 mg/L, less than 50 mg/L, less than 20 mg/L, less than 10 mg/L, or less than 5 mg/L after 48 hours or 90 hours culture wherein the microorganism is inoculated into an inorganic salt medium comprising Triton® X-100 and elaidic acid at concentrations of 0.25% by weight and 0.2% by weight, respectively, at a bacterial optical density that would result in $OD_{660}$=0.8 and cultured at a pH of 7.0 and 15° C. The microorganism of the present disclosure (including derivative strains of a KH-2 strain, a KH-2AL1 strain, or a KH-2AL3 strain) preferably has an ability to reduce the elaidic acid concentration in the supernatant to less than 1000 mg/L, less than 700 mg/L, less than 500 mg/L, less than 400 mg/L, less than 300 mg/L, less than 200 mg/L, or less than 100 mg/L, especially less than 500 mg/L when determined under this condition. A microorganism having such an ability to decompose trans fatty acid can be advantageously used in various applications of the present disclosure.

In one embodiment, the microorganism of the present disclosure (including derivative strains of a KH-2 strain, a KH-2AL1 strain, or a KH-2AL3 strain) has an ability to decompose trans fatty acid-containing oil and fat so that the residual oil entity concentration in the supernatant would be less than 800 mg/L, less than 700 mg/L, less than 600 mg/L, less than 500 mg/L, less than 400 mg/L, less than 350 mg/L, less than 300 mg/L, less than 250 mg/L, less than 200 mg/L, less than 150 mg/L, less than 100 mg/L, less than 70 mg/L, less than 50 mg/L, less than 20 mg/L, or less than 10 mg/L after 5 days culture wherein the microorganism is inoculated into an inorganic salt medium comprising Triton® X-100 and trielaidin at concentrations of 0.25% by weight and 0.1% by weight, respectively, at a bacterial optical density that would result in $OD_{660}$=0.8 and cultured at a pH of 7.0 and 28° C. The microorganism of the present disclosure (including derivative strains of a KH-2 strain, a KH-2AL1 strain, or a KH-2AL3 strain) preferably has an ability to reduce the residual oil entity concentration in the supernatant to less than 400 mg/L, less than 350 mg/L, less than 300 mg/L, less than 250 mg/L, less than 200 mg/L, less than 150 mg/L, or less than 100 mg/L, especially less than 350 mg/L when determined under this condition. A microorganism having such an ability to decompose trans fatty acid-containing oil and fat can be advantageously used in various applications of the present disclosure.

In one embodiment, the microorganism of the present disclosure (including derivative strains of a KH-2 strain, a KH-2AL1 strain, or a KH-2AL3 strain) has an ability to decompose oil and fat so that the residual oil entity content at 24 hours after starting culture would be less than 95%, less than 90%, less than 85%, less than 80%, less than 75%, less than 70%, less than 65%, less than 60%, less than 55%, less than 50, less than 45%, less than 40%, less than 35%, less than 30%, less than 25%, less than 20%, less than 15%, less than 10%, less than 7%, less than 5%, less than 2%, or less than 1% of the residual oil entity content as of start of the culture wherein the microorganism is inoculated into an inorganic salt medium comprising 1% (v/v) canola oil entity at a bacterial optical density that would result in a final concentration of $OD_{660}$=0.05 and cultured at a pH of 7.0 and 15° C. The microorganism of the present disclosure (including derivative strains of a KH-2 strain, a KH-2AL1 strain, or a KH-2AL3 strain) preferably has an ability to decompose oil and fat so that the residual oil entity content in 15° C. culture is less than 65%, less than 60%, less than 55%, less than 50%, less than 45%, or less than 40%, especially less than 45% when determined under this condition. A microorganism having such an ability to decompose oil and fat at a low temperature can be advantageously used in various applications of the present disclosure.

In one embodiment, the microorganism of the present disclosure (including derivative strains of a KH-2 strain, a KH-2AL1 strain, or a KH-2AL3 strain) has an ability to decompose oil and fat so that the residual oil entity content at 24 hours after starting culture would be less than 50%, less than 45%, less than 40%, less than 35%, less than 30%, less than 25%, less than 20%, less than 17%, less than 15%, less than 12%, less than 10%, less than 7%, less than 5%, less than 4%, less than 3%, less than 2%, or less than 1% of the residual oil entity content as of start of the culture wherein the microorganism is inoculated into an inorganic salt medium comprising 1 (v/v) canola oil at a bacterial optical density that would result in a final concentration of $OD_{660}$=0.05 and cultured at a pH of 7.0 and 28° C. The microorganism of the present disclosure (including derivative strains of a KH-2 strain, a KH-2AL1 strain, or a KH-2AL3 strain) preferably has an ability to decompose oil and fat so that the residual oil entity content in 28° C. culture is less than 20%, less than 17%, less than 15%, less than 12%, or less than 10%, especially less than 10% when determined under this condition. A microorganism having such an ability to decompose oil and fat at a high speed can be advantageously used in various applications of the present disclosure.

In one embodiment, the microorganism of the present disclosure (including derivative strains of a KH-2 strain, a KH-2AL1 strain, or a KH-2AL3 strain) has an ability to decompose oil and fat so that oil entity content corresponding to a normal hexane value in the supernatant would be 1000% or less, 800% or less, 600% or less, 400% or less, 200% or less, 150% or less, 100% or less, 80% or less, 60% or less, 40% or less, 20% or less, 10% or less, or 5% or less after 24 hours in 15° C. culture in comparison to the oil entity content corresponding to a normal hexane value in the supernatant after 24 hours in 28° C. culture wherein the microorganism is inoculated into an inorganic salt medium comprising 1% (v/v) canola oil at a bacterial optical density that would result in a final concentration of $OD_{660}$=0.05 and cultured at a pH of 7.0 and 15° C. and 28° C., respectively. The microorganism of the present disclosure (including derivative strains of a KH-2 strain, a KH-2AL1 strain, or a KH-2AL3 strain) preferably has an ability to decompose oil and fat so that the ratio of residual oil and fat in 15° C. culture would be 800% or less, 700% or less, 600% or less, 500% or less, 400% or less, especially 500% or less in comparison to 28° C. culture when determined under this condition. A microorganism having such an ability to decompose oil and fat at a low temperature can be advantageously used in various applications of the present disclosure.

In one embodiment, the microorganism of the present disclosure (including derivative strains of a KH-2 strain, a KH-2AL1 strain, or a KH-2AL3 strain) has an ability to decompose oil and fat so that the rate of decomposing total fatty acids would be 1000% or greater, 800% or greater, 600% or greater, 400% or greater, 200% or greater, 150% or greater, 100% or greater, 80% or greater, 60% or greater, 50; or greater, 40% or greater, 30% or greater, 20% or greater, 10% or greater, or 5% or greater in 15° C. culture in comparison to 28° C. culture wherein the microorganism is inoculated into an inorganic salt medium comprising 1% (v/v) canola oil at a bacterial optical density that would result in a final concentration of $OD_{660}$=0.05 and culture is started at a pH of 7.0 and 15° C. and 28° C., respectively. The microorganism of the present disclosure (including derivative strains of a KH-2 strain, a KH-2AL1 strain, or a KH-2AL3 strain) preferably has an ability to decompose oil and fat so that the rate of decomposing total fatty acids in 15° C. culture would be 50% or greater, 40% or greater, 30% or greater, 20% or greater, or 10% or greater, especially 30% or greater in comparison to 28° C. culture when determined under this condition. A microorganism having such an ability to decompose oil and fat at a low temperature can be advantageously used in various applications of the present disclosure.

In one embodiment, the *Yarrowia* yeast of the present disclosure has an ability to improve lipase production of a *Burkholderia bacterium* which produces lipase. In one embodiment, the *Yarrowia* yeast of the present disclosure has an ability to impart a higher ability to decompose oil and fat than the ability to decompose oil and fat in single culture of a *Burkholderia bacterium* to the *Burkholderia bacterium*. In one embodiment, the *Yarrowia* yeast of the present disclosure has an ability to impart a higher ability to decompose fatty acid than the ability to decompose fatty acid in single culture of a *Burkholderia bacterium* to the *Burkholderia bacterium*. In one embodiment, the *Burkholderia bacterium* is any *Burkholderia bacterium* in the combination of microorganisms of the present disclosure. Any feature of the combination of microorganisms of the present disclosure described hereinafter is intended to be also considered as a description of the ability that the *Yarrowia* yeast of the present disclosure imparts to the *Burkholderia bacterium* of the present disclosure. For example, when there is a disclosure relating to a combination of microorganism strains of a *Burkholderia bacterium* and a *Yarrowia* yeast whose ability to decompose oil and fat thereof is 100% or greater in comparison to the ability to decompose oil and fat calculated from a value of an ability to decompose oil and fat in single culture of each of the *Burkholderia bacterium* and the *Yarrowia* yeast based on gas chromatography analysis wherein a *Burkholderia bacterium* and a *Yarrowia* yeast are mixed and inoculated into an inorganic salt medium supplemented with 1% (v/v) canola oil at a mixing ratio (based on the cell count) of 1:1 at a cell concentration that would result in a total cell count of $5×10^5$ cells/ml and cultured at a pH of 7.0 and 28° C. for 18 hours, such disclosure is also considered as a disclosure relating to the ability of a *Yarrowia* yeast to impart the same ability to decompose oil and fat to a *Burkholderia bacterium* under the same culture conditions and at the same mixing ratio. In the same manner, disclosures relating to a feature of the combination of microorganisms of the present disclosure are each equivalent to a description of the ability that the *Yarrowia* yeast of the present disclosure imparts to the *Burkholderia bacterium* of the present disclosure. In one embodiment, the *Yarrowia* yeast of the present disclosure has both one or more abilities (described above) based on a *Yarrowia* yeast alone described herein and an ability (described below) that is imparted to a *Burkholderia bacterium* in the combination of microorganisms of the present disclosure. A *Yarrowia* yeast concurrently having these abilities of different aspects is particularly unexpected. Examples of such a *Yarrowia* yeast concurrently having abilities of different aspects can include, but are not limited to, a KH-2 strain, a KH-2AL1 strain, a KH-2AL3 strain, and the like.

(Combination of Oil Entity Decomposing Microorganisms)

In one aspect, the present disclosure provides a combination of a *Burkholderia bacterium* and a *Yarrowia* yeast (also referred to as the "combination of microorganisms of the present disclosure" herein) that decompose oil and fat and/or fatty acid. As used herein, "*Burkholderia bacterium*" refers to a bacterium including a microorganism in the order Burkholderiales. Details are described below herein. As used herein, "*Yarrowia* yeast" refers to a yeast including a microorganism in the genus *Yarrowia*. Details are described in a different portion herein. Among combinations of various microorganisms, a combination of a *Burkholderia bacterium* and a *Yarrowia* yeast can be a combination that can achieve an especially excellent ability to decompose oil entity. As shown in the Examples, improvement in the ability to decompose oil entity by a combination of a *Burkholderia bacterium* and a *Yarrowia* yeast was observed. In this regard, although not wishing to be bound by any theory, it is expected that substance resulting from decomposition of oil entity by the *Yarrowia* yeast improved the ability to decompose oil entity of the *Burkholderia bacterium* as an inducer. Thus, a microorganism having similar ability to decompose oil entity can be suitably used as a *Yarrowia* yeast. A strain having similar sensitivity can be suitably used as a *Burkholderia bacterium*. In the same manner, it is expected that substance resulting from decomposition of oil entity by the *Burkholderia bacterium* improved the ability to decompose oil entity of the *Yarrowia* yeast as an inducer. Thus, a microorganism having similar ability to decompose oil entity can be suitably used as a *Burkholderia bacterium*, and a strain having similar sensitivity can be suitably used as a *Yarrowia* yeast.

In one embodiment, at least one of a *Burkholderia bacterium* and a *Yarrowia* yeast in the combination of microorganisms of the present disclosure has an ability to produce lipase. In one embodiment, both a *Burkholderia bacterium* and a *Yarrowia* yeast in the combination of microorganisms of the present disclosure has an ability to produce lipase. Although it was expected that a combined *Burkholderia bacterium* and *Yarrowia* yeast, each of which produces lipase alone, compete with each other and suppress the abilities of each other (the overall ability to decompose oil entity is decreased) as a result of having similar properties, the inventors found that the combination unexpectedly exhibits a high ability to decompose oil entity. In one embodiment, a *Burkholderia bacterium* and a *Yarrowia* yeast in the combination of microorganisms of the present disclosure are capable of symbiosis. In one embodiment, a *Yarrowia* yeast in the combination of microorganisms of the present disclosure can improve lipase expression and/or production of a *Burkholderia bacterium*. In one embodiment, a *Burkholderia bacterium* in the combination of microorganisms of the present disclosure can improve lipase expression and/or production of a *Yarrowia* yeast. Microorganisms in the combination of microorganisms of the present disclosure can be manufactured by culturing with any suitable method.

In one aspect, the combination of microorganisms of the present disclosure provides an ability to decompose oil entity which is greater than the ability to decompose oil entity (e.g., the ability to decompose oil and fat and/or fatty acid at 28° C., the ability to decompose oil and fat and/or fatty acid at 15° C., or the like) of each microorganism used in this combination. In one aspect, the combination of microorganisms of the present disclosure provides an ability to decompose oil entity which is greater than the total of the ability to decompose oil entity (e.g., the ability to decompose oil entity at 28° C., the ability to decompose oil entity at 15° C., or the like) of each microorganism used in this combination. In particular, as long as any of the abilities to decompose oil entity is greater than the ability to decompose oil entity calculated from a value of the ability to decompose oil entity in single culture of each of the microorganisms, the combination of microorganisms can be usefully used even when another ability is decreased. In one embodiment, the combination of microorganisms of the present disclosure has an ability to decompose cis fatty acid-containing oil and fat, trans fatty acid-containing oil and fat, or oil and fat including both of them.

In one aspect, the combination of microorganisms of the present disclosure provides improvement in lipase expression and/or production of a *Burkholderia bacterium* and/or a *Yarrowia* yeast that are used in this combination.

In one embodiment, the ratio of the cell count of *Burkholderia* bacteria to the cell count of *Yarrowia* yeast in the combination of microorganisms of the present disclosure can be about 1000:1 to 1:100, about 1000:1 to 1:50, about 1000:1 to 1:20, about 1000:1 to 1:10, about 1000:1 to 1:5, about 1000:1 to 1:2, about 1000:1 to 1:1, about 1000:1 to 2:1, about 1000:1 to 5:1, about 500:1 to 1:100, about 500:1 to 1:50, about 500:1 to 1:20, about 500:1 to 1:10, about 500:1 to 1:5, about 500:1 to 51, about 500:1 to 1:1, about 500:1 to 2:1, about 500:1 to 5:1, about 200:1 to 1:100, about 200:1 to 1:50, about 200:1 to 1:20, about 200:1 to 1:10, about 200:1 to 1:5, about 200:1 to 1:2, about 200:1 to 1:1, about 200:1 to 2:1, about 200:1 to 5:1, about 100:1 to 1:100, about 100:1 to 1:50, about 100:1 to 1:20, about 100:1 to 1:10, about 100:1 to 1:5, about 100:1 to 1:2, about 100:1 to 1:1, about 100:1 to 2:1, about 100:1 to 5:1, about 50:1 to 1:100, about 50:1 to 1:50, about 50:1 to 1:20, about 50:1 to 1:10, about 50:1 to 1:5, about 50:1 to 1:2, about 50:1 to 1:1, about 50:1 to 2:1, about 50:1 to 5:1, about 20:1 to 1:100, about 20:1 to 1:50, about 20:1 to 1:20, about 20:1 to 1:10, about 20:1 to 1:5, about 20:1 to 1:2, about 20:1 to 1:1, about 20:1 to 2:1, about 10:1 to 1:10, about 9:1 to 1:9, about 8:1 to 1:8, about 1000:1, about 100:1, about 50:1, about 20:1, about 10:1, about 9:1, about 8:1, about 7:1, about 6:1, about 5:1, about 2:1, about 1:1, about 1:2, about 1:5, about 1:6, about 1:7, about 1:8, about 1:9, about 1:10, about 1:100. The ratio of cell count and the cell concentration can be determined and/or adjusted using any suitable method. As one example, it is possible to determine the cell count concentration and prepare microorganism cell suspension with a cell count concentration of interest based on the optical density by preparing a calibration curve in advance for the relationship between the cell count concentration of microorganisms and the optical density ($OD_{660}$) of bacterial cells. For example, a KH-1 strain with $OD_{660}$=0.01 can be converted into about $1 \times 10^6$ cells/mL, and a KH-2 strain with $OD_{660}$=0.01 can be converted into about $1 \times 10^5$ cells/mL.

In one embodiment, the dry weight ratio of a *Burkholderia bacterium* to a *Yarrowia* yeast in the combination of microorganisms of the present disclosure can be about 100:1 to 1:100, about 100:1 to 1:50, about 100:1 to 1:20, about 100:1 to 1:10, about 100:1 to 1:5, about 100:1 to 1:2, about 100:1 to 1:1, about 100:1 to 2:1, about 100:1 to 5:1, about 50:1 to 1:100, about 50:1 to 1:50, about 50:1 to 1:20, about 50:1 to 1:10, about 50:1 to 1:5, about 50:1 to 1:2, about 50:1 to 1:1, about 50:1 to 2:1, about 50:1 to 5:1, about 20:1 to 1:10, about 20:1 to 1:50, about 20:1 to 1:20, about 20:1 to 1:10, about 20:1 to 1:5, about 20:1 to 1:2, about 20:1 to 1:1, about 20:1 to 2:1, about 20:1 to 5:1, about 10:1 to 1:100, about 10:1 to 1:50, about 10:1 to 1:20, about 10:1 to 1:10, about 10:1 to 1:5, about 10:1 to 1:2, about 10:1 to 1:1, about 10:1 to 2:1, about 10:1 to 5:1, about 5:1 to 1:100, about 5:1 to 1:50, about 5:1 to 1:20, about 5:1 to 1:10, about 5:1 to 1:5, about 5:1 to 1:2, about 5:1 to 1:1, about 5:1 to 2:1, about 2:1 to 1:100, about 2:1 to 1:50, about 2:1 to 1:20, about 2:1 to 1:10, about 2:1 to 1:5, about 2:1 to 1:2, about 2:1 to 1:1, about 100:1, about 10:1, about 5:1, about 2:1, about 1:1, about 1:2, about 1:5, about 1:10, about 1:20, about 1:50, about 1:100.

In one embodiment, the combination of microorganisms of the present disclosure has a higher ability to decompose oil and fat than the ability to decompose oil and fat calculated from a value of an ability to decompose oil and fat in single culture of each of the microorganisms when cultured in an inorganic salt medium supplemented with 1% (v/v) canola oil at a predetermined temperature (e.g., 15° C. or 28° C.). In one embodiment, the combination of microorganisms of the present disclosure has a higher ability to decompose oil and fat than that of a *Burkholderia bacterium* alone or a *Yarrowia* yeast alone in this combination having the same cell count as the total cell count of this combination when cultured in an inorganic salt medium supplemented with 1% (v/v) canola oil at a predetermined temperature. In one embodiment, the combination of microorganisms of the present disclosure has a higher ability to decompose fatty acid than the ability to decompose fatty acid calculated from a value of the ability to decompose fatty acid in single culture of each of the microorganisms when cultured in an inorganic salt medium supplemented with 1% (v/v) oleic acid at a predetermined temperature (e.g., 28° C.). In one embodiment, the combination of microorganisms of the present disclosure has a higher ability to decompose fatty acid than that of a *Burkholderia bacterium* alone or a *Yarrowia* yeast alone in this combination having the same cell count as the total cell count of this combination when cultured in an inorganic salt medium supplemented with 1% (v/v) oleic acid at a predetermined temperature. This ability to decompose oil and fat and/or fatty acid can also be tested by thin-layer chromatography described herein. For example, said ability can be determined by collecting the culture supernatant over time and comparing the time until elimination of a spot corresponding to oil and fat and/or a spot corresponding to fatty acid.

In one embodiment, a combination of microorganism strains of a *Burkholderia bacterium* and a *Yarrowia* yeast and a mixing ratio thereof are used so that the total fatty acids determined by analyzing the culture supernatant at 48 hours after starting culture by gas chromatography would be less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 7%, less than 5%, less than 2%, or less than 1% of the total fatty acids as of start of the culture wherein the Burkholderia bacterium and the Yarrowia yeast are inoculated into an inorganic salt medium supplemented with 1% (v/v) canola oil at a cell concentration of $5 \times 10^5$ cells/mL in total and cultured at a pH of 7.0 and 15° C.

In one embodiment, a combination of microorganism strains of a Burkholderia bacterium and a Yarrowia yeast and a mixing ratio thereof are used so that the ability to decompose oil and fat would be 100% or greater, 101% or greater, 102% or greater, 103% or greater, 104% or greater, 105% or greater, 106% or greater, 107% or greater, 108% or greater, 109% or greater, 110% or greater, 115% or greater, 120% or greater, or 125% or greater in comparison to the ability to decompose oil and fat calculated from a value of an ability to decompose oil and fat in single culture of each of the Burkholderia bacterium and the Yarrowia yeast based on gas chromatography analysis wherein the Burkholderia bacterium and the Yarrowia yeast are mixed and inoculated into an inorganic salt medium supplemented with 1% (v/v) canola oil at a cell concentration that would result in a total cell count of $5 \times 10^D$ cells/mL and cultured at a pH of 7.0 and 15° C. for 48 hours.

In one embodiment, a combination of microorganism strains of a Burkholderia bacterium and a Yarrowia yeast and a mixing ratio thereof are used so that the total fatty acids determined by analyzing the culture supernatant at 18 hours after starting culture by gas chromatography would be less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 7%, less than 5%, less than 2%, or less than 1% of the total fatty acids as of start of the culture wherein the Burkholderia bacterium and the Yarrowia yeast are inoculated into an inorganic salt medium supplemented with 1% (v/v) canola oil at a cell concentration of $5 \times 10^5$ cells/mL in total and cultured at a pH of 7.0 and 28° C.

In one embodiment, a combination of microorganism strains of a Burkholderia bacterium and a Yarrowia yeast and a mixing ratio thereof are used so that the ability to decompose oil and fat would be 100% or greater, 101% or greater, 102% or greater, 103% or greater, 104% or greater, 105% or greater, 106% or greater, 107% or greater, 108% or greater, 109% or greater, 110% or greater, 115% or greater, 120% or greater, or 125% or greater in comparison to the ability to decompose oil and fat calculated from a value of an ability to decompose oil and fat in single culture of each of the Burkholderia bacterium and the Yarrowia yeast based on gas chromatography analysis wherein the Burkholderia bacterium and the Yarrowia yeast are mixed and inoculated into an inorganic salt medium supplemented with 1% (v/v) canola oil at a cell concentration that would result in a total cell count of $5 \times 10^5$ cells/mL and cultured at a pH of 7.0 and 28° C. for 18 hours.

In one embodiment, a combination of microorganism strains of a Burkholderia bacterium and a Yarrowia yeast and a mixing ratio thereof are used so that the total fatty acids determined by analyzing the culture supernatant at 48 hours after starting culture by gas chromatography would be less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 7%, less than 5%, less than 2%, or less than 1% of the total fatty acids as of start of the culture wherein the Burkholderia bacterium and the Yarrowia yeast are inoculated into an inorganic salt medium supplemented with 1% (v/v) oleic acid at a cell concentration of $5 \times 10^5$ cells/mL in total and cultured at a pH of 7.0 and 15° C.

In one embodiment, a combination of microorganism strains of a Burkholderia bacterium and a Yarrowia yeast and a mixing ratio thereof are used so that the ability to decompose fatty acid would be 100% or greater, 105% or greater, 110% or greater, 120% or greater, 130% or greater, 140% or greater, 150% or greater, 160% or greater, 170% or greater, 180% or greater, 190% or greater, or 200% or greater in comparison to the ability to decompose fatty acid calculated from a value of the ability to decompose fatty acid in single culture of each of the Burkholderia bacterium and the Yarrowia yeast based on gas chromatography analysis wherein the Burkholderia bacterium and the Yarrowia yeast are mixed and inoculated into an inorganic salt medium supplemented with 1% (v/v) oleic acid at a cell concentration that would result in a total cell count of $5 \times 10^5$ cells/mL and cultured at a pH of 7.0 and 15° C. for 48 hours.

In one embodiment, the combination of microorganisms of the present disclosure is a combination that improves lipase expression and/or production of a Burkholderia bacterium in the combination of microorganisms of the present disclosure. In one embodiment, the lipase of a Burkholderia bacterium includes a first lipase (base sequence: SEQ ID NO: 1, amino acid sequence: SEQ ID NO: 2, or a variant thereof or the like) and/or a second lipase (base sequence: SEQ ID NO: 3, amino acid sequence: SEQ ID NO: 4, or a variant thereof or the like). In one embodiment, improvement in lipase expression and/or production can be determined by comparing the lipase gene expression (such as the amount of RNA, the amount of produced protein, or the amount of secreted protein) when the combination of microorganisms of the present disclosure is used, with a result from single culture of a Burkholderia bacterium.

In one embodiment, the combination of microorganisms of the present disclosure is a combination so that the amount of expression of a specific Burkholderia bacterium lipase as analyzed by quantitative PCR for total RNA extracted from cells at 71 hours after starting culture wherein each microorganism of the combination is inoculated into an inorganic salt medium supplemented with 1% (v/v) canola oil at a bacterial optical density so that the measurement value of $OD_{660}$ would be Burkholderia bacterium:Yarrowia yeast=0.018:0.02 and cultured at a pH of 7.0 and 15° C. would be 6-fold or greater, 7-fold or greater, or 8-fold or greater in comparison to the case where a Burkholderia bacterium is inoculated alone at a bacterial optical density so that the measurement value of $OD_{660}$ would be 0.02.

In one embodiment, the combination of microorganisms of the present disclosure is a combination that improves lipase expression and/or production of a Yarrowia yeast in the combination of microorganisms of the present disclosure. In one embodiment, the lipase of a Yarrowia yeast includes a first lipase (base sequence: SEQ ID NO: 5, amino acid sequence: SEQ ID NO: 6, or a variant thereof or the like) and/or a second lipase (base sequence: SEQ ID NO: 7, amino acid sequence: SEQ ID NO: 8, or a variant thereof or the like). In one embodiment, improvement in lipase expression and/or production can be determined by comparing the lipase gene expression (such as the amount of RNA, the amount of produced protein, or the amount of secreted protein) when the combination of microorganisms of the present disclosure is used, with a result from single culture of a *Yarrowia* yeast.

In one embodiment, the combination of microorganisms of the present disclosure is a combination so that the amount of expression of a specific *Yarrowia* yeast lipase as analyzed by quantitative PCR for total RNA extracted from cells at 48 hours after starting culture of the combination wherein $2.5 \times 10^5$ cells/mL of *Burkholderia* bacteria and $2.5 \times 10^5$ cells/mL of *Yarrowia* yeast are inoculated into an inorganic salt medium supplemented with 1% (v/v) canola oil and cultured at a pH of 7.0 and 15° C. would be 1.1-fold or greater, 1.2-fold or greater, 1.5-fold or greater, 1.7-fold or greater, 2-fold or greater, 5-fold or greater, 10-fold or greater, or 20-fold or greater in comparison to the case where $5 \times 10^5$ cells/mL of *Yarrowia* yeast is inoculated alone.

In one aspect, the present disclosure provides a composition for improving lipase production of a *Burkholderia bacterium* which produces lipase, comprising a *Yarrowia* yeast. Alternatively, the present disclosure provides a *Yarrowia* yeast for improving lipase production of a *Burkholderia bacterium* which produces lipase. In another aspect, the present disclosure provides a composition for improving lipase production of a *Yarrowia* yeast which produces lipase, comprising a *Burkholderia* bacterium. Alternatively, the present disclosure provides a *Burkholderia bacterium* for improving lipase production of a *Yarrowia* yeast which produces lipase. As described herein, the combination effect of two microorganisms is observed in the present disclosure. From a different point of view, this can also be considered as an invention based on the discovery that a *Yarrowia* yeast improves lipase production of a *Burkholderia bacterium* which produces lipase as a new function, ability, or application of a *Yarrowia* yeast, or an invention based on the discovery that a *Burkholderia bacterium* improves lipase production of a *Yarrowia* yeast which produces lipase as a new function, ability, or application of a *Burkholderia bacterium*. Thus, it is understood that in these aspects, the matters relating to the combination of microorganisms of the present disclosure described herein can also be applied to these novel applications in the same manner.

In another aspect, the present disclosure provides a composition for reinforcing an ability to treat oil and fat and/or fatty acid of a *Burkholderia bacterium* which produces lipase, comprising a *Yarrowia* yeast. Alternatively, the present disclosure provides a *Yarrowia* yeast for reinforcing an ability to treat oil and fat and/or fatty acid of a *Burkholderia bacterium* which produces lipase. In still another aspect, the present disclosure provides a composition for reinforcing an ability to treat oil and fat and/or fatty acid of a *Yarrowia* yeast which produces lipase, comprising a *Burkholderia bacterium*. Alternatively, the present disclosure provides a *Burkholderia bacterium* for reinforcing an ability to treat oil and fat and/or fatty acid of a *Yarrowia* yeast which produces lipase. In the present disclosure, the combination effect of two microorganisms is observed. From a different point of view, this can also be considered as an invention based on the discovery that a *Yarrowia* yeast reinforces an ability to treat oil and fat and/or fatty acid of a *Burkholderia bacterium* which produces lipase as a new function, ability, or application of a *Yarrowia* yeast, or an invention based on the discovery that a *Burkholderia bacterium* reinforces an ability to treat oil and fat and/or fatty acid of a *Yarrowia* yeast which produces lipase as a new function, ability, or application of a *Burkholderia bacterium*. Thus, it is understood that in these aspects, the matters relating to the combination of microorganisms of the present disclosure described herein can also be applied to these novel applications in the same manner.

Although not wishing to be bound by any theory, in one preferred embodiment, the reason why it is preferable to provide a composition for improving lipase production of a *Burkholderia bacterium* which produces lipase, comprising a *Yarrowia* yeast, and/or a composition for reinforcing an ability to treat oil and fat and/or fatty acid of a *Burkholderia bacterium* which produces lipase, comprising a *Yarrowia* yeast, is that it is possible to achieve an effect of decomposing oil and fat and/or fatty acid that is equivalent to or greater than the ability of a *Burkholderia bacterium*, which can be relatively easily prepared, by utilizing a small amount of *Yarrowia* yeast. Although not wishing to be bound by any theory, according to, for example, Ngamdee W et al., BMC Microbiol. 2015 Mar. 3; 15:56. "Competition between *Burkholderia pseudomallei* and *B. thailandensis*" and Mitch R et al., Appl Microbiol Biotechnol. 2015; 99(22):9723-9743. "Irradiation of *Yarrowia lipolytica* NRRL YB-567 creating novel strains with enhanced ammonia and oil entity production on protein and carbohydrate substrates", while the doubling time of a *Burkholderia bacterium* is about 39 minutes, the doubling time of a *Yarrowia* yeast is about 1.5 hours. Thus, a *Burkholderia bacterium* has a greater growth rate. The inventors found that the combination of microorganisms of the present disclosure can have an ability to decompose oil and fat and/or fatty acid that is greater than the ability to decompose oil and fat and/or fatty acid calculated from a value of the ability to decompose oil and fat and/or fatty acid in single culture of each of the microorganisms. With this finding, use of the combination of microorganisms of the present disclosure improves the ability to decompose oil and fat and/or fatty acid of a *Burkholderia bacterium* with a great growth rate and accelerates the overall decomposition of oil and fat and/or fatty acid, whereby the microorganisms can be efficiently/safely utilized.

In one embodiment, a *Burkholderia bacterium* in the combination of microorganisms of the present disclosure is a bacterium in the order Burkholderiales. In one embodiment, a *Burkholderia bacterium* in the combination of microorganisms of the present disclosure is a bacterium in the family Burkholderiaceae. In one embodiment, a *Burkholderia bacterium* in the combination of microorganisms of the present disclosure is a bacterium in the genus *Burkholderia*. The genus of *Burkholderia* is a gram negative, non-spore forming aerobic *bacillus* with a polar flagella, and is the type genus of the family Burkholderiaceae. In one embodiment, a *Burkholderia bacterium* in the combination of microorganisms of the present disclosure is *Burkholderia arboris*, *Burkholderia ambifaria*, or *Burkholderia cepacia*, and is preferably *Burkholderia arboris* or *Burkholderia ambifaria*. In one embodiment, a *Burkholderia bacterium* in the combination of microorganisms of the present disclosure is a microorganism belonging to the *Burkholderia cepacia* complex. *Burkholderia cepacia* complex is a classification of microorganisms of the genus *Burkholderia* that are genetically very close, including *ambifaria, anthina, arboris, cenocepacia, cepacia, contaminans, diffusa, dolosa, lata, latens, metallica, multivorans, pseudomultivorans, puraquae, pyrrocinia, seminalis, stabilis, stagnalis, territorii, ubonensis*, and *vietnamiensis* (Martina P et al., Int J Syst Evol Microbiol. 2018 January; 68(1): 14-20.). In another embodiment, a *Burkholderia bacterium* in the combination of microorganisms of the present disclosure may be *metallica, seminalis, anthina, ambifaria, diffusa, ubonensis, multivorans, latens, cenocepacia, vietnamiensis, pyrrocinia, stabilis, glumae, gladioli, plantarii, oklahomensis, thailandensis, mallei, pseudomallei,* or *phytofirmans*. In a further aspect of the present disclosure, a *Burkholderia bacterium* in the combination of microorganisms of the present disclosure may be a bacterium in the genus *Ralstonia* or the genus *Pseudomonas*. The inventors identified a new bacterial strain (KH-1 strain) of a microorganism as *Burkholderia arboris* by base sequencing and phylogenetic analysis of 16S ribosome DNA. The bacteria were deposited with the National Institute of Technology and Evaluation, Patent Microorganisms Depositary and accepted on Jun. 4, 2018, and a certificate of deposit was issued on Jun. 12, 2018. The accession number is NITE BP-02731. The inventors also identified bacterial strains (KH-1AL1 strain, KH-1AL2 strain, and KH-1AL3 strain) of bacteria of the genus *Burkholderia*. The bacteria were deposited with the National Institute of Technology and Evaluation, Patent Microorganisms Depositary and accepted on Jun. 26, 2019, and a certificate of deposit was issued on Jul. 8, 2019. The accession numbers are NITE BP-02977, NITE BP-02978, and NITE BP-02979, respectively. In one embodiment, a *Burkholderia bacterium* in the combination of microorganisms of the present disclosure is a KH-1 strain (bacterial strain identified by accession number NITE BP-02731), a KH-1AL1 strain (bacterial strain identified by accession number NITE BP-02977), a KH-1AL2 strain (bacterial strain identified by accession number NITE BP-02978), or a KH-1AL3 strain (bacterial strain identified by accession number NITE BP-02979) of a *Burkholderia bacterium*, or a derivative strain thereof.

In one embodiment, a *Burkholderia bacterium* in the combination of microorganisms of the present disclosure is a derivative strain of a KH-1 strain (bacterial strain identified by accession number NITE BP-02731), a KH-1AL1 strain (bacterial strain identified by accession number NITE BP-02977), a KH-1AL2 strain (bacterial strain identified by accession number NITE BP-02978), or a KH-1AL3 strain (bacterial strain identified by accession number NITE BP-02979) of a *Burkholderia bacterium*. In this regard, a derivative strain does not need to be a strain obtained based on a KH-1 strain, a KH-1AL1 strain, a KH-1AL2 strain, or a KH-1AL3 strain of a *Burkholderia bacterium*, is a microorganism that exhibits a biological function of these *Burkholderia* bacteria strains, but not necessarily to the same degree, and preferably refers to a microorganism having a biological function to the same degree or to a greater degree. In one embodiment, a *Burkholderia bacterium* in the combination of microorganisms of the present disclosure exhibits at least one biological function selected from the group consisting of an ability to produce lipase and an ability to assimilate (decompose) oil and fat and/or fatty acid at a low temperature (e.g., 25° C. or less, 20° C. or less, 15° C. or less, 10° C. or less, 5° C. or less, or the like) in the same manner as a *Burkholderia* bacteria KH-1 strain, KH-1AL1 strain, KH-1AL2 strain, or KH-1AL3 strain, but the degree of the biological function can be different from a KH-1 strain, KH-1AL1 strain, KH-1AL2 strain, or KH-1AL3 strain. In one embodiment, a *Burkholderia bacterium* that is a derivative strain in the combination of microorganisms of the present disclosure is a bacterium in the family Burkholderiaceae, more specifically a bacterium in the genus *Burkholderia*, and still more specifically a microorganism belonging to *Burkholderia arboris, Burkholderia ambifaria,* or *Burkholderia cepacia* complex.

A *Burkholderia bacterium* in the combination of microorganisms of the present disclosure can be isolatable on an inorganic salt agar medium, which comprises oil and fat as the sole carbon source and has a pH adjusted to 6 to 8. In one embodiment, a *Burkholderia bacterium* in the combination of microorganisms of the present disclosure produces lipase. In one embodiment, a *Burkholderia bacterium* in the combination of microorganisms of the present disclosure can be identifiable by checking for formation of a clear zone (hollow) around a colony appearing on an agar medium.

In one embodiment, a *Burkholderia bacterium* in the combination of microorganisms of the present disclosure has an ability to decompose oil and fat and/or fatty acid at 15° C. In one embodiment, a *Burkholderia bacterium* in the combination of microorganisms of the present disclosure retains an ability to produce lipase and/or an ability to assimilate or decompose fatty acid or oil and fat at 15° C.

In one embodiment, a *Burkholderia bacterium* in the combination of microorganisms of the present disclosure can secrete a biosurfactant when cultured in a medium comprising oil and fat or fatty acid.

In one embodiment, a *Burkholderia bacterium* in the combination of microorganisms of the present disclosure has an ability to decompose oil and fat so that oil entity content corresponding to a normal hexane value in the supernatant would be less than 9 g/L, less than 8 g/L, less than 7 g/L, less than 6 g/L, less than 5 g/L, less than 4 g/L, less than 3 g/L, less than 2 g/L, less than 1 g/L, less than 0.7 g/L, less than 0.5 g/L, less than 0.2 g/L, less than 0.1 g/L, less than 0.07 g/L, less than 0.05 g/L, less than 0.02 g/L, or less than 0.01 g/L after 24 or 48 hours wherein the microorganism is inoculated into an inorganic salt medium comprising 10 g/L of canola oil at a cell concentration that would result in $3\times10^6$ cells/mL or $2\times10^6$ cells/mL and cultured at a pH of 7.0 and 15° C. under 200 ml/min of air circulation. In particular, a *Burkholderia bacterium* in the combination of microorganisms of the present disclosure preferably has an ability to decompose oil and fat that reduces oil entity content corresponding to a normal hexane value to less than about 6 g/L when inoculated at a cell concentration $2\times10^6$ cells/mL and cultured for 48 hours when determined under this condition, and more preferably has an ability to decompose oil and fat that reduces oil entity content corresponding to a normal hexane value to less than 6 g/L when inoculated at a cell concentration $3\times10^7$ cells/mL and cultured for 24 hours. A microorganism having such an ability to decompose oil and fat at a low temperature can be advantageously used in various applications of the present disclosure.

In one embodiment, a *Burkholderia bacterium* in the combination of microorganisms of the present disclosure has an ability to decompose oil and fat so that oil entity content corresponding to a normal hexane value in the supernatant would be 1000% or less, 800% or less, 600% or less, 400% or less, 200% or less, 150% or less, 100% or less, 80% or less, 60% or less, 40% or less, 20% or less, 10% or less or 5% or less after 24 hours in 15° C. culture in comparison to the oil entity content corresponding to a normal hexane value in the supernatant after 24 hours in 28° C. culture wherein the microorganism is inoculated into an inorganic salt medium comprising 10 g/L of canola oil at a cell concentration that would result in a final concentration of $3\times10^6$ cells/mL and cultured at a pH of 7.0 and 15° C. and 28° C., respectively, under 200 ml/min of air circulation. A *Burkholderia bacterium* in the combination of microorganisms of the present disclosure preferably has an ability to decompose oil and fat so that the ratio of residual oil and fat in 15° C. culture would be 800% or less, 700% or less, 600% or less, 500% or less, 400% or less, especially 700% or less in comparison to 28° C. culture when determined under this condition. A microorganism having such an ability to decompose oil and fat at a low temperature can be advantageously used in various applications of the present disclosure.

In one embodiment, a *Burkholderia* bacterium in the combination of microorganisms of the present disclosure has an ability to decompose oil and fat so that the rate of decomposing total fatty acids would be 1000% or greater, 800% or greater, 600% or greater, 400% or greater, 200% or greater, 150% or greater, 100% or greater, 80% or greater, 60% or greater, 50% or greater, 40% or greater, 30% or greater, 20% or greater, 10% or greater, or 5% or greater in 15° C. culture in comparison to 28° C. culture wherein the microorganism is inoculated into an inorganic salt medium comprising 10 g/L of canola oil at a cell concentration that would result in a final concentration of $3 \times 10^6$ cells/mL and culture is started at a pH of 7.0 and 15° C. and 28° C., respectively, under 200 ml/min of air circulation. A *Burkholderia* bacterium in the combination of microorganisms of the present disclosure preferably has an ability to decompose oil and fat so that the rate of decomposing total fatty acids in 15° C. culture would be 50% or greater, 40% or greater, 30% or greater, 20% or greater, or 10% or greater, especially 30% or greater in comparison to 28° C. culture when determined under this condition. A microorganism having such an ability to decompose oil and fat at a low temperature can be advantageously used in various applications of the present disclosure.

In one embodiment, a *Yarrowia* yeast in the combination of microorganisms of the present disclosure can be any yeast in the genus *Yarrowia* described herein.

At least one microorganism in the combination of microorganisms of the present disclosure can be isolatable on an inorganic salt agar medium, which comprises oil and fat as the sole carbon source and has a pH adjusted to 6 to 8. In one embodiment, at least one microorganism in the combination of microorganisms of the present disclosure can be identifiable by checking for formation of a clear zone (hollow) around a colony appearing on an agar medium. In one embodiment, at least one microorganism in the combination of microorganisms of the present disclosure can preferably form a colony and grow on an agar medium supplemented with 10 g/L of canola oil as the sole carbon source at 15° C. or 28° C., preferably at 15° C., and it is more preferable that both a *Burkholderia* bacterium and a *Yarrowia* yeast in the combination of microorganisms of the present disclosure can form a colony and grow under the same condition. It can be useful for both a *Burkholderia* bacterium and a *Yarrowia* yeast in the combination of microorganisms of the present disclosure to have an ability to assimilate (decompose) oil and fat at minimum extent.

In one embodiment, the ability to decompose/assimilate oil and fat and fatty acid of a microorganism can be evaluated by quantifying fatty acid contained in oil and fat and free fatty acid resulting from decomposition remaining in a culture by gas chromatography. The specific procedure for quantification involves firstly acidifying 3 mL of culture supernatant with hydrochloric acid and adding ethyl acetate at an equal amount. After agitating for 5 minutes, the mixture is centrifuged, and 1 mL of the ethyl acetate layer is transferred to another vessel and concentrated by evaporating the solvent. The resultant is dissolved in 1 ml of chloroform, 4 mL of methanolysis solution (methanol:sulfuric acid=17:3) is added thereto, and the mixture is heated for 2 hours at 100° C. to methyl-esterify fatty acid and free fatty acid in oil and fat. Subsequently, a solution of chloroform:pure water=1:1 is added and agitated, then the chloroform layer is mixed with 0.5% methyl octanoate at a ratio of 1:1 and analyzed by gas chromatography to quantify methyl ester of all fatty acids. The amount of reagents, the type of extraction solvents, and the like can be appropriately changed. For example, the following alternative procedure is possible. 1 mL of culture supernatant is acidified with hydrochloric acid and 2 mL of chloroform is added. After agitating for 2 minutes, the mixture is centrifuged, and 1 mL of the chloroform layer is transferred to another vessel and concentrated by evaporating the solvent. 2 mL of methanolysis solution (methanol:sulfuric acid=17:3) is added and the mixture is heated for 2 hours at 100° C. to methyl-esterify fatty acid and free fatty acid in oil and fat. Subsequently, 2 mL of chloroform and 1 mL of pure water are added and agitated, then the chloroform layer is analyzed by gas chromatography to quantify methyl ester of all fatty acids.

In one embodiment, the ability to decompose/assimilate oil and fat and fatty acid of a microorganism can be evaluated by analyzing oil and fat and fatty acid that is the decomposition product remaining in a medium by thin-layer chromatography. Specific procedure involves firstly adding chloroform at an equal amount to the culture supernatant to extract oil and fat. 5 μl of the extract is developed on a silica gel coated plate by using a development solvent comprising chloroform, acetone, and methanol at a ratio of 96:4:1 by volume. The ratio of the development solvent and the like can be appropriately changed. For example, chloroform, acetone, and methanol at a ratio of 96:4:2 by volume can also result in an excellent result. The plate is treated with molybdophosphoric acid n-hydrate to color oil and fat and/or fatty acid.

In one embodiment, the ability to decompose/assimilate ester (e.g., oil and fat) and fatty acid of a microorganism can be evaluated by studying the ability to grow in a medium having each of oil and fat or fatty acid as the sole carbon source.

In one embodiment, a microorganism in the combination of microorganisms of the present disclosure has an ability to produce esterase (e.g., lipase).

In one embodiment, lipase activity can be determined by performing an enzymatic reaction using 4-nitrophenyl palmitate (4-NPP), which is an ester of palmitic acid and 4-nitrophenol, as the substrate and determining the amount of 4-nitrophenol resulting from hydrolysis of the ester by measuring an absorbance at 410 nm. Firstly, 4-NPP (18.9 mg) is added to 3% (v/v) Triton® X-100 (12 ml) and dissolved at 70° C. to prepare a substrate solution. 1 mL of the substrate solution, 0.9 mL of ion exchange water, and 1 mL of 150 mM GTA buffer (which is prepared by adding NaOH or HCl to 150 mM 3,3-dimethylglutaric acid, 150 mM Tris, and 150 mM 2-amino-2-methyl-1,3-propanediol and adjusting its pH to 7) are placed in a cell and incubated for 5 minutes at 28° C. 0.1 mL of culture supernatant is added thereto, and the value at 410 nm is measured while agitating. Lipase activity is calculated in units per 1 mL of culture supernatant by measuring the activity under the definition of the amount of enzyme producing 1 μmol of 4-nitrophenol as one unit (U).

In one embodiment, a microorganism in the combination of microorganisms of the present disclosure can be capable of growing/decomposing oil entity under a weak acidic condition (e.g., pH of about 5.5 to 6.0).

In one embodiment, the ability of a microorganism to grow can be found by a method of measuring the absorbance (turbidity) at 660 nm as the bacterial optical density, a method of measuring colony forming unit (CFU), or the like. The latter spreads a certain amount of the undiluted and diluted solutions of culture on an agar medium and counts the colonies formed by stationary culture.

Those skilled in the art can test a derivative strain of a KH-1 strain, KH-1AL1 strain, KH-1AL2 strain, KH-1AL3 strain, or KH-2 strain, KH-2AL1 strain, or KH-2AL3 strain by suitably using the measurement method described above to obtain a derivative strain having the biological function (or the extent thereof) described above.

In one embodiment, a *Burkholderia bacterium* and/or a *Yarrowia* yeast in the combination of microorganisms of the present disclosure can be selected based on the result from KH-1 strain+this *Yarrowia* yeast or this *Burkholderia bacterium*+KH-2 strain being equivalent to or better than that from the KH-1 strain alone or the KH-2 strain alone.

In one embodiment, for example, when the measurement value of total fatty acids determined by analyzing the culture supernatant by gas chromatography wherein a KH-1 strain+a *Yarrowia* yeast or a *Burkholderia bacterium*+a KH-2 strain are inoculated into an inorganic salt medium supplemented with 1% (v/v) canola oil at a cell concentration of $5\times10^5$ cells/mL in total and cultured at a pH of 7.0 and 15° C. for 48 hours or cultured at a pH of 7.0 and 28° C. for 18 hours is less than 200%, less than 180%, less than 160%, less than 140%, less than 120%, less than 100%, less than 70%, or less than 50% in comparison to the measurement value of total fatty acids of the KH-1 strain+KH-2 strain under the same condition, the *Burkholderia bacterium* and/or the *Yarrowia* yeast can be suitably used.

In one embodiment, when the amount of expression of a specific *Burkholderia bacterium* lipase as analyzed by quantitative PCR for total RNA extracted from the cells from a 71 hours culture at a pH of 7.0 and 15° C. wherein each microorganism is inoculated into an inorganic salt medium supplemented with 1% (v/v) canola oil at a bacterial optical density so that a measurement value of $OD_{660}$ would be KH-1 strain:*Yarrowia* yeast or *Burkholderia bacterium*: KH-2 strain=0.018:0.02, is 50% or greater, 70% or greater, 100% or greater, 120% or greater, 140% or greater, 160% or greater, 180% or greater, or 200% or greater in comparison to the amount of expression of a *Burkholderia bacterium* lipase in mixed culture of the KH-1 strain+the KH-2 strain under the same condition, the *Burkholderia bacterium* or the *Yarrowia* yeast can be suitably used.

In one embodiment, when the amount of expression of a specific *Yarrowia* yeast lipase as analyzed by quantitative PCR for total RNA extracted from the cells from a 48 hours culture at a pH of 7.0 and 15° C. wherein each microorganism is inoculated into an inorganic salt medium supplemented with 1% (v/v) canola oil so that KH-1 strain: *Yarrowia* yeast or *Burkholderia bacterium*:KH-2 strain=$2.5\times10^5$ cells/mL:$2.5\times10^E$ cells/mL, is 50% or greater, 70% or greater, 100% or greater, 120% or greater, 140% or greater, 160% or greater, 180% or greater, or 200% or greater in comparison to the amount of expression of a *Yarrowia* yeast lipase in mixed culture of the KH-1 strain and the KH-2 strain under the same condition, the *Burkholderia bacterium* and/or the *Yarrowia* yeast can be suitably used.

(Composition or Combination)

In one aspect, the present disclosure provides a composition or a combination comprising the microorganism of the present disclosure. In one aspect, the present disclosure provides a composition or a combination comprising a culture supernatant of the microorganism of the present disclosure. The microorganism of the present disclosure can be manufactured by culturing with any suitable method. In one embodiment, a composition or a combination is an oil entity decomposing agent. In one embodiment, a composition or a combination is an oil entity decomposing agent for decomposing trans fatty acid (e.g., elaidic acid, palmitelaidic acid, and/or vaccenic acid), for decomposing trans fatty acid-containing oil and fat, for decomposing ester (e.g., oil and fat) and/or fatty acid at 15° C., for decomposing short-chain to medium-chain fatty acid (C2 to C12)-containing ester, and/or for decomposing short-chain to long-chain fatty acid (C2 or greater)-containing oil and fat. In one embodiment, a composition is a fatty acid decomposing agent. A compound comprising fewer carbons than the number of carbons contained in fatty acid can be produced by treatment with the fatty acid decomposing agent of the present disclosure. In one embodiment, a composition is a trans fatty acid (e.g., elaidic acid, palmitelaidic acid, and/or vaccenic acid) decomposing agent.

In one aspect, the present disclosure provides a composition or a combination comprising at least one microorganism in the combination of microorganisms of the present disclosure. In this aspect, the combination of microorganisms of the present disclosure is provided in a composition (optionally combined with a microorganism that would result in the combination of microorganisms of the present disclosure) or a combination. At least one microorganism in the combination of microorganisms of the present disclosure can be manufactured by culturing with any suitable method. The combination of microorganisms of the present disclosure used in this composition or the combination may be any of the combinations of microorganisms of the present disclosure described above.

In one embodiment, the composition or the combination of the present disclosure is an oil entity decomposing agent. In one embodiment, the composition of the present disclosure is a composition for improving lipase expression and/or production of one of a *Burkholderia bacterium* and a *Yarrowia* yeast in the combination of microorganisms of the present disclosure, wherein the composition comprises the other of the *Burkholderia bacterium* and the *Yarrowia* yeast. In one embodiment, lipase includes a first lipase (base sequence: SEQ ID NO: 1, amino acid sequence: SEQ ID NO: 2, or a variant thereof or the like), a second lipase (base sequence: SEQ ID NO: 3, amino acid sequence: SEQ ID NO: 4, or a variant thereof or the like) of a *Burkholderia bacterium*, a first lipase (base sequence: SEQ ID NO: 5, amino acid sequence: SEQ ID NO: 6, or a variant thereof or the like), and/or a second lipase (base sequence: SEQ ID NO: 7, amino acid sequence: SEQ ID NO: 8, or a variant thereof or the like) of a *Yarrowia* yeast. In one embodiment, the composition or the combination of the present disclosure is an oil entity decomposing agent for decomposing oil and fat and/or fatty acid at a predetermined temperature (e.g., 15° C., 28° C.), for decomposing short-chain to medium-chain fatty acid (C2 to C12)-containing oil and fat, and/or for decomposing short-chain to long-chain fatty acid (C2 or greater)-containing oil and fat. Even if an oil entity decomposing agent comprises only one microorganism (e.g., either a *Burkholderia bacterium* or a *Yarrowia* yeast) of the combination of microorganisms of the present disclosure, and does not exhibit a desired ability to decompose oil and fat and/or fatty acid by itself, the oil entity decomposing agent only needs to exhibit a desired ability to decompose oil and fat and/or fatty acid when used to form the combination of microorganisms of the present disclosure. In one embodiment, a composition is a fatty acid decomposing agent. A compound comprising fewer carbons than the number of carbons contained in fatty acid can be produced by treatment with the fatty acid decomposing agent of the present disclosure.

(Subject of Application)

In one embodiment, examples of oil and fat to which the oil entity decomposing agent of the present disclosure is applied include, but are not limited to, vegetable oil and fat (cottonseed oil, rapeseed oil, soybean oil, corn oil, olive oil, safflower oil, rice oil, sesame oil, palm oil, coconut oil, peanut oil, and the like), animal oil and fat (lard, beef tallow, milk fat, and the like), fish oil, processed products of such oil and fat (margarine, shortening, butter, and the like), insulating oil, lubricating oil, and the like. Oil and fat can be in a form of an emulsion or in a free state.

In a specific embodiment, oil and fat to which the oil entity decomposing agent of the present disclosure is applied is oil and fat comprising trans fatty acid (e.g., elaidic acid, palmitelaidic acid, and/or vaccenic acid). Examples of such oil and fat include, but are not limited to, processed products such as oil and fat manufactured by hydrogenation (margarine, shortening, butter, and the like) Addition of hydrogen reduces the number of double bonds in unsaturated fatty acid and increases the ratio of saturated fatty acid, but can result in the generation of trans fatty acid. It is understood that margarine, fat spread and shortening manufactured by hydrogenation, bread, cakes, donuts, other confectionary, fried food, and the like using them as an ingredient, and the like contain trans fatty acid. Oil entity extracted from plants or fish is treated at a high temperature to eliminate undesirable odor in the purification step of the oil entity. During this step, trans fatty acid is produced from cis unsaturated fatty acid contained in oil entity, so that purified vegetable oil such as salad oil is also understood to contain a trace amount of trans fatty acid.

The subject to which the oil entity decomposing agent or fatty acid decomposing agent of the present disclosure is applied is not particularly limited. Examples thereof include, but are not limited to, industrial wastewater, domestic wastewater, industrial waste, domestic waste (food waste and the like), animal farming waste, aquaculture farms (and wastewater therefrom), animal sheds (and wastewater therefrom), slaughterhouses (and wastewater therefrom), soil contaminated with oil entity, water contaminated with oil entity (ocean, pond, river, animal drinking water, etc.), body surfaces of an animal, water tanks (for aquaculture, aquarium hobby, and the like), any oil entity contaminated product (dishes, machine parts, and the like), grease traps installed in the kitchen or the like, drain pipes, fatbergs, insulating oil leaking from a transformer or the like, deteriorated insulating oil, and the like. A "grease trap" is an apparatus for separating and collecting oil in wastewater, typically comprised of three tanks. The first tank comprises a basket and captures fragments of food ingredients, leftover food, and the like. The second tank separates oil entity from water. Wastewater separated from oil entity is sent to the third tank, where precipitating trash and the like is removed. Installation of a grease trap is mandatory for industrial kitchens in restaurants, hospitals, hotels, and the like. When applied to a grease trap, a decomposition/treatment tank can be provided separately, but an oil entity decomposing agent or microorganism can be directly added to the grease trap for decomposition/treatment within the grease trap.

Since the combination of microorganisms of the present disclosure is also highly efficient in treatment at a low temperature, there can be embodiments where low temperature treatment is desirable. For example, subjects for which treatment at less than 20° C. (e.g., 15° C.) is envisioned such as industrial wastewater, domestic wastewater, industrial waste, domestic waste (food waste and the like), soil contaminated with oil entity, and water contaminated with oil entity (ocean, pond, river, animal drinking water, and the like) are also preferred examples of subjects to be treated by the combination of microorganisms of the present disclosure.

Specifically, a formulation or the like is administered or added, or a carrier with one or more of the combination of microorganisms of the present disclosure immobilized thereon or the like is installed within a wastewater path, wastewater storage tank, grease trap, or the like. A dedicated decomposition treatment tank can also be provided separately outside the grease trap.

In one embodiment, examples of wastewater include, but are not limited to, wastewater from restaurants, hospitals, hotels, or the like, domestic wastewater, industrial wastewater discharged from a food processing factory or oil entity processing factory, and the like.

(Usage Form)

Examples of forms of the combination of microorganisms, combination product, or composition of the present disclosure include liquid forms, solid forms, and the like. Examples of combinations of microorganisms, combination products, or compositions in a liquid state include microorganism culture, microorganisms harvested from culture by centrifugation or the like and re-dispersed in water, buffer, or culture medium, and the like. Examples of microorganisms or compositions in a solid state include those that are dehydrated by centrifugation, press compression, or the like, those in a paste/mayonnaise-like state between a solid and liquid, dried forms that have been dried (e.g., vacuum drying or lyophilization). Examples of solid forms include powder, granules, tablets, and the like. The combination of microorganisms of the present disclosure can also be provided in a state where a microorganism or a culture supernatant is immobilized on a carrier.

In one embodiment, the combination of microorganisms of the present disclosure and a composition or a combination providing the same can be added to a liquid so that the total microorganisms would be at a cell concentration of about $1 \times 10^8$ cells/mL, about $1 \times 10^7$ cells/mL, about $1 \times 10^6$ cells/mL, about $1 \times 10^5$ cells/mL, about $1 \times 10^4$ cells/mL, about $1 \times 10^3$ cells/mL, about $1 \times 10^2$ cells/mL, about 10 cells/mL, or about 1 cell/mL.

(Applicable Environment)

The combination of microorganisms of the present disclosure and a composition or a combination providing the same can be used in any suitable environment. In one embodiment, the combination of microorganisms of the present disclosure and a composition or a combination providing the same can be used in an environment of 10 to 60° C., 12 to 50° C., 15 to 40° C., 20 to 35° C., less than 60° C., less than 50° C., less than 40° C., less than 30° C., less than 25° C., less than 20° C., less than 15° C., about 60° C., about 50° C., about 40° C., about 30° C., about 25° C., about 15° C., or about 10° C.

In one embodiment, the combination of microorganisms of the present disclosure and a composition or a combination providing the same can be used in an environment with a pH of 4 to 12, pH of 5 to 11, pH of 6 to 10, pH of 7 to 9, pH of 5.5 to 8.5, pH of about 4, pH of about 5, pH of about 6, pH of about 7, pH of about 8, pH of about 9, pH of about 10, or pH of about 11.

In one embodiment, the combination of microorganisms of the present disclosure and a composition or a combination providing the same can be used in an environment with a dissolved oxygen concentration (DO) of 0.05 mg/L or greater, 0.1 mg/L or greater, 0.5 mg/L or greater, or 1 mg/L or greater.

In one embodiment, the combination of microorganisms of the present disclosure and a composition or a combination providing the same can be used in an environment (e.g., in wastewater) with a normal hexane value of 100 to 40000 mg/L, 200 to 30000 mg/L, or 300 to 30000 mg/L. While solid waste (may contain water) from food waste treatment, a slurry of sludge, or the like can have a higher concentration of oil and fat, the combination of microorganisms of the present disclosure and a composition or a combination providing the same can also be applied usefully on such solid waste in one embodiment.

In one embodiment, the microorganism, the composition, or the combination of the present disclosure can be added to a subject comprising trans fatty acid at 50% by weight or greater, 20% by weight or greater, 10% by weight or greater, 7% by weight or greater, 5% by weight or greater, 2% by weight or greater, 1% by weight or greater, 0.7% by weight or greater, 0.5% by weight or greater, 0.2% by weight or greater, 0.1% by weight or greater, 0.07% by weight or greater, 0.05% by weight or greater, 0.02% by weight or greater, 0.01% by weight or greater, 0.007% by weight or greater, 0.005% by weight or greater, 0.002% by weight or greater, or 0.001% by weight or greater.

In one embodiment, the microorganism, the composition, or the combination of the present disclosure can be added to a subject with a ratio of trans fatty acid in the contained ester (e.g., oil and fat) of 50% by weight or greater, 20% by weight or greater, 10% by weight or greater, 7% by weight or greater, 5% by weight or greater, 2% by weight or greater, 1% by weight or greater, 0.7% by weight or greater, 0.5% by weight or greater, 0.2% by weight or greater, 0.1% by weight or greater, 0.07% by weight or greater, 0.05% by weight or greater, 0.02% by weight or greater, 0.01% by weight or greater, 0.007% by weight or greater, 0.005% by weight or greater, 0.002% by weight or greater, or 0.001% by weight or greater.

In one embodiment, nitrogen can be present in a subject to which the microorganism or the combination of microorganisms of the present disclosure and a composition or a combination providing the same are added in a form that is available to the microorganism, preferably in a form comprising ammonium salt, nitric acid salt, sulfuric acid salt, or an organic nitrogen compound, more preferably ammonium sulfate, urea, amino acid, or a peptide such as peptone, tryptone, or casamino acid. The amount of nitrogen that is present can be in the range of C/N=2 to 50, preferably C/N=2 to 30, and more preferably C/N=2 to 20, provided that C/N is a weight ratio of normal hexane derived carbon atoms to nitrogen atoms contained in wastewater. In one embodiment, nitrogen can be further added to attain such a range.

In one embodiment, phosphorous (P) can be present in a subject to which the microorganism or the combination of microorganisms of the present disclosure and a composition or a combination providing the same are added in a form that is available to the microorganism, preferably in a form of phosphoric acid salt or nucleic acid, more preferably phosphoric acid salt. The amount of phosphorous that is present can be an amount at which N/P=1 to 20 with respect to nitrogen, provided that N/P is the weight ratio of nitrogen atoms to phosphorous atoms contained in wastewater. In one embodiment, phosphorous can be further added to attain such a range.

In one embodiment, the microorganism or the combination of microorganisms of the present disclosure and a composition or a combination providing the same can be used under a condition with a salt, surfactant, light, electric current, agitating, aeration, or any combination thereof.

In one embodiment, the microorganism or the combination of microorganisms of the present disclosure and a composition or a combination providing the same can be applied after removing a substance (chlorine, antibiotic, or the like) that kills and suppresses the growth of the microorganism of the present disclosure.

In one embodiment, the microorganism or the combination of microorganisms of the present disclosure and a composition or a combination providing the same can be used with a carrier on which the microorganism can be immobilized. Washout can be effectively avoided by using such a carrier. The material of a carrier is not particularly limited, as long as a microorganism can be immobilized. Examples thereof include carbon fiber (PAN based, pitch based, phenol resin based, and the like), polyethylene resin, polypropylene resin, polyurethane resin, polystyrene resin, polyvinyl chloride resin, polyvinyl acetate resin, polyvinyl alcohol resin, polyethylene glycol resin, acrylic resin, gelatin, sodium alginate, carrageenan, dextran, ceramics, silicon, metal, charcoal, activated carbon, minerals (zeolite, diatomaceous earth, and the like), and composites thereof, and the like. It is preferable to use a porous or fibrous carrier to increase the rate of immobilization of microorganisms and the efficacy of the microorganisms. A microorganism can also be encapsulated in a gel-like carrier. Examples of shapes of a carrier include cubic, cuboidal, cylindrical, spherical, discoidal, sheet-like, membrane-like, and the like. For techniques of immobilizing microorganisms, see, for example, "Biseibutsu Koteika Ho niyoru Haisui Shori [Wastewater treatment by microorganism immobilization method], (Edited and authored by Ryuichi Sudo, The Industrial Water Institute)", "Biseibutsu Koteika Ho niyoru Mizushori—Tantai Koteika Ho Hokatsu Koteika Ho, Seibutsu Kasseitan Ho (Atarashii Mizushori Shiriizu (1) [Water treatment by microorganism immobilization method—carrier immobilization method and comprehensive immobilization method, Biological activated carbon method (New water treatment series (1)]) (Kazuhiro Mochizuki, Katsutoshi Hori, Hideki Tachimoto (authors), NTS Inc.)", or the like.

(Additional Components)

In one embodiment, the microorganism or the combination of microorganisms of the present disclosure and a composition or a combination providing the same can be used in combination with an additional component. In one embodiment, an additional component can be added to a composition or a combination, or used separately from a microorganism or a combination of microorganisms. When used separately, components can be provided as a kit.

In one embodiment, examples of the additional component include, but are not limited to, components elevating the activity of the microorganism that is used (e.g., carbon source or nitrogen source), surfactants, dry protection agents, components for maintaining a microorganism for a long period of time, antiseptics, excipients, reinforcing agents, antioxidants, another microorganism, and the like. Any suitable component can be used.

In one embodiment, examples of another microorganism include microorganisms that decompose (assimilate) glycerol, microorganisms that decompose (assimilate) proteins, amino acids, nucleic acids, or polysaccharides (e.g., cellulose), and the like. Another microorganism is preferably capable of coexisting with the microorganism of the present disclosure.

Examples of microorganisms that decompose (assimilate) glycerol that can be used include eubacteria, yeast, and filamentous eubacteria. Preferably, yeast in the genus *Candida* is used. Specific examples of yeast in the genus *Candida* include the *Candida cylindracea* SL1B2 (deposited with the National Institute of Technology and Evaluation, Patent Microorganisms Depositary under accession number NITE P-714). The bacterial strain has an excellent ability to assimilate glycerol. Concomitant use of microorganisms that decompose (assimilate) glycerol can prevent a decrease in the rate of decomposing oil and fat due to accumulation of glycerol and make it possible to achieve an even more efficient decomposition of oil and fat.

(Method of Using Microorganism)

In one aspect, the present disclosure provides a method of decomposing and removing ester (e.g., oil and fat) and/or fatty acid, comprising causing the microorganism, the composition, or the combination of the present disclosure to act on a subject of treatment. The subject of treatment can comprise trans fatty acid (e.g., elaidic acid, palmitelaidic acid, and/or vaccenic acid) or trans fatty acid-containing oil and fat. A subject of treatment can be any subject of treatment described herein to which the microorganism, the composition, or the combination of the present disclosure can be applied. The method of decomposing and removing ester (e.g., oil and fat) and/or fatty acid of the present disclosure can be performed in any environment described herein in which the microorganism, the composition, or the combination of the present disclosure can be applied. In one embodiment, the method of decomposing and removing ester (e.g., oil and fat) and/or fatty acid of the present disclosure can comprise decomposing trans fatty acid (e.g., elaidic acid, palmitelaidic acid, and/or vaccenic acid), decomposing trans fatty acid-containing oil and fat, decomposing ester (e.g., oil and fat) and/or fatty acid at 15° C., decomposing short-chain to medium-chain fatty acid (C2 to C12)-containing ester, and/or decomposing short-chain to long-chain fatty acid (C2 or greater)-containing oil and fat. The method of decomposing and removing ester (e.g., oil and fat) and/or fatty acid of the present disclosure can use any additional component described herein, which can be used in combination with the microorganism, the composition, or the combination of the present disclosure.

In one aspect, the present disclosure provides a method of decomposing and removing oil and fat and/or fatty acid, comprising causing the combination of microorganisms of the present disclosure and a composition or a combination providing the same to act on a subject of treatment. In one aspect, the present disclosure provides a method of improving lipase production of at least one of a *Burkholderia* bacterium and a *Yarrowia* yeast in the combination of microorganisms of the present disclosure, comprising mixing (e.g., causing symbiosis) and culturing the *Burkholderia* bacterium and the *Yarrowia* yeast. The combination of microorganisms of the present disclosure can be applied as a combination, or can be applied so as to provide the combination of microorganisms of the present disclosure as a result of application of each of the microorganisms (or a composition comprising the same). Any embodiment is herein described as causing the combination of microorganisms of the present disclosure to act, applying said combination, or adding said combination.

In one embodiment, the method of decomposing and removing ester (e.g., oil and fat) and/or fatty acid of the present disclosure comprises a step of adding the microorganism or the combination of microorganisms of the present disclosure and a composition or a combination providing the same to an oil and fat decomposition tank, wherein the addition can be continuous or successive. The HRT (hydraulic retention time) in an oil and fat decomposition tank is generally 12 hours or longer, preferably 18 hours or longer, more preferably 20 hours or longer, and still more preferably 24 hours or longer. If 80% or more reduction in the normal hexane value is expected in wastewater with normal hexane exceeding 10000 mg/L, the HRT can generally be 18 hours or longer, preferably 20 hours or longer, and more preferably 24 hours or longer. If 80% or more reduction in the normal hexane value is expected in wastewater with a normal hexane value of 3000 mg/L or less, the HRT can generally be 8 hours or longer, preferably 12 hours or longer, and more preferably 18 hours or longer.

The microorganism concentration in an oil and fat decomposition tank can be dependent on the ester (e.g., oil and fat) and/or fatty acid concentration in wastewater. The bacterial concentration can be maintained higher at a higher oil and fat and/or fatty acid concentration. In case of foaming in the oil and fat decomposition tank, defoaming measures such as reducing the HRT, showering, or adding a defoamer may be taken. However, defoamers can inhibit the growth of microorganisms, so it is desirable to set the amount to be added while taking this into consideration.

For low concentration wastewater with a normal hexane value of water flowing in of about 300 mg/L or less, the normal hexane of water flowing out from an oil and fat decomposition tank is preferably 60 mg/L or less, and more preferably 30 mg/L or less. For moderate concentration wastewater with a normal hexane value of water flowing in of about 3000 mg/L, the normal hexane value of water flowing out from an oil and fat decomposition tank is preferably 600 mg/L or less, more preferably 300 mg/L or less, still more preferably 150 mg/L or less, and most preferably 30 mg/L or less. For high concentration wastewater with a normal hexane value of water flowing in of about 10000 mg/L, the normal hexane value of water flowing out from an oil and fat decomposition tank is preferably 1000 mg/L or less, more preferably 500 mg/L or less, still more preferably 100 mg/L or less, and most preferably 30 mg/L or less. For ultrahigh concentration wastewater with a normal hexane value of water flowing in of about 30000 mg/L or greater, the n-Hex value of water flowing out from an oil and fat decomposition tank is preferably 3000 mg/L or less, more preferably 1000 mg/L or less, and still more preferably 300 mg/L or less.

In one embodiment, the normal hexane value of oil and fat and/or fatty acid-containing wastewater can be reduced by preferably 80% or greater, more preferably 90% or greater, still more preferably 95% or greater, and most preferably 99% or greater by the method of the present disclosure. As a result, the normal hexane value of water flowing out from an oil and fat decomposition tank can be reduced in most wastewater to less than 30 mg/L, which is the reference value of release into the sewage system at many municipalities. If such a reference value is achieved, even the main treatment such as active sludge treatment in the later stage would not be needed in terms of just the normal hexane value.

The amount of microorganism added does not need to be increased in water flowing out from an oil and fat decomposition tank. The amount of microorganisms added in water flowing out is preferably 0.01-fold or greater, more preferably 0.1-fold or greater, still more preferably 0.5-fold or greater, and most preferably 1-fold or greater with respect to the amount added.

The method of decomposing and removing oil and fat and/or fatty acid of the present disclosure can comprise an additional step besides the steps described above. Examples of such a step include a step of returning a part or all of the water flowing out from an oil and fat decomposition tank again to the oil and fat decomposition tank and the like. However, the method of the present disclosure can attain a sufficient effect of decomposing oil and fat and/or fatty acid without such a returning process, so that it is not essential to return a part or all of the water flowing out from an oil and fat decomposition tank again to the oil and fat decomposition tank.

(General Technology)

The molecular biological methodology, biochemical methodology, and microbiological methodology used herein are well-known and conventionally used in the art, which are described, for example, in Savli, H., Karadenizli, A., Kolayli, F., Gundes, S., Ozbek, U., and Vahaboglu, H. 2003. Expression stability of six housekeeping genes: A proposal for resistance gene quantification studies of *Pseudomonas aeruginosa* by real-time quantitative RT-PCR. J. Med. Microbiol. 52:403-408., Marie-Ange Teste, Manon Duquenne, Jean M Francois and Jean-Luc Parrou 2009. Validation of reference genes for quantitative expression analysis by real-time RT-PCR in *Saccharomyces cerevisiae*. BMC Molecular Biology 10:99, Seiji Ishii, Hiroshi Okumura, Chiyo Matsubara, Fumi Ninomiya, Hiroshi Yoshioka, 2004, "Netsukannousei Polima wo Mochiita Suichuyubun no Kani Sokutei Hoho [Simple method of measuring oil-in-water content using heat sensitive polymer]", Vol 46, No. 12, "Journal of water and waste", or the like. Relevant portions thereof (which may be the entire document) are incorporated herein by reference.

(Note)

As used herein, "or" is used when "at least one or more" of the listed matters in the sentence can be employed. When explicitly described herein as "within the range" of "two values", the range also includes the two values themselves.

Reference literatures such as scientific literatures, patents, and patent applications cited herein are incorporated herein by reference to the same extent that the entirety of each document is specifically described.

As described above, the present disclosure has been described while showing preferred embodiments to facilitate understanding. The present disclosure is described hereinafter based on Examples. The above descriptions and the following Examples are not provided to limit the present disclosure, but for the sole purpose of exemplification. Thus, the scope of the present invention is not limited to the embodiments and Examples specifically described herein and is limited only by the scope of claims.

EXAMPLES

The Examples are described hereinafter. When required, organisms used in the following Examples were handled in compliance with the guidelines stipulated by the Nagoya University, regulatory agency, or the Cartagena Protocol. For reagents, the specific products described in the Examples were used. However, the reagents can be substituted with an equivalent product from another manufacturer (Sigma-Aldrich, Fuji Film, Wako Pure Chemical, Nacalai Tesque, R & D Systems, USCN Life Science INC, Kanto Chemical, Funakoshi, Tokyo Chemical Industry, Merck, or the like). A supplementation concentration of various oil and fat, fatty acid, or the like to a medium refers to a final concentration of the substance in the medium, and a percentage notation for oil and fat or fatty acid with a liquid property represents volume/volume (v/v %) and a percentage notation for oil and fat or fatty acid with a solid property represents weight/volume (w/v %) unless specifically described otherwise.

Example 1: Identification of Microorganism that can Assimilate/Decompose Trans Fatty Acid-Containing Oil and Fat A storage population of yeast was cultured, and microorganisms were isolated therefrom. To study whether the isolated microorganisms can be cultured in a low temperature environment (15° C.), an agar medium comprising canola oil (Nissin canola oil, Nissin Oilio, Tokyo, Japan) as the sole carbon source was streaked with each isolated microorganism for inoculation and cultured for 5 days at 15° C. As a result, microorganisms that can be cultured at a low temperature and use oil and fat as a nutrient source were found.

The ability to decompose oil and fat at a low temperature (15° C.) of each microorganisms was studied. A colony of each microorganism was inoculated using a toothpick into a 20 mL inorganic salt medium ($Na_2HPO_4$ 3.5 g/L, $KH_2PO_4$ 2.0 g/L, $(NH_4)SO_4$ 4.0 g/L, $MgCl_2 \cdot 6H_2O$ 0.34 g/L, $FeSO_4 \cdot 7H_2O$ 2.8 mg/L, $MnSO_4 \cdot 5H_2O$ 2.4 mg/L, $CoCl_2 \cdot 6H_2O$ 2.4 mg/L, $CaCl_2 \cdot 2H_2O$ 1.7 mg/L, $CuCl_2 \cdot 2H_2O$ 0.2 mg/L, $ZnSO_4 \cdot 7H_2O$ 0.3 mg/L, and $Na_2MoO_4$ 0.25 mg/L) comprising 10 g/L of canola oil as the sole carbon source, and was cultured in a 100 mL Erlenmeyer flask. As a result, microorganisms that decompose and assimilate oil and fat and grow thereon at a low temperature were found.

The ability to decompose/assimilate trans fatty acid of each microorganism was then studied. Each microorganism was inoculated into 2 mL of inorganic salt medium (composition described above) to which elaidic acid was added at a final concentration of 0.2% as the sole carbon source, so that the final concentration would be $OD_{660}=0.04$. The microorganisms were cultured for 24 hours at 28° C. and at 130 rpm in a 15 mL Harmony centrifuge tube (LMS, Tokyo Japan). As a result, microorganisms that can decompose and assimilate trans fatty acid, i.e., elaidic acid, and grow were found.

These tests found that a certain isolated microorganism strain was capable of being cultured in a low temperature environment with oil and fat as a nutrient source, and assimilating (decomposing) oil and fat at a low temperature, and decomposes/assimilates trans fatty acid-containing oil and fat and trans fatty acid. This novel strain was named KH-2.

The subsequent analysis revealed that the KH-2 strain was *Yarrowia lipolytica*.

Here, analysis was performed with the focus on the KH-2 strain, but the ability to decompose oil and fat and/or fatty acid of other strains can also be identified by studying the ability to decompose oil and fat and/or fatty acid by the same test.

Figure 1:
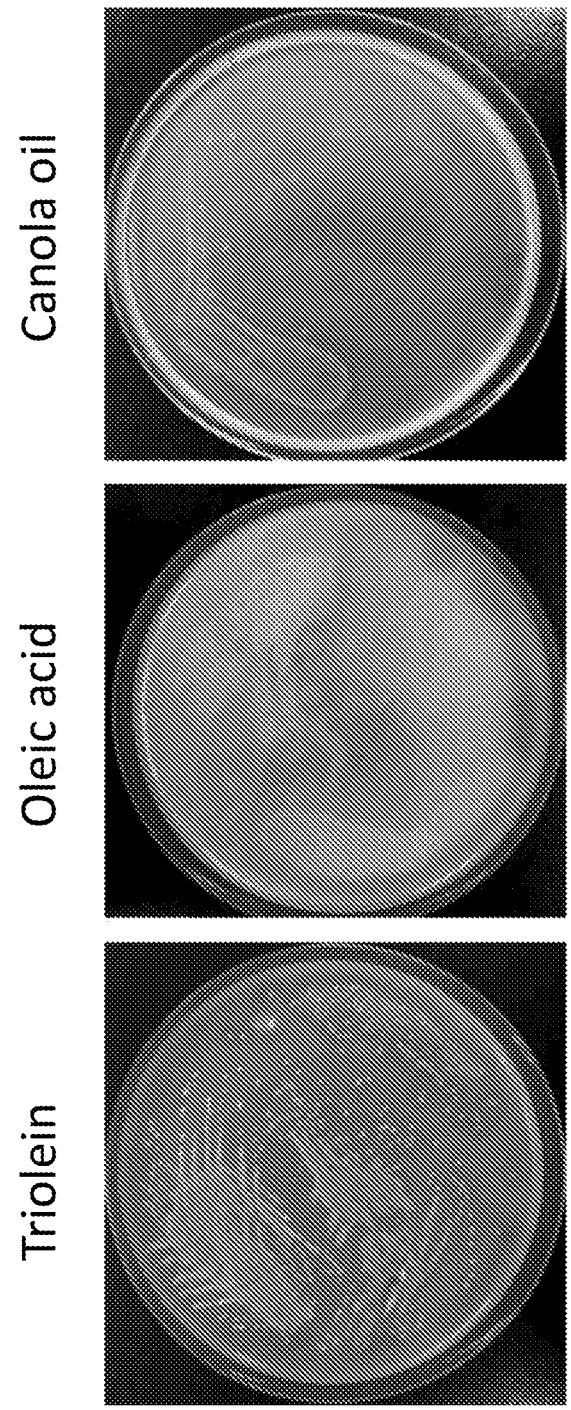
FIG. 1 shows pictures of a KH-2 strain that was cultured on a medium supplemented with triolein (left), oleic acid (center), or canola oil (right) for 3 days at 28° C.

Example 2: Ability of the KH-2 Strain to Assimilate/Decompose Oil and Fat/Fatty Acid The KH-2 strain was streaked on an agar medium comprising triolein, oleic acid, or canola oil (described above) as the sole carbon source (oil and fat or fatty acid final concentration of 1%, Triton® X-100 final concentration of 0.25%, polyvinyl alcohol final concentration of 0.5%, an inorganic salt agar medium (comprising 1.5% of agar in an inorganic salt medium) (a pH of 7.0)) and cultured for 3 days at 28° C. The composition of the inorganic salt medium is $Na_2HPO_4$ 3.5 g/L KH-2 strain $PO_4$ 2.0 g/L, $(NH_4)_2SO_4$ 4.0 g/L, $MgCl_2 \cdot 6H_2O$ 0.34 g/L, $FeSO_4 \cdot 7H_2O$ 2.8 mg/L, $MnSO_4 \cdot 5H_2O$ 2.4 mg/L, $CoCl_2 \cdot 6H_2O$ 2.4 mg/L, $CaCl_2 \cdot 2H_2O$ 1.7 mg/L, $CuCl_2 \cdot 2H_2O$ 0.2 mg/L, $ZnSO_4 \cdot 7H_2O$ 0.3 mg/L, and $Na_2MoO_4$ 0.25 mg/L. The results thereof are shown in FIG. 1. A colony was formed on every agar medium, which demonstrated that the KH-2 strain is capable of decomposing and assimilating canola oil which is representative oil and fat-containing vegetable oil, triolein which is triglyceride oil and fat, and oleic acid which is a decomposition product of these oil and fat and a typical example of free fatty acid and capable of growing.

Figure 2:
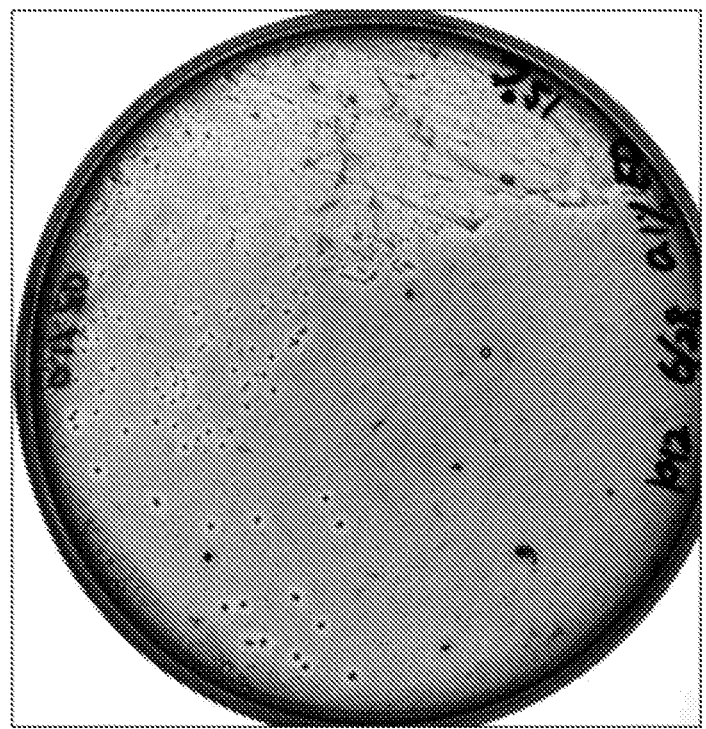
FIG. 2 shows a picture of a KH-2 strain that was cultured on a medium supplemented with elaidic acid for 14 days at 15° C.

Furthermore, the KH-2 strain was streaked on an agar medium comprising elaidic acid as the sole carbon source (elaidic acid final concentration of 0.1%, Triton® X-100 final concentration of 0.25%, an inorganic salt agar medium (a pH of 7.0)) and cultured for 14 days at 15° C. The results thereof are shown in FIG. 2. A colony was formed on the agar medium, which demonstrated that the strain is capable of decomposing and assimilating elaidic acid which is representative trans fatty acid and capable of growing.

Example 3A: Ability of the KH-2 Strain to Decompose Trans Fatty Acid at 28° C.

The abilities of the KH-2 strain and BioRemove3200 (BR3200) (Novozymes, Denmark) to decompose trans fatty acid at 28° C. were compared. Microorganisms were inoculated into 20 mL of inorganic salt medium (composition described above, a pH of 7.0) comprising 0.2% elaidic acid and 0.25% Triton® X-100 so as to be a KH-2 strain with a final bacterial optical density of $OD_{660}$=0.5 (HITACHI U-2810 spectrophotometer (Hitachi, Tokyo, Japan)) or $5 \times 10^6$ CFU/ml of BR3200, which is a concentration that is 5-fold of the manufacturer recommended concentration, and cultured for 24 hours at 28° C. with shaking at 130 rpm.

Oil and fat in the supernatant after the culture was analyzed by thin-layer chromatography. Specifically, chloroform at an equal amount was added to the culture supernatant, the mixture thereof was agitated, and then 12 µl of the chloroform layer was applied to a silica gel plate and developed with a chloroform:acetone:methanol (96:4:2) solution. After the development, molybdophosphoric acid n-hydrate solution (2.4 g/60 ml of ethanol) was sprayed to the plate, and the plate was heated for 12 minutes at 110° C. to make fatty acid visible. The amounts of fatty acid remaining in the medium were compared (FIG. 3A (a)).

Figure 3A:
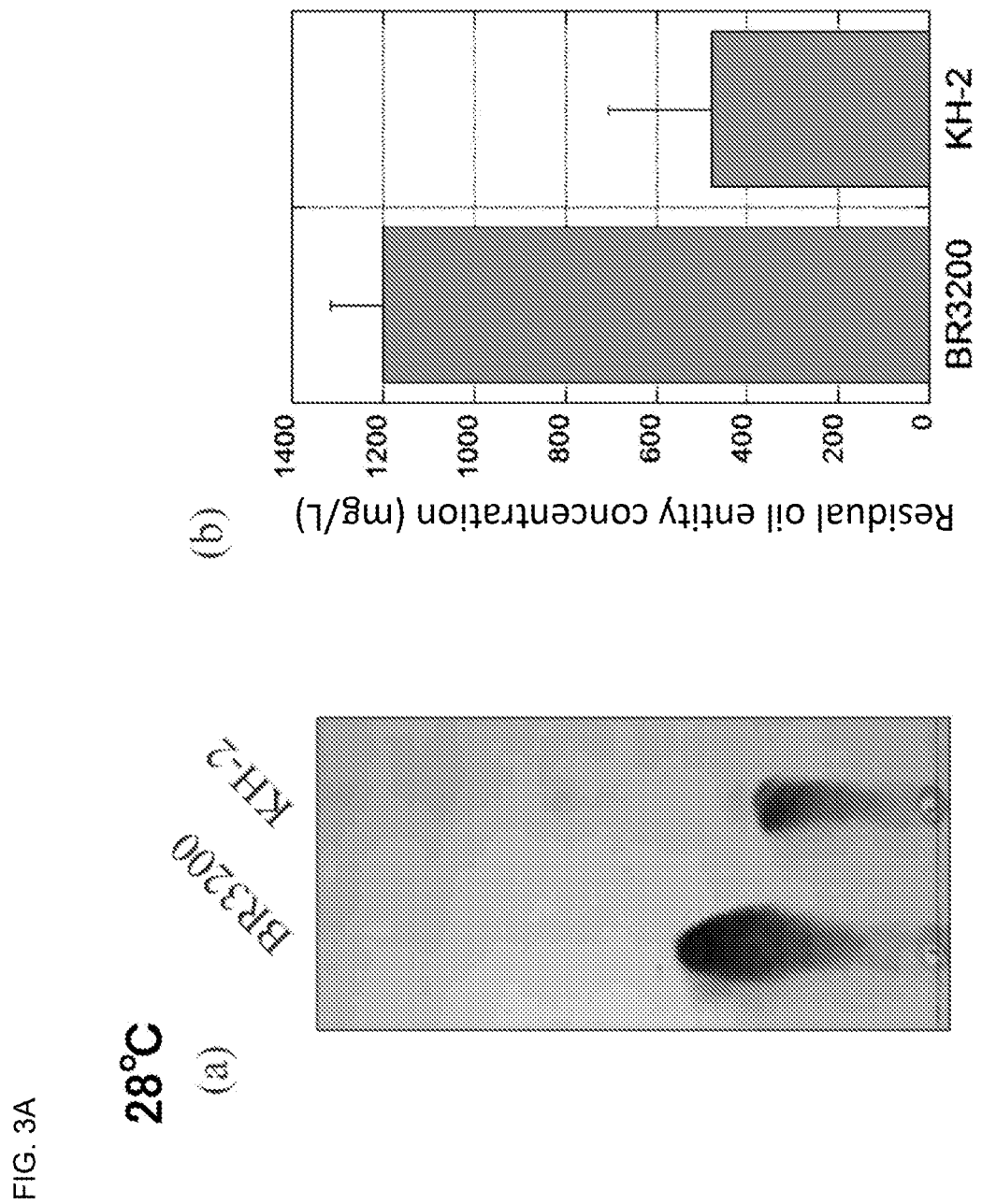
FIG. 3A shows the elaidic acid decomposition activity of BioRemove 3200 (BR3200) (Novozymes, Denmark) (left) or a KH-2 strain (right) at 28° C. (a) is a picture of detection of fatty acid in culture by thin-layer chromatography. (b) is the result of measuring oil entity content corresponding to a normal hexane value with an oil entity content measuring reagent kit. The left side shows the decomposition result from BR3200, and the right side shows the decomposition result from the KH-2 strain.

0.5 mL of the supernatant resulting from 24 hour culture was analyzed by using an oil entity content measuring reagent kit (Kyoritsu Chemical Check Lab, Tokyo, Japan) (measuring reagent kit using a method of measuring poly (N-isopropylacrylamide) extracted substances) in accordance with the manufacturer recommended protocol (FIG. 3A (b)).

The KH-2 strain was found to have a strong ability to decompose trans fatty acid.

Example 3B: Ability of the KH-2 Strain to Decompose Trans Fatty Acid at 15° C.

The abilities of a KH-2 strain and BioRemove3200 (BR3200) (Novozymes, Denmark) to decompose trans fatty acid at 15° C. were compared. Microorganisms were inoculated into 20 mL of inorganic salt medium (composition described above, a pH of 7.0) comprising 0.2% elaidic acid and 0.25% Triton® X-100 so as to be a KH-2 strain with a final bacterial optical density of $OD_{660}$=0.8 (HITACHI U-2810 spectrophotometer (Hitachi, Tokyo, Japan)) or $8 \times 10^6$ CFU/ml of BR3200, which is a concentration that is 8-fold of the manufacturer recommended concentration, and cultured for 48 hours at 15° C. with shaking at 130 rpm.

Oil and fat in the supernatant after the culture was analyzed by thin-layer chromatography. Specifically, chloroform at an amount that is ½ was added to the culture supernatant, the mixture thereof was agitated, and then 5 µl of the chloroform layer was applied to a silica gel plate and developed with a chloroform:acetone:methanol (96:4:1) solution. After the development, molybdophosphoric acid n-hydrate solution (2.4 g/60 ml of ethanol) was sprayed to the plate, and the plate was heated for 12 minutes at 110° C. to make fatty acid visible. The amounts of fatty acid remaining in the medium were compared (FIG. 3B (a)).

Figure 3B:
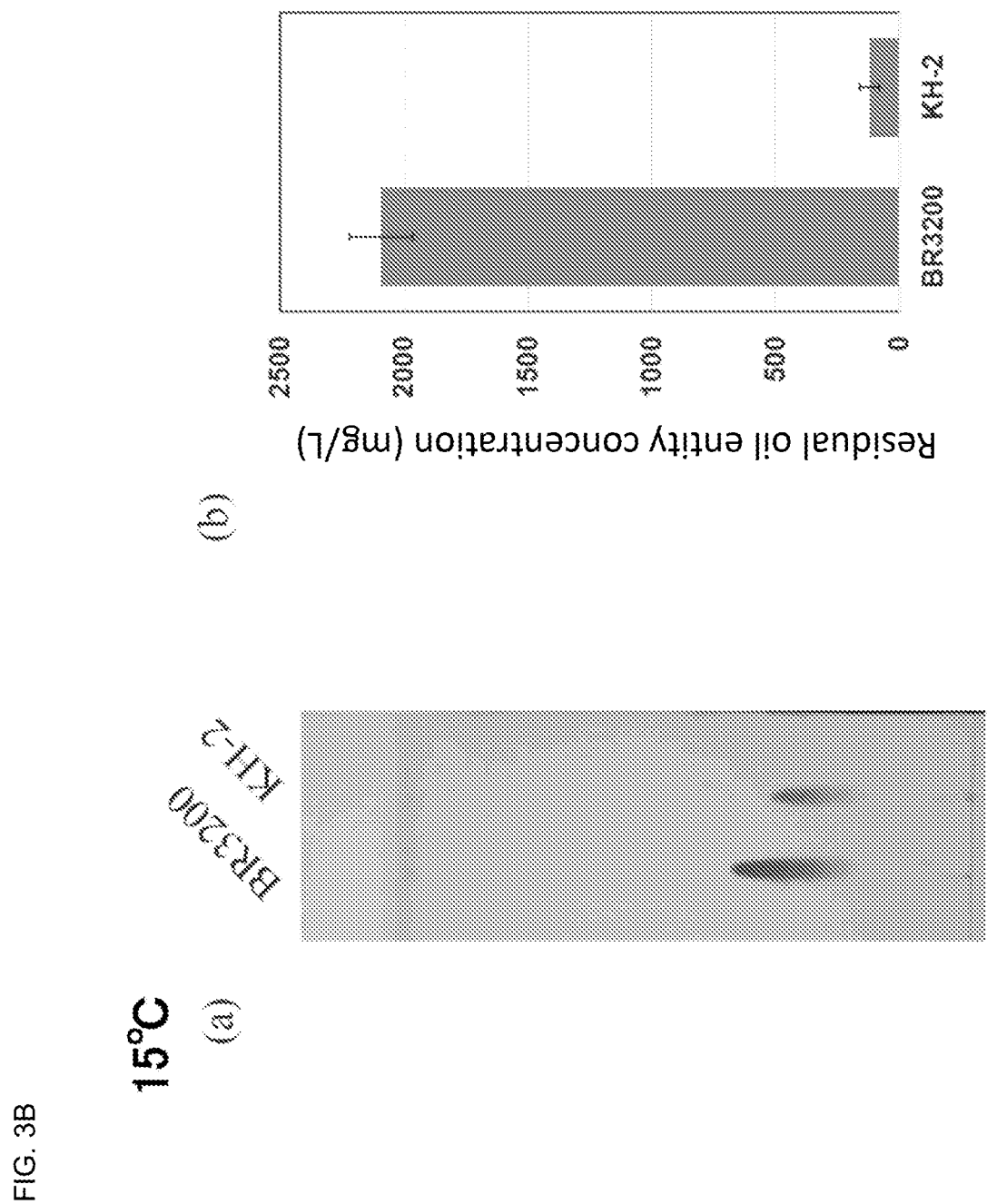
FIG. 3B shows the elaidic acid decomposition activity of BioRemove 3200 (BR3200) (Novozymes, Denmark) (left) or a KH-2 strain (right) at 15° C. (a) is a picture of detection of fatty acid in culture by thin-layer chromatography. (b) is the result of measuring oil entity content corresponding to a normal hexane value with an oil entity content measuring reagent kit. The left side shows the decomposition result from BR3200, and the right side shows the decomposition result from the KH-2 strain.

0.5 mL of the supernatant after culture for 48 hours was analyzed by using an oil entity content measuring reagent kit (Kyoritsu Chemical Check Lab, Tokyo, Japan) (measuring reagent kit using a method of measuring poly (N-isopropylacrylamide) extracted substances) in accordance with the manufacturer recommended protocol (FIG. 3B (b)).

The KH-2 strain was found to have a strong ability to decompose trans fatty acid even at a low temperature (15° C.)

Example 4A: Ability of the KH-2 Strain to Decompose Trans Fatty Acid-Containing Oil and Fat The ability of the KH-2 strain to decompose trans fatty acid-containing oil and fat at 15° C. and 28° C. was tested. A KH-2 strain was inoculated into an inorganic salt medium (BS) comprising 0.1% trielaidin with a final bacterial optical density of $OD_{660}$=0.8 (HITACHI U-2810 spectrophotometer (Hitachi, Tokyo, Japan)) and cultured for 6 days at 15° C. or 28° C. with shaking at 130 rpm, and compared with a control sample to which a microorganism was not added.

Figure 4:
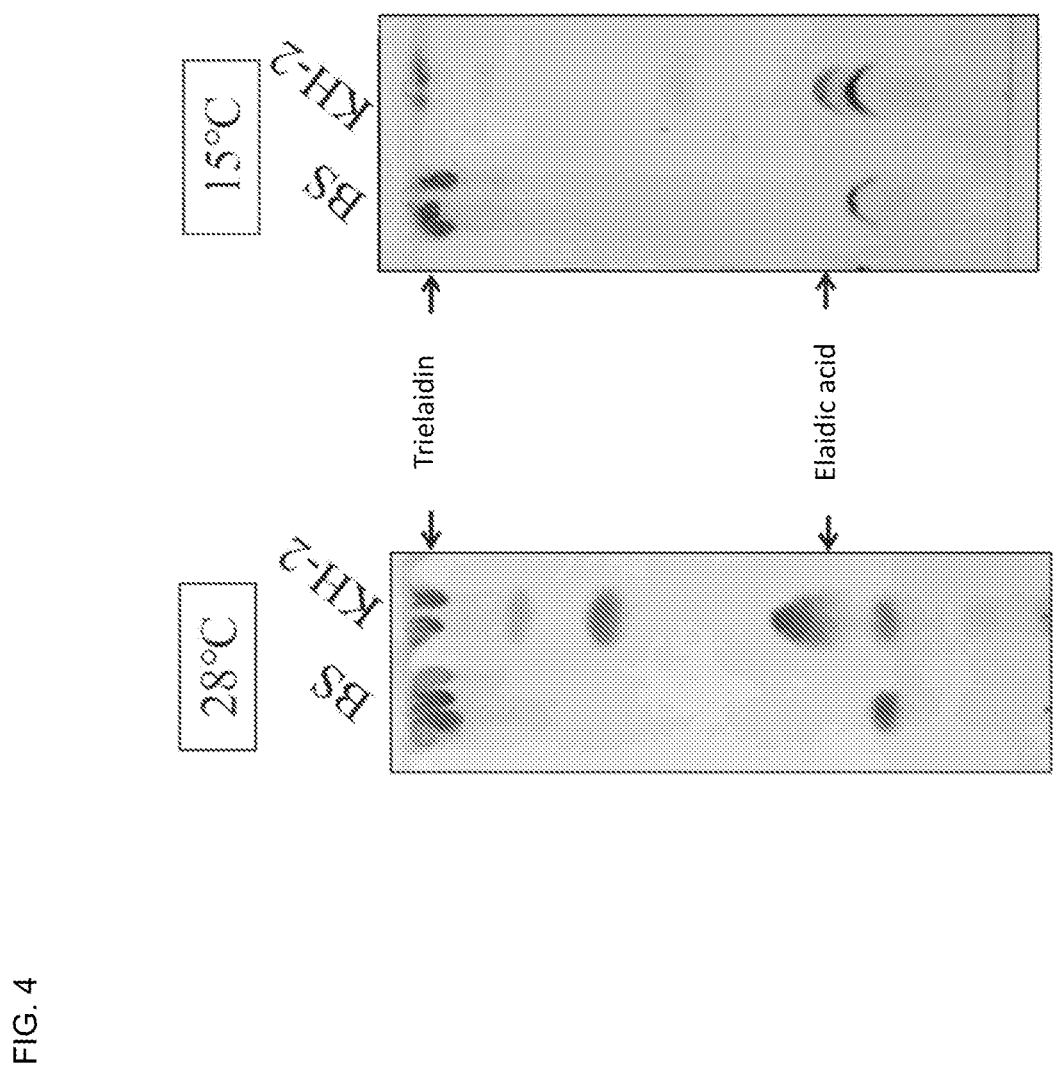
FIG. 4 shows decomposition of trielaidin by a KH-2 strain. The pictures show thin-layer chromatography analysis showing residual oil entity content in culture. Each picture represents, from the left, decomposition of trielaidin at 28° C. and decomposition of trielaidin at 15° C. BS (inorganic salt medium) represents no addition of microorganisms (control) and KH-2 represents KH-2 strain addition.

Oil and fat in the supernatant after the culture was analyzed by thin-layer chromatography. Specifically, chloroform at an equal amount was added to the culture supernatant, the mixture thereof was agitated, and then 12 µl of the chloroform layer was applied to a silica gel plate and developed with a chloroform:acetone:methanol (96:4:2) solution. After the development, molybdophosphoric acid n-hydrate solution (2.4 g/60 ml of ethanol) was sprayed to the plate, and the plate was heated for 12 minutes at 110° C. to make oil and fat and free fatty acid visible. The amounts of oil and fat and fatty acid, which is the decomposition product thereof, remaining in the medium were compared (FIG. 4).

The KH-2 strain was found to have an ability to decompose trans fatty acid-containing oil and fat at both a normal temperature (28° C.) and a low temperature (15° C.).

Figure 5A:
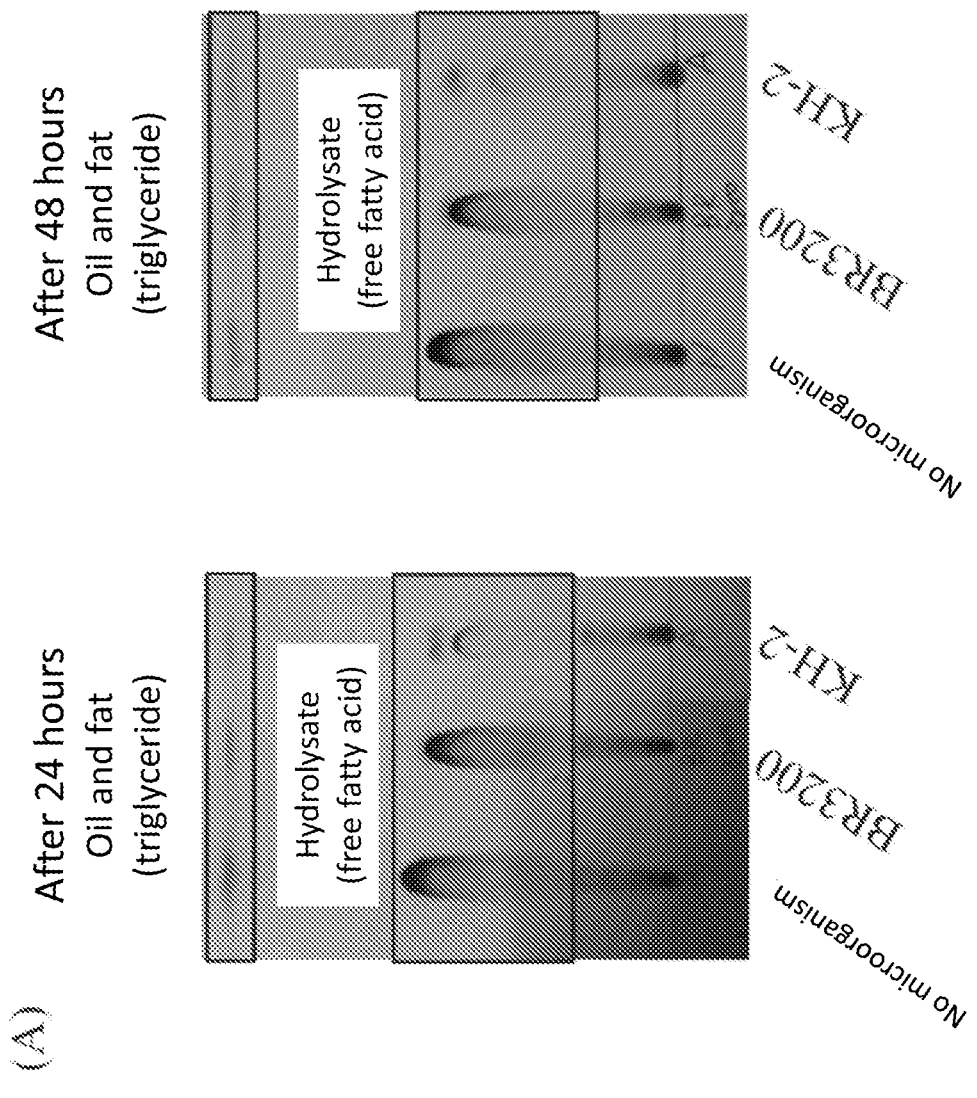
FIG. 5A shows the ability to decompose oil and fat of a KH-2 strain in actual wastewater. The pictures show thin-layer chromatography analysis showing residual oil entity content in culture. The picture on the left side shows the result after culture for 24 hours, and the picture on the right side shows the result after culture for 48 hours. Each column represents, from the left, the result for no addition of microorganisms (control), the result for BioRemove 3200 (BR3200) addition, and the result for KH-2 strain addition.
Figure 5B:
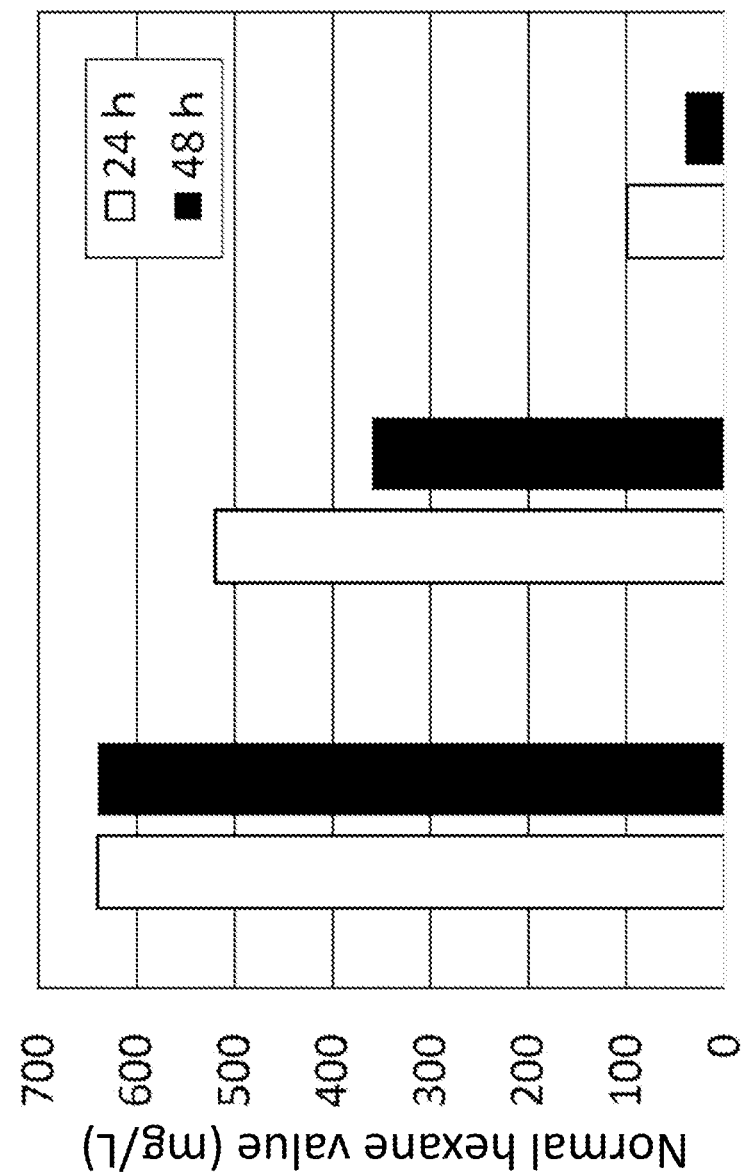
FIG. 5B shows the ability to decompose oil and fat of a KH-2 strain in actual wastewater. This is the result of measuring oil entity content corresponding to a normal hexane value with an oil entity content measuring reagent kit. The figure shows, from the left, the result for no addition of microorganisms (control), the result for BioRemove 3200 (BR3200) addition, and the result for KH-2 strain addition. The white bars show the result after culture for 24 hours, and the black bars show the result after culture for 48 hours. The vertical axis indicates a normal hexane value (mg/L).

Example 5: Ability of the KH-2 Strain to Decompose Oil and Fat in Actual Wastewater Actual wastewater was used to compare the abilities of a KH-2 strain and BioRemove3200 (BR3200) (Novozymes, Denmark) to decompose oil and fat (FIG. 5).

Wastewater samples containing a large amount of trans fatty acid-containing oil and fat from a food factory using hydrogenated oil and fat were supplemented with phosphorus and nitrogen content (ammonium sulfate) corresponding to an inorganic salt medium (described above) for culture. A KH-2 strain was cultured in an LB medium and washed twice with an inorganic salt medium and then inoculated so that the bacterial optical density would be $OD_{660}$=0.1 (HITACHI U-2810 spectrophotometer (Hitachi, Tokyo, Japan)). BR3200 was inoculated at $1\times10^7$ CFU/ml, which is a concentration that is 10-fold of the manufacturer recommended concentration. The comparison was also performed with a control sample to which a microorganism was not added. The Microorganisms were cultured at 28° C., and samples were collected after 24 hours and 48 hours. The samples were analyzed using thin-layer chromatography (applied to a silica gel plate, developed with a chloroform:acetone:methanol (96:4:1) solution and then made visible with molybdophosphoric acid n-hydrate) (FIG. 5A) and an oil entity content measuring reagent kit (measurement of a normal hexane value, described above) (FIG. 5B). The progress of decomposition was slow for BR3200 even at an excessive amount, whereas the KH-2 strain exhibited an excellent ability to decompose.

Example 6: Ability of the KH-2 Strain to Decompose Oil and Fat at 15° C.

Figure 6A:
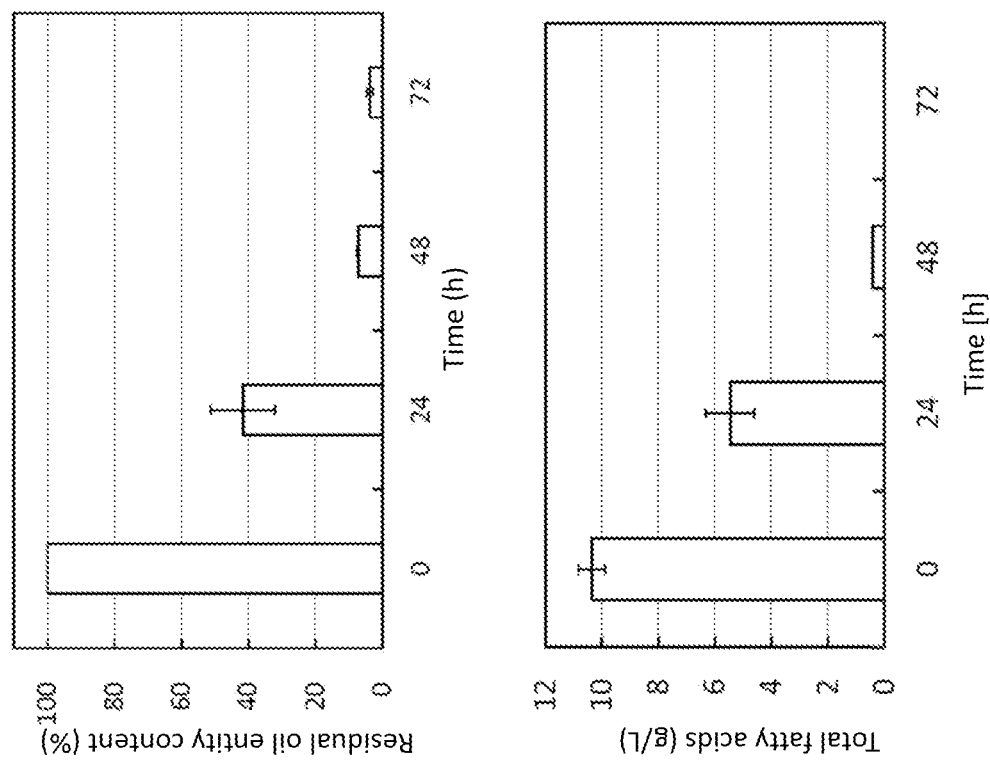
FIG. 6A shows decomposition of canola oil by a KH-2 strain in 15° C. culture (pH of 7.0). The figure shows the result of measuring oil entity content (residual oil entity content) corresponding to a normal hexane value with an oil entity content measuring reagent kit and calculating the percentage considering the measurement value at 0 hours as 100% (top row), and the result of quantifying the total fatty acids (total of fatty acid in triglyceride and free fatty acid) by gas chromatography (bottom row) at 0 hours, 24 hours, 48 hours, and 72 hours after starting the culture.
Figure 6B:
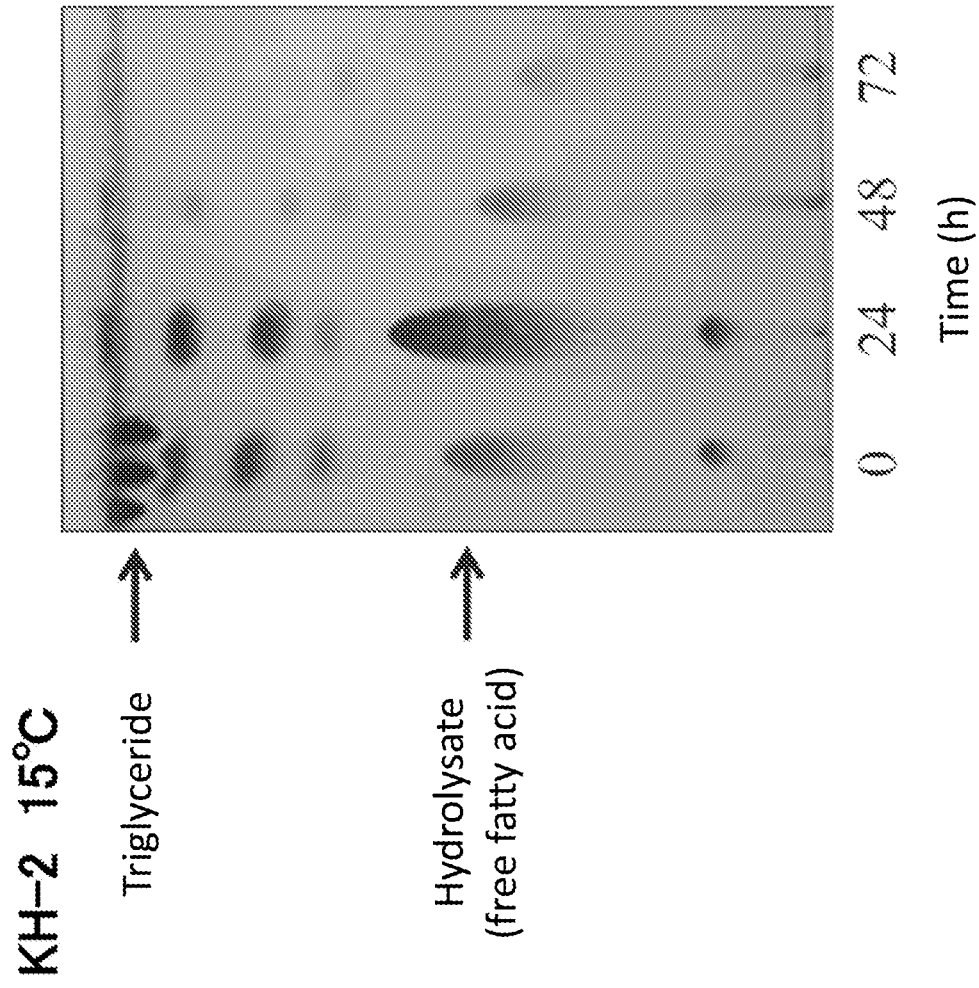
FIG. 6B shows decomposition of canola oil by a KH-2 strain in 15° C. culture (pH of 7.0). The picture shows thin-layer chromatography analysis showing residual oil entity content in culture. Each column shows, from the left, the result at 0 hours, the result at 24 hours, the result at 48 hours, and the result at 72 hours after starting the culture.

Microorganisms of a KH-2 strain were inoculated into an inorganic salt medium (pH of 7) comprising 1% canola oil (Nissin canola oil, Nissin Oilio) so that the final bacterial optical density would be $OD_{660}$=0.05 (HITACHI U-2810 spectrophotometer (Hitachi, Tokyo, Japan)) and cultured in a fermenter at 15° C. Samples were collected at 0 hours, 24 hours, 48 hours, and 72 hours after starting the culture. Microorganisms were removed from the sampled culture by centrifugation. Oil entity content corresponding to a normal hexane value in the supernatant was measured with an oil entity content measuring reagent kit (normal hexane extraction, described above) (FIG. 6A, top row), the total fatty acid (total amount of fatty acid in triglyceride and free fatty acid) was quantified by gas chromatography (FIG. 6A, bottom row), and the samples were analyzed by thin-layer chromatography (applied to a silica gel plate, developed with a chloroform:acetone:methanol (96:4:1) solution and then made visible with molybdophosphoric acid n-hydrate) (FIG. 6B). The quantification by gas chromatography was performed as follows. 3 ml of culture supernatant was acidified with hydrochloric acid, and an equal amount of ethyl acetate was added. After 5 minutes of agitating and then centrifugation, 1 ml of the ethyl acetate layer was transferred to an organic solvent resistant tube and completely evaporated. The resultant was dissolved in 1 ml of chloroform, 4 ml of methanolysis solution prepared by mixing methanol:sulfuric acid=17:3 was added, and the mixture was heated for 2 hours at 100° C. to convert all fatty acids into their methyl esters. A solution prepared by mixing chloroform:pure water=1:1 was added and thoroughly agitated, then a chloroform layer and 0.5% methyl octanoate (internal standard) were mixed at 1:1. The mixture was analyzed by gas chromatography with an FID detector (GC-17A (Shimadzu, Kyoto, Japan)).

It was confirmed from these results that the KH-2 strain has a high ability to decompose/assimilate oil and fat even at a low temperature.

Example 7: Ability of the KH-2 Strain to Decompose Oil and Fat at 28° C.

Figure 7A:
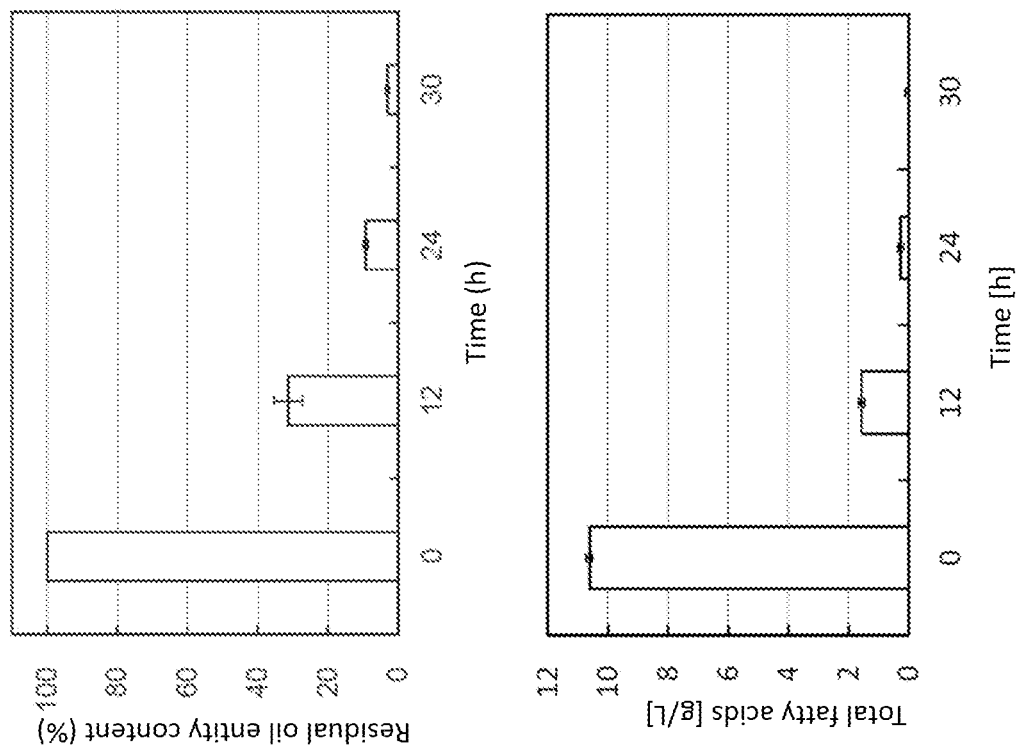
FIG. 7A shows decomposition of canola oil by a KH-2 strain in 28° C. culture (pH of 7.0). The figure shows the result of measuring entity oil content (residual oil entity content) corresponding to a normal hexane value with an oil entity content measuring reagent kit and calculating the percentage considering the measurement value at 0 hours as 100% (top row), and the result of quantifying the total fatty acids (total of fatty acid in triglyceride and free fatty acid) by gas chromatography (bottom row) at 0 hours, 12 hours, 24 hours, and 30 hours after starting the culture.
Figure 7B:
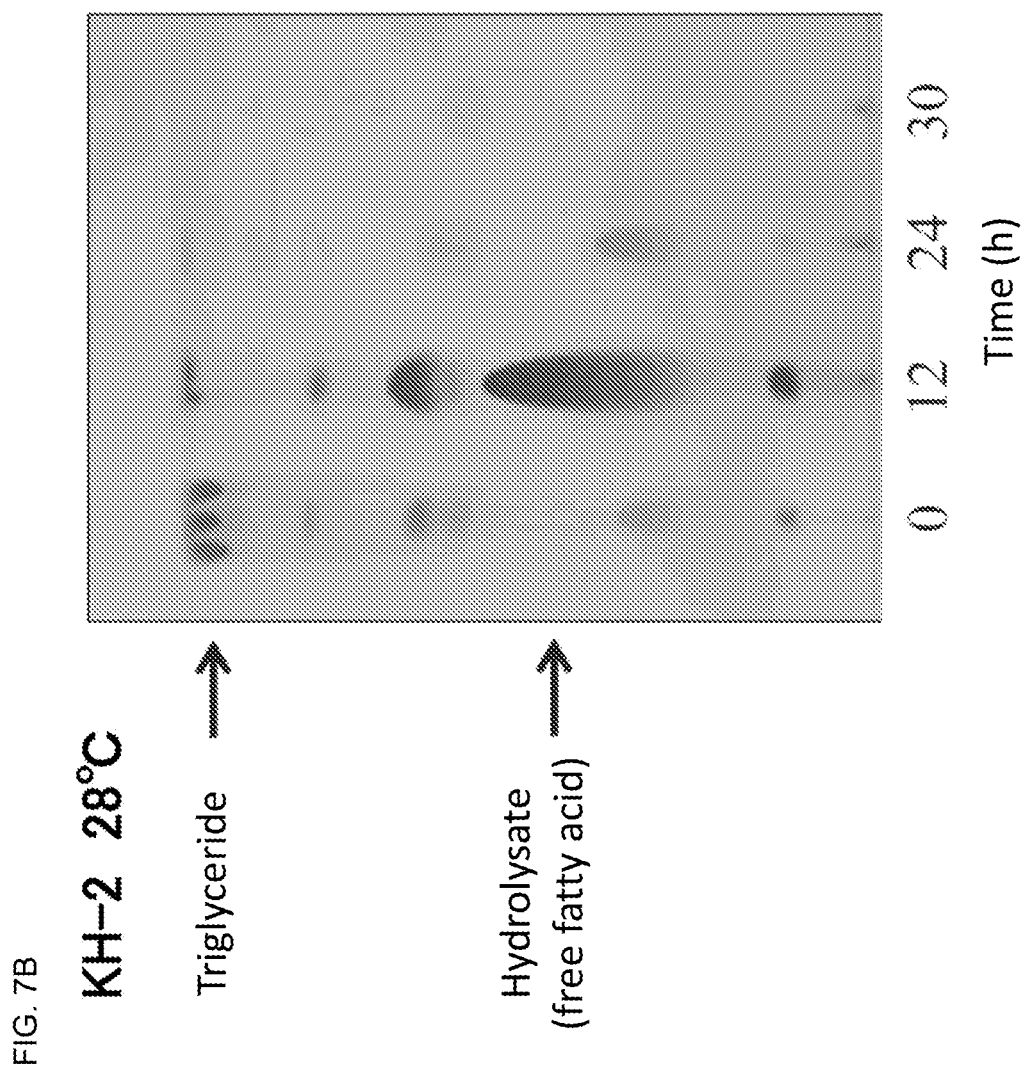
FIG. 7B shows decomposition of canola oil by a KH-2 strain in 28° C. culture (pH of 7.0). The picture shows thin-layer chromatography analysis showing residual oil entity content in culture. Each column shows, from the left, the result at 0 hours, the result at 12 hours, the result at 24 hours, and the result at 30 hours after starting the culture.

Microorganisms of a KH-2 strain were inoculated into an inorganic salt medium (pH of 7) comprising 1% canola oil (Nissin canola oil, Nissin Oilio) so that the final bacterial optical density would be $OD_{660}$=0.05 (HITACHI U-2810 spectrophotometer (Hitachi, Tokyo, Japan)) and cultured in a fermenter at 28° C. Samples were collected at 0 hours, 12 hours, 24 hours, and 30 hours after starting the culture. Microorganisms were removed from the sampled culture by centrifugation. In the same manner as Example 6, oil entity content corresponding to a normal hexane value in the supernatant was measured (FIG. 7A, top row), the total fatty acid was quantified by gas chromatography (FIG. 7A, bottom row), and the samples were analyzed by thin-layer chromatography (FIG. 7B).

The KH-2 strain very rapidly decomposed oil and fat at 28° C. 70% or greater of oil and fat contained initially at 1% in the medium was decomposed in 12 hours, and both oil and fat and fatty acid were mostly eliminated within 24 hours.

Example 8: Decomposition of Fatty Acid and Oil and Fat by an Additional Strain

A sample was collected from a river near a food factory from which oil and fat-containing wastewater flows out, and microorganisms were isolated therefrom. The inventors studied whether the isolated microorganisms could produce lipase and decompose oil and fat in a low temperature environment (15° C.). As a result, microorganisms that can decompose oil and fat at a low temperature were found. These microorganism strains were named KH-2AL1 strain and KH-2AL3 strain, respectively.

To further characterize the KH-2AL1 strain and the KH-2AL3 strain, the genetic sequence of 26S rDNA was analyzed.

The KH-2AL1 strain was identified as *Yarrowia lipolytica* because the partial base sequence of 26S rDNA matched *Yarrowia lipolytica* with 100% homology.

The KH-2AL3 strain was identified as *Yarrowia lipolytica* because the partial base sequence of 26S rDNA matched *Yarrowia lipolytica* with 100% homology.

The ability to decompose trans fatty acid, the ability to decompose trans fatty acid-containing oil and fat, and the ability to decompose oil and fat of these strains were also studied.

(Decomposition of Trans Fatty Acid)

Figure 8A:
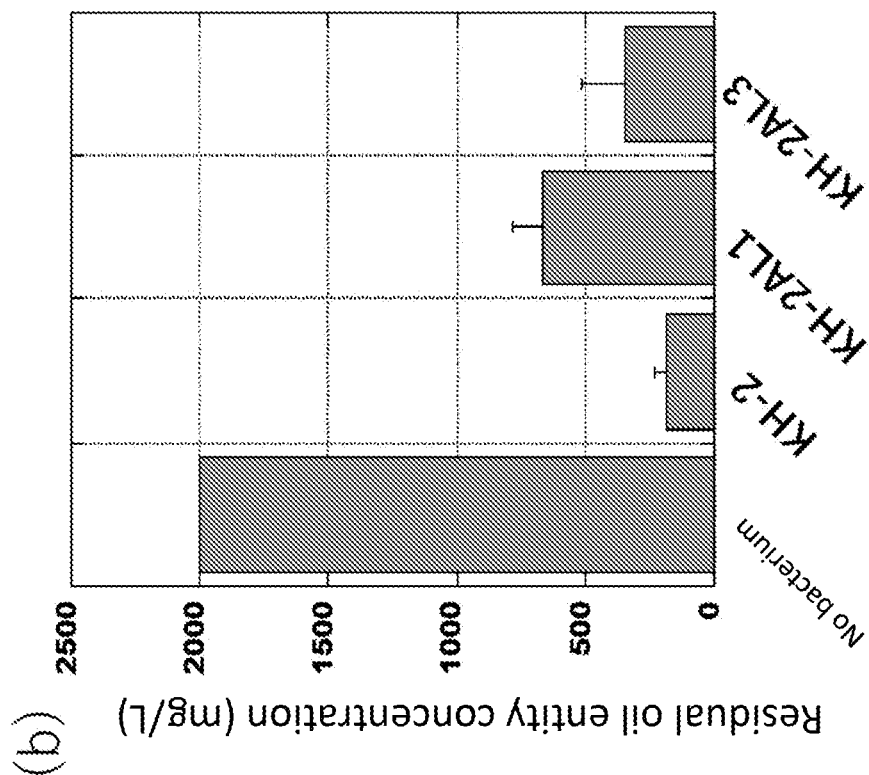
FIG. 8A shows the elaidic acid decomposition activity of no bacterium, a KH-2 strain, a KH-2AL1 strain, or a KH-2AL3 strain at 28° C. (a) is a picture of detection of fatty acid in culture by thin-layer chromatography. (b) is the result of measuring oil entity content corresponding to a normal hexane value with an oil entity content measuring reagent kit, and shows, from the left, the decomposition results for no bacterium, the KH-2 strain, the KH-2AL1 strain, and the KH-2AL3 strain.
Figure 8A:
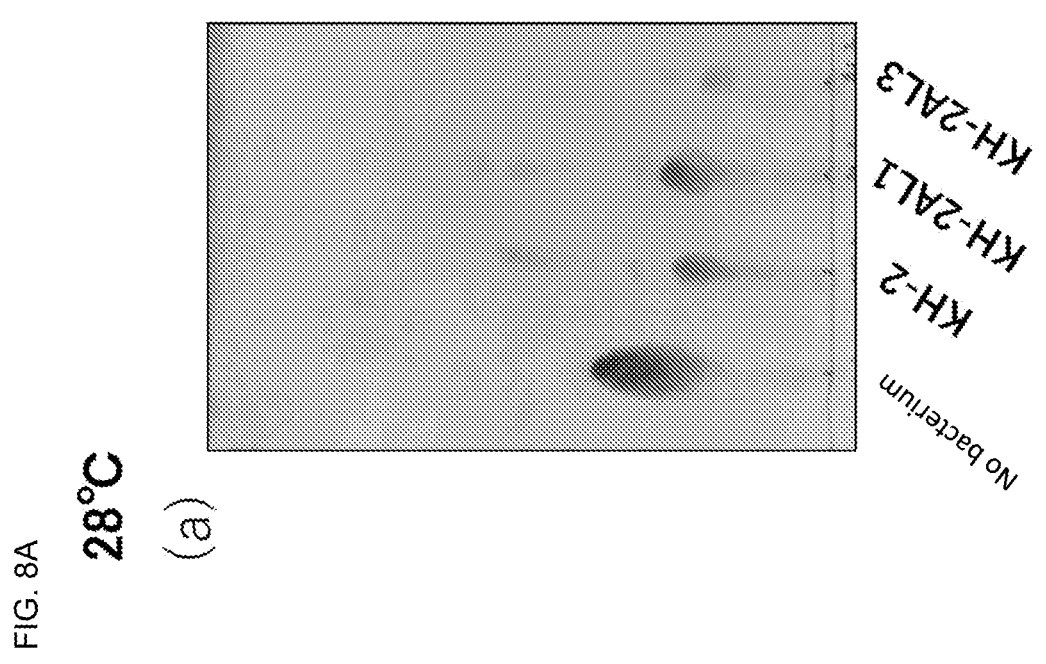
Figure 8B:
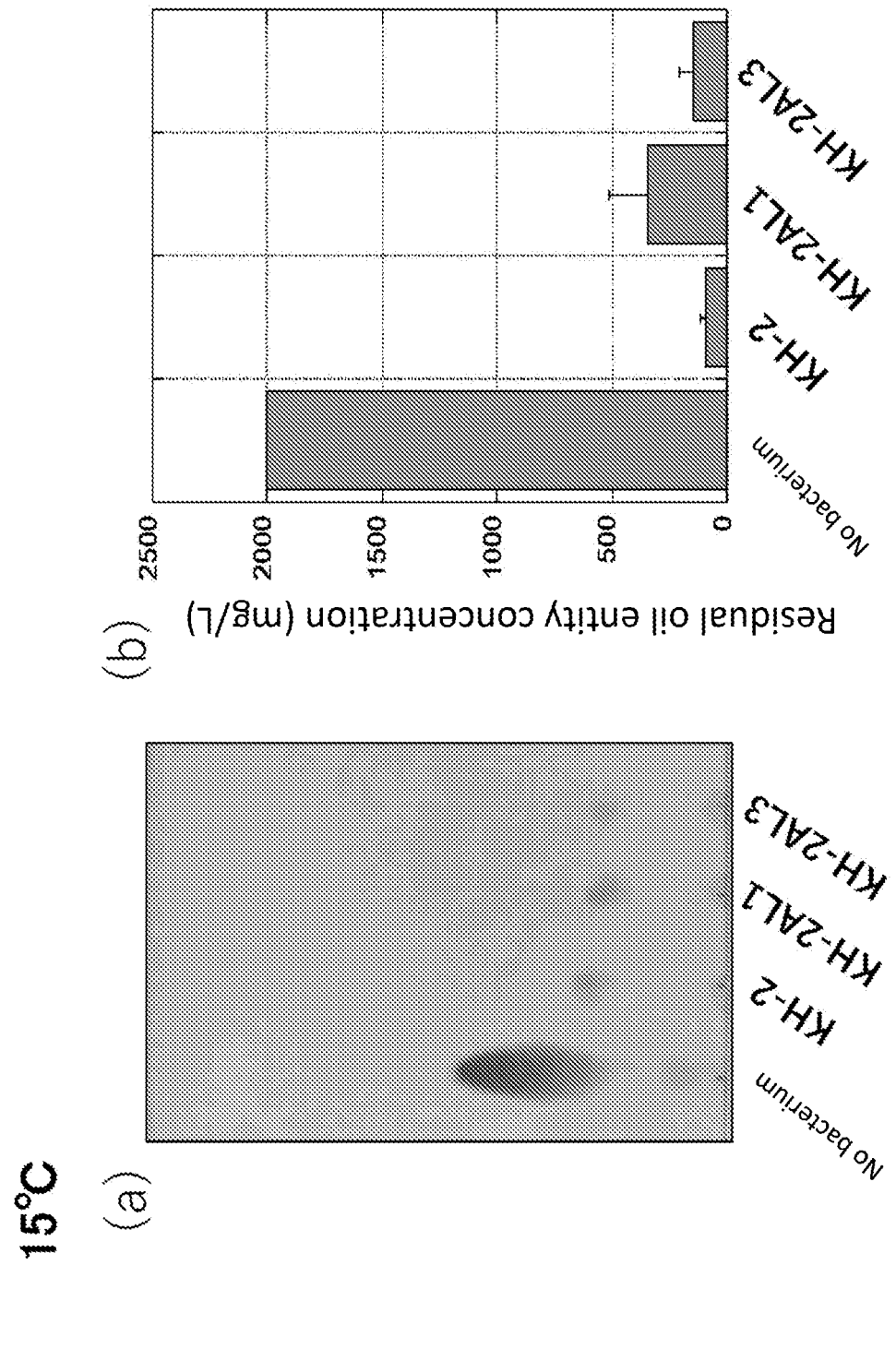
FIG. 8B shows the elaidic acid decomposition activity of no bacterium, a KH-2 strain, a KH-2AL1 strain, or a KH-2AL3 strain at 15° C. (a) is a picture of detection of fatty acid in culture by thin-layer chromatography. (b) is the result of measuring oil entity content corresponding to a normal hexane value with an oil entity content measuring reagent kit, and shows, from the left, the decomposition results for no bacterium, the KH-2 strain, the KH-2AL1 strain, and the KH-2AL3 strain.

In the same manner as Example 3, the ability of a KH-2AL1 strain and a KH-2AL3 strain to decompose trans fatty acid was also tested. Microorganisms were inoculated into 10 mL of inorganic salt medium (composition described above, a pH of 7.0) comprising 0.2% elaidic acid and 0.25% Triton® X-100 so as to be a KH-2 strain, a KH-2AL1 strain, or a KH-2AL3 strain with a final bacterial optical density of $OD_{660}$=0.8 (HITACHI UI-2810 spectrophotometer (Hitachi, Tokyo, Japan)), and cultured for 46 hours at 28° C. or for 90 hours at 15° C. with shaking at 130 rpm. In the same manner as Example 3, analysis with thin-layer chromatography (28° C.; FIG. 8A (a), 15° C.; FIG. 8B (a)) and an oil entity content measuring reagent kit (28° C.; FIG. 8A (b), 15° C.; FIG. 8B (b)) was performed to study the decomposition of oil and fat in the culture supernatant.

The KH-2AL1 strain and the KH-2AL3 strain were found to have similar ability to decompose trans fatty acid as that of the KH-2 strain.

(Decomposition of Trans Fatty Acid-Containing Oil and Fat)

Figure 9:
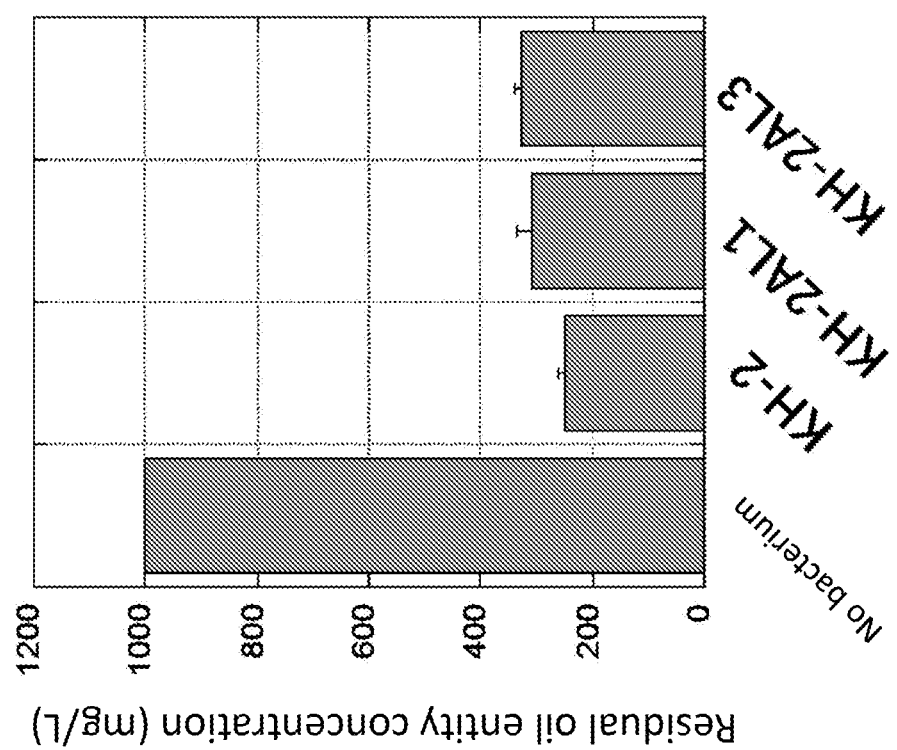
FIG. 9 shows the trielaidin decomposition activity of no bacterium, a KH-2 strain, a KH-2AL1 strain, or a KH-2AL3 strain at 28° C. This is the result of measuring oil entity content corresponding to a normal hexane value with an oil entity content measuring reagent kit. The figure shows, from the left, the decomposition results for no bacterium, the KH-2 strain, the KH-2AL1 strain, and the KH-2AL3 strain.

In the same manner as Example 4, the ability of a KH-2AL1 strain and a KH-2AL3 strain to decompose trans fatty acid-containing oil and fat was also tested. A KH-2 strain, a KH-2AL1 strain, or a KH-2AL3 strain was inoculated into an inorganic salt medium (BS) comprising 0.1% trielaidin and 0.25% Triton® X-100 with a final bacterial optical density of $OD_{660}$=0.8 (HITACHI U-2810 spectrophotometer (Hitachi, Tokyo, Japan)), and cultured for 5 days at 28° C. with shaking at 130 rpm. The Microorganisms were compared with a control sample to which a microorganism was not added. In the same manner as Example 3, the decomposition of oil and fat in the culture supernatant was studied. FIG. 9 shows the result of analysis with an oil entity content measuring reagent kit.

The KH-2AL1 strain and the KH-2AL3 strain were found to have similar ability to decompose trans fatty acid-containing oil and fat as that of the KH-2 strain.
(Decomposition of Oil and Fat)

Figure 10B:
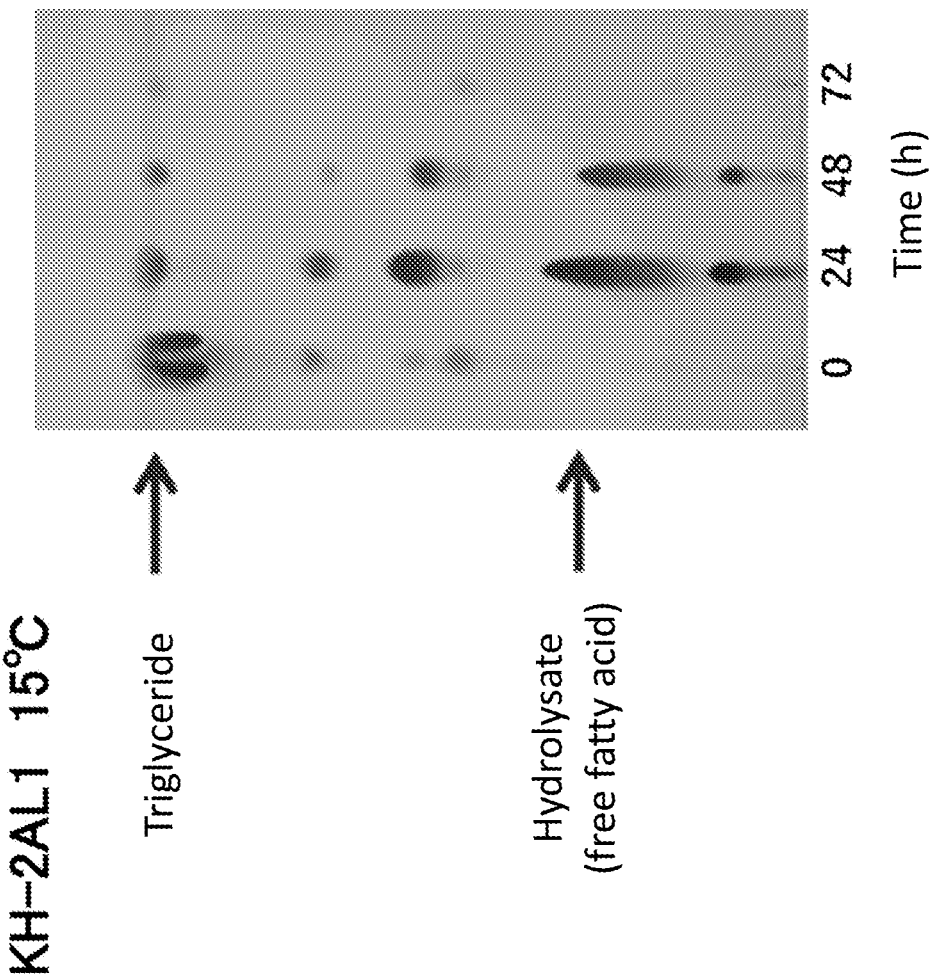
FIG. 10B shows decomposition of canola oil by a KH-2AL1 strain in 15° C. culture (pH of 7.0). The picture shows thin-layer chromatography analysis showing residual oil entity content in culture. Each column shows, from the left, the result at 0 hours, the result at 24 hours, the result at 48 hours, and the result at 72 hours after starting the culture.
Figure 11B:
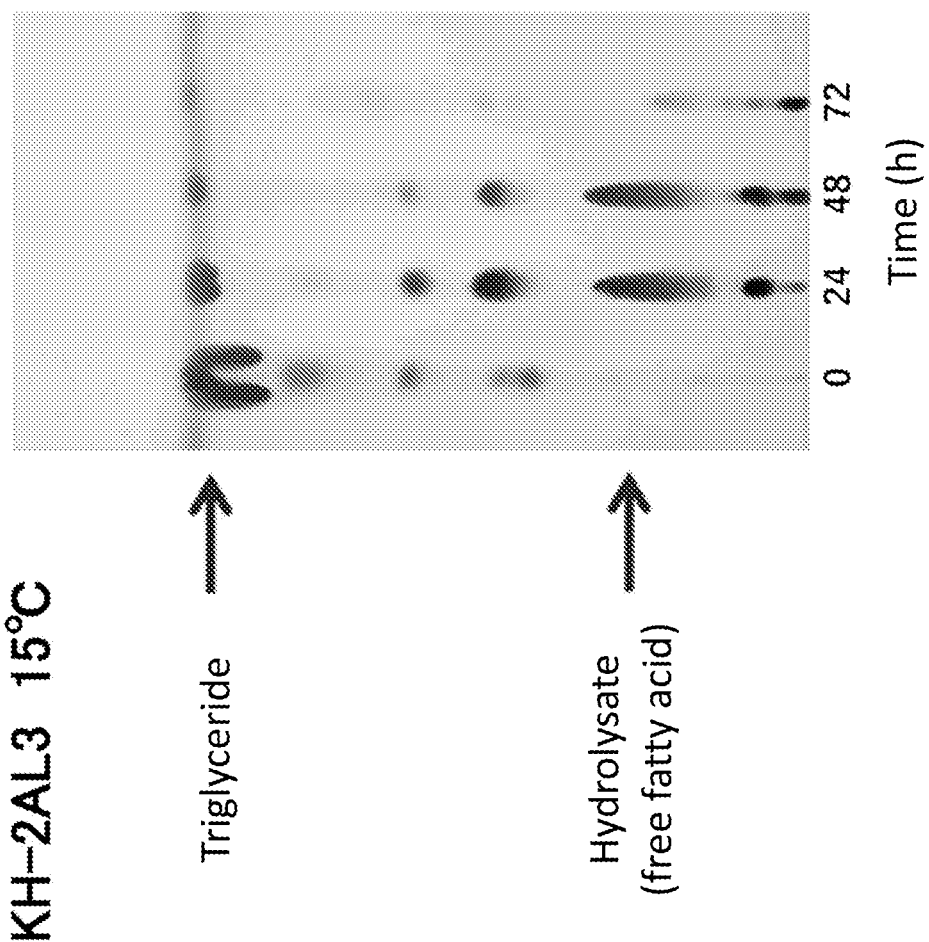
FIG. 11B shows decomposition of canola oil by a KH-2AL3 strain in 15° C. culture (pH of 7.0). The picture shows thin-layer chromatography analysis showing residual oil entity content in culture. Each column shows, from the left, the result at 0 hours, the result at 24 hours, the result at 48 hours, and the result at 72 hours after starting the culture.

Microorganisms of a KH-2AL1 strain or a KH-2AL3 strain were inoculated into an inorganic salt medium (pH of 7) comprising 1 canola oil (Nissin canola oil, Nissin Oilio) so that the final bacterial optical density would be $OD_{660}$=0.05 (HITACHI U-2810 spectrophotometer (Hitachi, Tokyo, Japan)) and cultured in a fermenter for 72 hours at 15° C. Analysis with an oil entity content measuring reagent kit (FIG. 10A, FIG. 11A, top row), analysis of total fatty acids by gas chromatography (FIG. 10A, FIG. 11A, bottom row), and analysis by thin-layer chromatography (FIG. 10B, FIG. 11B) were performed by using the culture supernatant.

It was confirmed from these results that the *Yarrowia* yeast of the present disclosure has a high ability to decompose/assimilate oil and fat even at a low temperature.

Example 9: Ability of the KH-2 Strain to Assimilate Trans Fatty Acid and Trans Fatty Acid-Containing Oil and Fat at 15° C.

Figure 12:
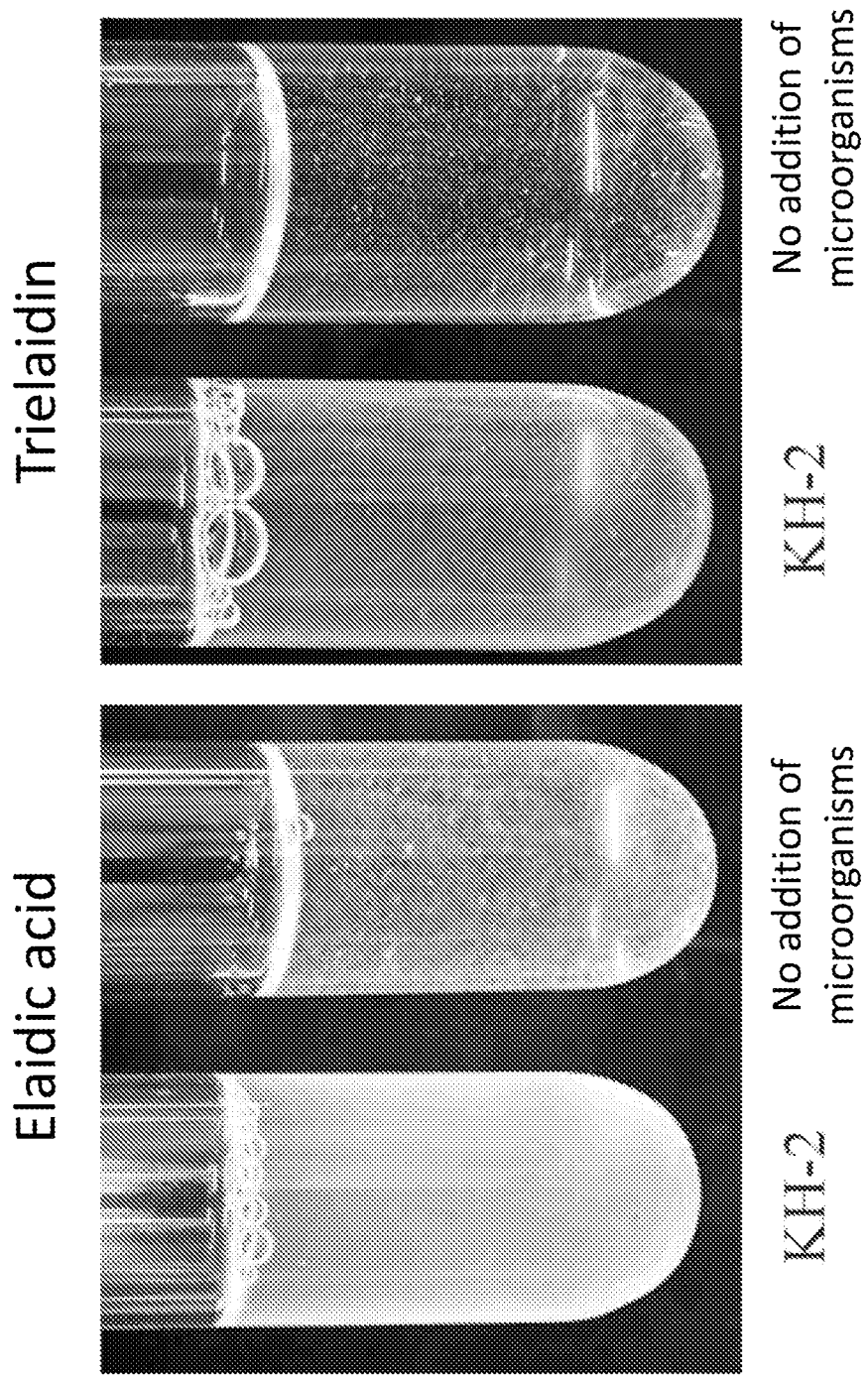
FIG. 12 shows the ability to assimilate trielaidin or elaidic acid of a KH-2 strain at 15° C. The picture on the left side shows the result of culture in an elaidic acid-containing medium, and the picture on the right side shows the result of culture in a trielaidin-containing medium. The figure shows the result from the KH-2 strain addition condition (left) and the result from no addition of microorganisms (control, right).

The ability of a KH-2 strain to assimilate trans fatty acid and trans fatty acid-containing oil and fat at 15° C. was tested. Microorganisms of a KH-2 strain were inoculated into an inorganic salt medium (pH of 7.0) comprising 0.2% elaidic acid or 0.2% trielaidin expressed in terms of elaidic acid and 0.25% Triton® X-100 with a final bacterial optical density of $OD_{660}$=0.08 (HITACHI U-2810 spectrophotometer (Hitachi, Tokyo, Japan)), and cultured for 5 days at 15° C. with shaking at 130 rpm. Comparison was performed with a control sample to which a microorganism was not added. FIG. 12 shows the result.

The medium was observed to be cloudy in a KH-2 strain-inoculated sample. This demonstrated that the KH-2 strain can grow under an environment comprising elaidic acid or trielaidin as the sole carbon source even at 15° C. and has the ability to assimilate these compounds.

Example 10: Comparison of Detergencies of the KH-2 Strain and Detergents

Figure 13:
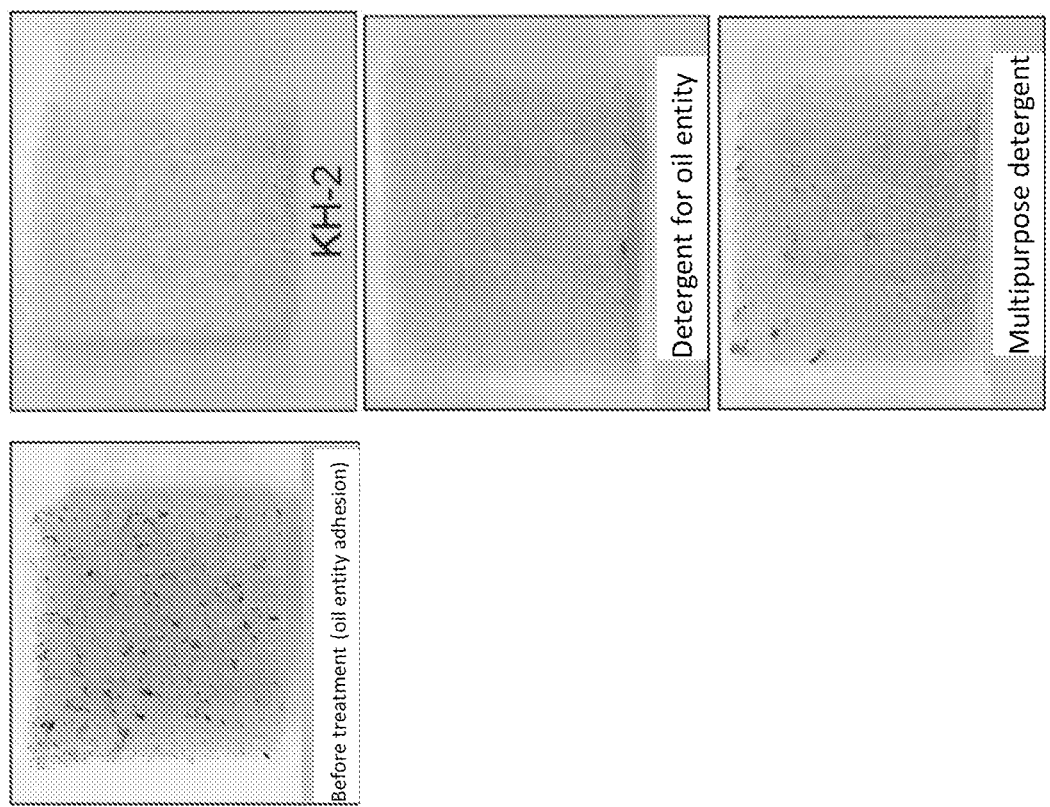
FIG. 13 shows a comparison of detergencies of a KH-2 strain with detergents. The pictures show ventilator filters with oil entity stain that were washed by leaving the filters soaked in a culture supernatant of a KH-2 strain, a detergent for oil entity, and a multipurpose detergent. The left column shows the state prior to treatment. The right column shows top row: treatment with a KH-2 strain culture supernatant, middle row: treatment with a detergent for oil entity, and bottom row: treatment with a multipurpose detergent.

Ventilator filters with oil stains were washed by leaving the filters soaked at room temperature (25° C.) in a culture supernatant of a KH-2 strain (culture conditions: the KH-2 strain was inoculated into an inorganic salt medium (composition described above) supplemented with 1% canola oil, so that the initial bacterial optical density would be $OD_{660}$=0.01, and cultured for 70 hours at 28° C.; supernatant obtained by centrifuging after the culture to remove microorganisms was adjusted to pH 8.0 with sodium hydroxide solution), a detergent for oil entity (natural enzyme detergent Nicoeco for kitchen (Nicoeco, Nagano, Japan), diluted with water 143-fold in accordance with the instruction manual), and a multipurpose detergent (Family® (Kao, Tokyo, Japan) diluted 666-fold in accordance with the instruction manual) (FIG. 13). Washing time was 30 minutes, 2 hours, and 4 hours, respectively, for the KH-2 strain culture supernatant, the detergent for oil entity, and the multipurpose detergent.

The multipurpose detergent and the detergent for oil could not completely remove oil entity stains after 2 hours and 4 hours of soak washing, respectively, but with the KH-2 strain, the filter became pure white like a new product with 30 minutes of soak washing.

Example 11: Decomposition of Various Esters

The substrate specificity among esters decomposed in the culture supernatant of a KH-2 strain was studied.

Supernatant obtained by inoculating a KH-2 strain into an inorganic salt medium (composition described above) supplemented with 1% canola oil so that the initial bacterial optical density would be $OD_{660}$=0.05, then culturing the strain for 24 hours at 28° C., for 48 hours at 28° C., or for 48 hours at 15° C., followed by centrifuging to remove microorganisms was used.

0.05 mol of one of 4-nitrophenyl esters (substrate) from 5 types of fatty acid (acetic acid (C2), butyric acid (C4), octanoic acid (C8), lauric acid (C12), and palmitic acid (C16)) and 12 ml of 3% (v/v) Triton® X-100 solution were mixed and melted at 70° C., thereby preparing a substrate solution.

1 ml of the substrate solution, 150 mM GTA buffer (pH of 7.0), and each supernatant were mixed and an absorbance at 410 nm (corresponding to 4-nitrophenol resulting from hydrolysis) was monitored for 1 minute while agitating.

The following table shows the result. The table shows % of the amount of 4-nitrophenol released for each substrate, considering the maximum decomposition (4-nitrophenol release) observed among the 5 types of substrate as 100%.

TABLE 1

| Substrate | Relative activity (%) | | |
| --- | --- | --- | --- |
| pNP-ester | 24 h (28° C.) | 48 h (28° C.) | 48 h (15° C.) |
| Acetate (C2) | 55.3 | 19.2 | 52.5 |
| Butyrate (C4) | 100 | 56.5 | 100 |
| Octanoate (C8) | 95 | 100 | 10 |
| Laurate (C12) | 7.2 | 3.3 | 1.24 |
| Palmitate (C16) | 6.5 | 3.4 | 0.4 |

In general, lipase activity of a microorganism is measured with the hydrolysis activity by using ester (4-nitrophenyl ester) of 4-nitrophenol and long-chain fatty acid (e.g., palmitic acid) as a model substrate. Since 4-nitrophenol that is a hydrolysate has a yellow color, the activity can be quantitatively evaluated easily by colorimetry. In this regard, in order to correlate the activity with activity to decompose animal and vegetable oil and fat (triglyceride), ester of 4-nitrophenol and long-chain fatty acid constituting animal and vegetable oil and fat (e.g., C16 or greater) is generally used. However, the KH-2 strain was found to have low activity for an ester substrate of long-chain fatty acid and 4-nitrophenol and have high activity for an ester substrate with short-chain fatty acid (C6 or less) or medium-chain fatty acid (C7 to 12). In other words, a conclusion that the KH-2 strain does not have an ability to decompose triglyceride of long-chain fatty acid would be derived based on an experiment that those skilled in the art would generally perform (experiment to study the ability to decompose ester of long-chain fatty acid and 4-nitrophenol). However, the inventors found that the KH-2 strain has high activity to decompose triglyceride of long-chain fatty acid as demonstrated in the Examples described above. This finding is considered as completely unexpected. From this result, it is expected that the microorganism of the present disclosure can have a wide range of lipase activity for oil and fat of short-chain to long-chain fatty acid.

Example 12: Ability to Assimilate/Decompose Various Trans Fatty Acids

The activity of a KH-2 strain to decompose trans fatty acids palmitelaidic acid (16:1) and vaccenic acid (18:1) was compared with that of BioRemove3200 (BR3200) (Novozymes, Denmark).

A KH-2 strain and BR3200 were inoculated into 5 mL of inorganic salt medium (composition described above, a pH of 7) prepared such that the final concentration of palmitelaidic acid or vaccenic acid would be 0.2% and the final concentration of Triton® X-100 would be 0.25%, so that the final concentration of the KH-2 strain according to bacterial optical density would be $OD_{660}=0.5$, and the final concentration of BR3200 would be $5\times10^6$ CFU/ml, which is a concentration that is 5-fold of the manufacturer recommended concentration, by using a HITACHI U-2810 spectrophotometer (Hitachi, Tokyo, Japan). This was cultured with shaking at 130 rpm for 48 hours or 72 hours at 15° C. or for 24 hours at 28° C., and then culture supernatant of each strain was obtained. A control sample that did not use a microorganism was also prepared.

Figure 14:
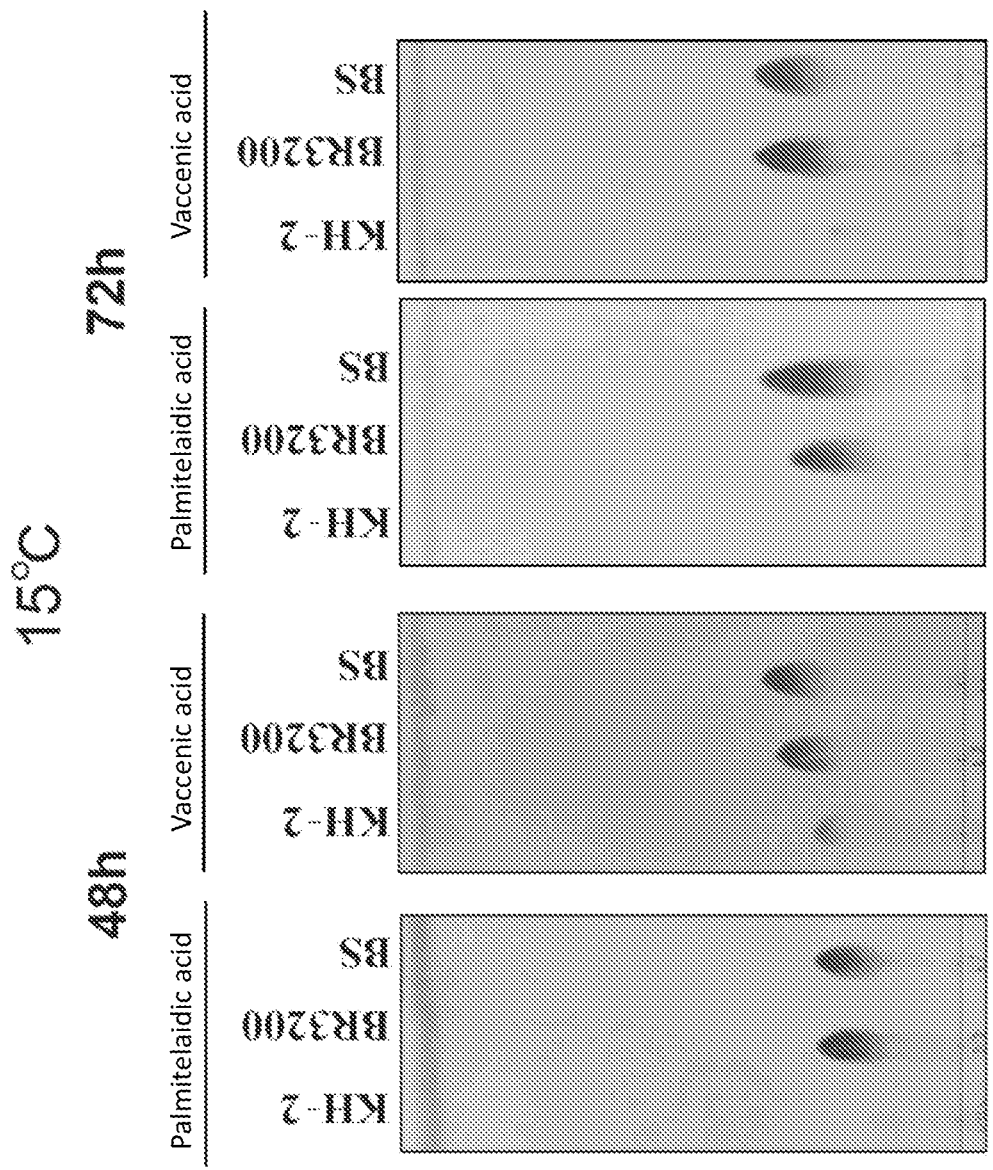
FIG. 14 shows a comparison of palmitelaidic acid and vaccenic acid decomposition activities of a KH-2 strain and BioRemove 3200 (BR3200) (Novozymes, Denmark). The figure shows pictures of thin-layer chromatography analysis showing fatty acid in culture after 48 hours or 72 hours of culture at 15° C. The panels are, from the left, 48 hour culture with palmitelaidic acid, 48 hour culture with vaccenic acid, 72 hour culture with palmitelaidic acid, and 72 hour culture with vaccenic acid. In each panel, the right side is for the negative control (BS), the center is for BR3200, and the left side is for the KH-2 strain.
Figure 15:
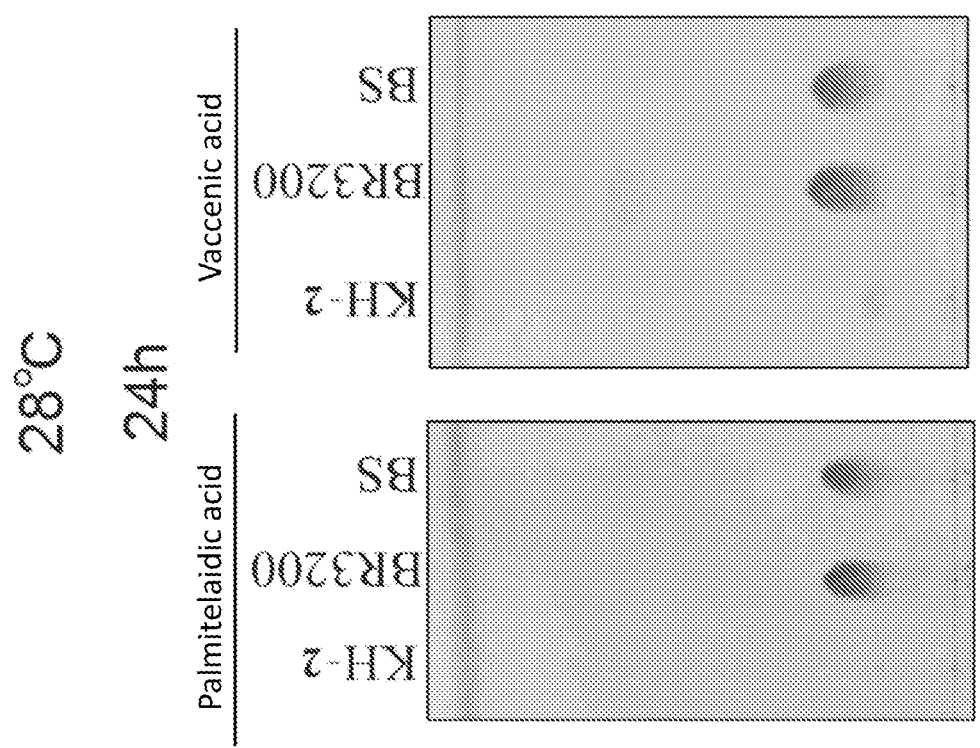
FIG. 15 shows a comparison of palmitelaidic acid and vaccenic acid decomposition activities of a KH-2 strain and BioRemove 3200 (BR3200) (Novozymes, Denmark). The figure shows pictures of thin-layer chromatography analysis showing fatty acid in culture after 24 hours of culture at 28° C. The left panel is for culture with palmitelaidic acid, and the right panel is for culture with vaccenic acid. In each panel, the right side is for the negative control (BS), the center is for BR3200, and the left side is for the KH-2 strain.

Subsequently, residual oil entity content in culture was analyzed by thin-layer chromatography. Specifically, fatty acids were extracted with chloroform at an amount that is ½ of the sample. 6 μl of the extract was applied to a silica gel plate and developed with a chloroform:acetone:methanol (96:4:2) solution. After the development, fatty acids were made visible by a coloring reaction with molybdophosphoric acid n-hydrate in the same manner as Example 4. The amounts of fatty acids remaining in the medium were compared (FIG. 14 and FIG. 15).

The KH-2 strain was able to completely decompose palmitelaidic acid and vaccenic acid within 24 hours at 28° C., and within 48 to 72 hours at 15° C. On the other hand, BR3200 did not have the ability to decompose these fatty acids. In this manner, the microorganism of the present disclosure can be capable of assimilating/decomposing various trans fatty acids and trans fatty acid-containing oils and fats.

Example 13: Acquisition of Analogue Strains

Analogue strains can be obtained in the following manner.

A dilution series is prepared by adding PBS to various isolation sources such as a yeast storage library, soil, river, lake, or activated sludge, and the dilution series is spread over an inorganic salt agar medium comprising trielaidin or elaidic acid as the sole carbon source. Alternatively, 1 to 10% by weight of the isolation sources described above is added to an inorganic salt medium comprising 0.3 to 1% by weight of shortening and cultured at 15° C. or 28° C. until emulsification and growth of microorganisms are observed. After this enrichment culture is repeated any number of times, a dilution series of culture may be prepared and spread as described above. The agar medium after inoculation is subjected to stationary culture at 15° C. or 28° C., thereby obtaining colonies. Among these colonies, colonies around which a clear zone is formed are mainly picked out, inoculated into about 2 mL of inorganic salt agar medium (comprising trielaidin or elaidic acid at the concentration described above), and cultured at 15° C. or 28° C. After the culture, the degree of decomposition of oil and fat in the culture supernatant is analyzed by thin-layer chromatography, thereby obtaining a microorganism capable of decomposing oil and fat at a low temperature or having an ability to decompose trans fatty acid-containing oil and fat.

Example 14: Use within an Apparatus

A KH-2 strain is cultured to $2\times10^9$ cells/mL in an inorganic salt medium comprising 10 mL/L of canola oil to prepare the undiluted culture solution. This is diluted 10-fold to prepare a microbial formulation ($2\times10^8$ cells/mL). This is refrigerated in a microorganism storage tank of an automatic amplifying and adding apparatus as seed microorganisms. The seed microorganisms are automatically inoculated daily at an amount of 1/100 into an inorganic salt medium in a culture amplification tank of the apparatus, and cultured until the number of microorganism becomes 100-fold, i.e., same cell concentration as the microbial formulation. This is administered at 1/1000 of the amount of wastewater from an oil entity decomposition and treatment tank so that the microorganism concentration of decomposing microorganism in oil entity treating water would be $2\times10^5$ cells/mL, and wastewater from a food factory discharging wastewater containing a large amount of trans fatty acid-containing oil and fat is decomposed and treated for 24 hours. The season at the time is winter. The water temperature during treatment varies between 12 to 17° C. As a result, a significant reduction in the normal hexane value is observed compared to a control without addition of a microorganism.

Example 15: Other Embodiments

A KH-2 strain is inoculated into an extinguishing type of food waste disposer so that the concentration would be $1\times10^6$ cells/mL for treatment for 12 to 24 hours at 25 to 35° C. The normal hexane value in wastewater discharged from the food waste disposer is measured. A significant reduction in the value is observed compared to a control with no addition of the KH-2 strain.

Oily sludge collected by floatation is added to a culture tank, and an inorganic salt medium that is 10 to 1000% by weight of the weight of the added oily sludge is added. A KH-2 strain is inoculated into this so that the concentration would be $1\times10^5$ cells/mL and incubated for 12 to 240 hours at 20 to 35° C. while agitating and aerating. Subsequently, the amount of decomposition/decrease of oily sludge is studied by measuring the amount of oil entity content according to the normal hexane value in the treated solution or by measuring the weight of the residue comprising oil entity as the main component which remains after moisture is evaporated. As a result, significant decomposition of oily sludge is observed compared to a control with no addition of the KH-2 strain.

Carriers such as charcoal, various plastics, and ceramic fragments are added to a grease trap, and a suitable amount (e.g., $1\times10^5$ cells/mL) of a KH-2 strain is automatically added every day after the end of business day at a restaurant. Water is collected before the start of business every day to analyze the normal hexane value. After one week, a significant reduction in the normal hexane value is observed compared to a control without addition of the KH-2 strain, and an effect is observed on the appearance of the grease trap itself such as reduced adhesion or floating of oil entity.

Example 16: Combination of Microorganisms Having a Useful Ability to Decompose Oil and Fat There are strains of a *Burkholderia bacterium* and a *Yarrowia* yeast having an ability to decompose oil and fat. These strains are combined with another microorganism strain having an ability to decompose oil and fat, whereby a combination of microorganisms having an excellent ability to decompose oil and fat can be obtained.

In the Examples, representative combinations of a *Burkholderia bacterium* and some *Yarrowia* yeast were used to test the ability to decompose oil and fat by co-culture. An excellent ability to decompose oil and fat of a combination of a *Burkholderia bacterium* and a *Yarrowia* yeast was observed. The details are described below.

A combination of a *Burkholderia bacterium* and a *Yarrowia* yeast that both have an ability to secrete lipase and an ability to decompose oil and fat is co-cultured to test the ability to decompose oil and fat, and a combination having an excellent ability to decompose oil and fat under co-culture is obtained. A symbiotic system of a *Burkholderia bacterium* and a *Yarrowia* yeast was co-cultured in an inorganic salt medium ($Na_2HPO_4$ 3.5 g/L, $KH_2PO_4$ 2.0 g/L, $(NH_4)_2SO_4$ 4.0 g/L, $MgCl_2 \cdot 6H_2O$ 0.34 g/L, $FeSO_4 \cdot 7H_2O$ 2.8 mg/L, $MnSO_4 \cdot 5H_2O$ 2.4 mg/L, $CoCl_2 \cdot 6H_2O$ 2.4 mg/L, $CaCl_2 \cdot 2H_2O$ 1.7 mg/L, $CuCl_2 \cdot 2H_2O$ 0.2 mg/L, $ZnSO_4 \cdot 7H_2O$ 0.3 mg/L, and $NaMoO_4$ 0.25 mg/L) comprising canola oil (Nissin canola oil, Nissin Oilio, Tokyo, Japan) at a final concentration of 1% (v/v), culture supernatant was obtained, and decomposition of oil and fat was tested by thin-layer chromatography analysis, gas chromatography analysis, or the like. As a result, a symbiotic system of a *Burkholderia bacterium* and a *Yarrowia* yeast having an excellent ability to decompose oil and fat was found. For example, a KH-1 strain (*Burkholderia arboris*) and a KH-2 strain (*Yarrowia lipolytica*) were found as a microorganism strain that can be usefully used in this symbiotic system.

In the following Examples, analysis was performed with the focus on this representative combination, but other useful combinations can be found by studying the ability to decompose oil and fat in similar test.

Example 17: Further Analysis of the Ability of the Symbiotic System to Decompose Oil and Fat The ability of a combination of a KH-1 strain and a KH-2 strain to decompose oil and fat was tested at various mixing ratios and at various temperatures.

(Analysis at 15° C.)

A KH-1 strain and a KH-2 strain were added to an inorganic salt medium (composition described above, a pH of 7) comprising canola oil (Nissin canola oil, Nissin Oilio, Tokyo, Japan) at a final concentration of 1% (v/v) at a ratio of KH-1 strain:KH-2 strain=10:0, 9:1, 5:5, 1:9, and 0:10 (based on the cell count), respectively, so that the total cell concentration would be $5 \times 10^5$ cells/mL, and cultured at 15° C. The total fatty acids in the culture supernatant obtained at 48 hours after starting the culture were analyzed by gas chromatography according to the following procedures.

Analysis of the Total Fatty Acids by Gas Chromatography 3 ml of culture supernatant was acidified with hydrochloric acid, and an equal amount of ethyl acetate was added. After 5 minutes of agitating and then centrifugation, 1.5 ml of the ethyl acetate layer was transferred to an organic solvent resistant tube and completely evaporated. The resultant was dissolved in 1 ml of chloroform, 4 ml of methanolysis solution with methanol:sulfuric acid=17:3 was added, and the mixture was heated for 2 hours at 100° C. to convert all fatty acids into their methyl esters. A solution prepared by mixing chloroform:pure water=1:1 was added and thoroughly agitated, then a chloroform layer and 0.5% methyl octanoate (internal standard) were mixed at 1:1. The mixture was analyzed by gas chromatography with an FID detector (GC-17A (Shimadzu, Kyoto, Japan)).

(Result)

FIG. 16 shows the result of gas chromatography analysis. The symbiotic system of the KH-1 strain and the KH-2 strain exhibited an ability to decompose oil and fat greater than the ability to decompose oil and fat calculated from a value of an ability to decompose oil and fat in single culture of each of the KH-1 strain and the KH-2 strain at various mixing ratios. As observed from the results from the KH-1 strain alone and the KH-2 strain alone, each of the KH-1 strain and the KH-2 strain produces lipase alone, and it is usually expected that such microorganisms having a similar property compete with each other and consequently suppress the ability of each other (the overall ability to decompose oil and fat is decreased) However, the inventors unexpectedly found an improvement in the ability to decompose oil and fat in the symbiotic system.

(Analysis at 28° C.)

The ability of a combination of a KH-1 strain and a KH-2 strain to decompose oil and fat was also tested at 28° C.

A KH-1 strain and a KH-2 strain were added to an inorganic salt medium (composition described above, a pH of 7) comprising canola oil (Nissin canola oil, Nissin Oilio, Tokyo, Japan) at a final concentration of 1% (v/v) at a ratio of KH-1 strain:KH-2 strain=10:0, 9:1, 5:5, 1:9, and 0:10 (based on the cell count), respectively, so that the total cell concentration would be $5 \times 10^5$ cells/mL, and cultured at 28° C. The total fatty acids of the culture supernatant obtained at 18 hours after starting the culture were analyzed by gas chromatography in the same manner as described above.

(Result)

Figure 17:
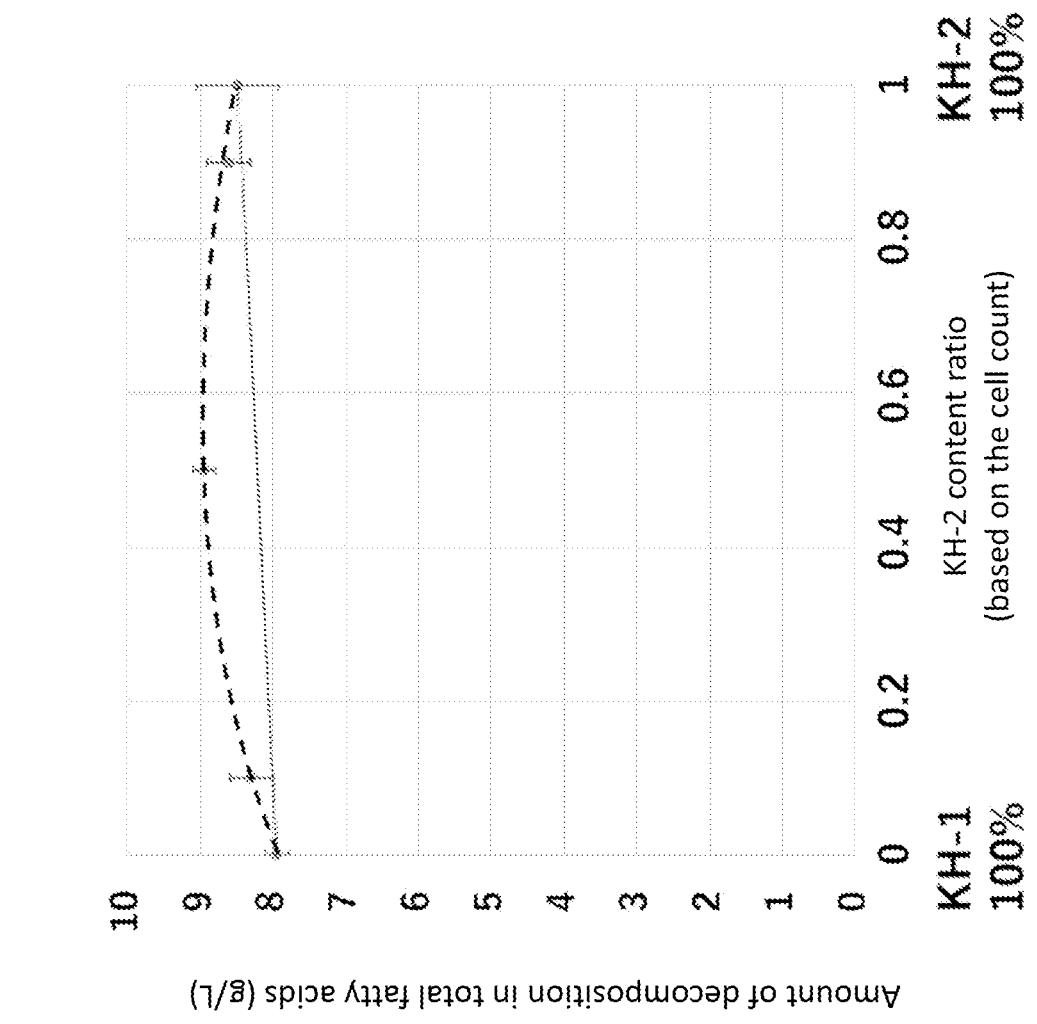
FIG. 17 shows decomposition of canola oil at various mixing ratios of a KH-1 strain and a KH-2 strain at 28° C.

FIG. 17 shows the result of gas chromatography analysis. The symbiotic system of the KH-1 strain and the KH-2 strain exhibited an ability to decompose oil and fat greater than the ability to decompose oil and fat calculated from a value of an ability to decompose oil and fat in single culture of each of the KH-1 strain and the KH-2 strain at various mixing ratios. In this manner, the symbiotic system of the KH-1 strain and the KH-2 strain has a high ability to decompose oil and fat in various temperature ranges.

Example 18: Analysis of the Ability of the Symbiotic System to Decompose Fatty Acid The ability of a combination of a KH-1 strain and a KH-2 strain to decompose fatty acid was tested at various mixing ratios.

(Analysis at 28° C.)

The ability of a combination of a KH-1 strain and a KH-2 strain to decompose oil and fat was tested at 28° C.

A KH-1 strain and a KH-2 strain were added to an inorganic salt medium (composition described above, a pH of 7) comprising oleic acid at a final concentration of 1% (v/v) at a ratio of KH-1 strain:KH-2 strain=10:0, 9:1, 5:5, 1:9, and 0:10 (based on the cell count), respectively, so that the total cell concentration would be $5 \times 10^5$ cells/mL, and cultured at 28° C. The total fatty acids in the culture supernatant obtained at 18 hours after starting the culture were analyzed by gas chromatography in the same manner as described above.

(Result)

FIG. 18 shows the result of gas chromatography analysis. The symbiotic system of the KH-1 strain and the KH-2 strain exhibited an ability to decompose fatty acid greater than that in single culture of each of the KH-1 strain and the KH-2 strain at various mixing ratios. In this manner, the symbiotic system of the KH-1 strain and the KH-2 strain was found to be a very preferred combination having a high ability to decompose fatty acid.

Example 19: Gene Expression in the Symbiotic System

A change in gene expression in each of the strains was studied in a symbiotic system of a KH-1 strain and a KH-2 strain.

(Analysis of the KH-1 Strain)

Gene expression in the KH-1 strain in the symbiotic system was analyzed first.

The procedures were as follows. A KH-1 strain and a KH-2 strain were cultured in an LB medium overnight and then washed twice with PBS buffer to remove the medium component. A KH-1 strain was inoculated alone with a measurement value of $OD_6c$ of 0.02 into 3 L of inorganic salt medium (composition described above) comprising canola oil (Nissin canola oil, Nissin Oilio, Tokyo, Japan) at a final concentration of 1% (v/v), or each microorganism of KH-1 strain and KH-2 strain was inoculated into the medium at a bacterial optical density so that the measurement value of $OD_{660}$ would be 0.018:0.02 for KH-1 strain:KH-2 strain, followed by culturing in a fermenter at 15° C. After culture for 71 hours, total RNA was extracted using Cica geneus RNA Prep Kit (For Tissue) (Kanto Chemical).

cDNA was synthesized by removing genomic DNA using Prime Script™ RT reagent Kit with gDNA Eraser Perfect Real Time (Takara Bio), with the total RNA as a template. The undiluted cDNA solution was then diluted 3-fold using a dilution solution that was part of a kit. Real-time quantitative RT-PCR was performed with Applied Biosystems® StepOnePlus™ (Applied Biosystems) using a synthetic primer specific to a gene encoding the first lipase and the second lipase of the KH-1 strain. In this case, the first lipase and the second lipase of the KH-1 strain refer to lipase whose representative amino acid sequence and base sequence are set forth in SEQ ID NOs: 1 to 4. A PCR reaction was performed in a 20 µl solution comprising PowerUp™ SYBR® Green Master Mix (Thermo Fisher Scientific) (10 µl), each primer (final concentration of 0.5 µM), and cDNA (1 µl). The PCR reaction was performed with a program that performs 1 cycle of denaturation for 2 minutes at 95° C. and then repeats a cycle of 3 seconds at 95° C. and 30 seconds at 60° C. 40 times, by using a fast cycling mode.

The expression levels were normalized with the expression level of an RNA polymerase, sigma 70 (rpoD). After confirming that the melting curve is a single peak, data was analyzed by comparative Ct method (ΔΔCt method).

(Result)

The left panel of FIG. 19 shows the result. In the symbiotic system of the KH-1 strain and the KH-2 strain, expression of the first lipase and the second lipase of the KH-1 strain was unexpectedly improved compared to the KH-1 strain alone. This demonstrates that the presence of the KH-2 strain induces enhancement of lipase expression in the KH-1 strain. Although not wishing to be bound by any theory, it is expected that an oil and fat decomposition product resulting from the KH-2 strain functions as an inducer to activate lipase expression in the KH-1 strain. Thus, it is expected that a microorganism having similar ability to decompose oil and fat can be suitably used as the *Yarrowia* yeast, and a strain having similar sensitivity can be suitably used as the *Burkholderia bacterium*.

(Analysis of the KH-2 Strain)

Gene expression in the KH-2 strain in the symbiotic system was analyzed in the same manner.

A KH-1 strain and a KH-2 strain were cultured in an LB medium overnight and then washed twice with PBS buffer to remove the medium component in the same manner as described above. $5\times10^5$ cells/mL of a KH-2 strain was inoculated alone into 3 L of inorganic salt medium (composition described above) comprising canola oil (Nissin canola oil, Nissin Oilio, Tokyo, Japan) at a final concentration of 1% (v/v), or each microorganism of KH-1 strain and KH-2 strain was inoculated into the medium so as to be $2.5\times10^5$ cells/mL of a KH-1 strain+$2.5\times10^5$ cells/mL of a KH-2 strain, followed by culturing for 48 hours in a fermenter at 15° C.

In the same manner as for the KH-1 strain described above, total RNA was extracted, cDNA was synthesized, and real-time quantitative RT-PCR was performed using a synthetic primer specific to a gene encoding lipase, the first lipase and the second lipase of the KH-2 strain. Here, the first lipase and the second lipase of the KH-2 strain refer to lipase whose representative amino acid sequence and base sequence are set forth in SEQ ID NOs: 5 to 8. A PCR reaction was performed in the same manner as for the KH-1 strain described above.

The expression levels were normalized with the expression level of alpha-1,2-mannosyltransferase (alg9). After confirming that the melting curve is a single peak, data was analyzed by comparative Ct method (ΔΔCt method).

(Result)

The right panel of FIG. 19 shows the result. In the symbiotic system of the KH-1 strain and the KH-2 strain, expression of the first lipase and the second lipase of the KH-2 strain was unexpectedly improved compared to the KH-2 strain alone. This demonstrates that the presence of the KH-1 strain also induces enhancement of lipase expression in the KH-2 strain. It is expected that an oil and fat decomposition product resulting from the KH-1 strain functions as an inducer to activate lipase expression in the KH-2 strain. Thus, it is expected that a microorganism having similar ability to decompose oil and fat can be suitably used as the *Burkholderia bacterium*, and a strain having similar sensitivity can be suitably used as the *Yarrowia* yeast.

Example 20: Lipase Activity of Symbiotic System Culture Supernatant

Lipase activity of culture supernatant of a KH-1 strain and a KH-2 strain was measured using a model substrate.

A KH-1 strain and a KH-2 strain were cultured in an LB medium overnight and then washed twice with PBS buffer to remove the medium component. A KH-1 strain was inoculated alone with a measurement value of $OD_{660}$ of 0.02 into 3 L of inorganic salt medium (composition described above) comprising canola oil (Nissin canola oil, Nissin Oilio, Tokyo, Japan) at a final concentration of 1% (v/v), or each microorganism of the KH-1 strain and the KH-2 strain was inoculated into the medium at a bacterial optical density so that the measurement value of $OD_{660}$ would be 0.018:

0.02 for KH-1 strain:KH-2 strain, followed by culturing in a fermenter at 15° C. The supernatant was obtained after 48 hours and 71 hours from starting the culture. 4-nitrophenyl palmitate or 4-nitrophenyl butyrate was added to 3% (v/v) Triton® X-100 solution and heated at 70° C. to prepare a substrate solution at a final concentration of 5 mM. 60 µL of the substrate solution, 150 mM GTA buffer (pH of 7.0), and the culture supernatant were mixed and an absorbance at 410 nm (indicating free 4-nitrophenol) was monitored for 1 minute at room temperature.

FIG. 20 shows the result. The culture supernatant of the symbiotic system of the KH-1 strain and the KH-2 strain exhibited strong lipase activity compared to the culture supernatant from the KH-1 strain alone. In this manner, it is understood that the combination of microorganisms of the present disclosure can decompose various oils and fats by produced lipase.

Example 21: Identification of Other Strains

Acquisition of Other Strains

A sample was collected from a river near a food factory from which oil and fat-containing wastewater was discharged, and microorganisms were isolated therefrom. The inventors studied whether the isolated microorganisms could produce lipase and decompose oil and fat in a low temperature environment (15° C.). As a result, microorganisms that can decompose oil and fat at a low temperature were found. These microorganism strains were named KH-1AL1 strain, KH-1AL2 strain, and KH-1AL3 strain, respectively.

To further characterize the KH-1AL1 strain, the KH-1AL2 strain, and the KH-1AL3 strain, the genetic sequence of 16S rDNA was analyzed.

The KH-1AL1 strain was identified as *Burkholderia ambifaria* because the partial base sequence of 16S rDNA matched *Burkholderia ambifaria* with 100% homology.

The KH-1AL2 strain was classified to the same group as *B. seminalis, B. territorii*, and *B. cepacia* (homology in the partial base sequence of 16S rDNA was 99.7%, 99.7%, and 99.8%, respectively) on the phylogenetic tree, with the partial base sequence of 16S rDNA matching *Burkholderia contaminans* with 99.9% homology. As a result, the KH-1AL2 strain was identified as a bacterium belonging to the *Burkholderia cepacia* complex.

The KH-1AL3 strain was classified to the same group as *B. seminalis, B. territorii*, and *B. cepacia* (homology in the partial base sequence of 16S rDNA was 99.7%, 99.7%, and 99.8%, respectively) on the phylogenetic tree, with the partial base sequence of 16S rDNA matching *Burkholderia contaminans* with 99.9% homology. As a result, the KH-1AL3 strain was identified as a bacterium belonging to the *Burkholderia cepacia* complex.

*Burkholderia cepacia* complex is a classification of microorganisms of the genus *Burkholderia* that are genetically very close, including *ambifaria, anthina, arboris, cenocepacia, cepacia, contaminans, diffusa, dolosa, lata, latens, metallica, multivorans, pseudomultivorans, puraquae, pyrrocinia, seminalis, stabilis, stagnalis, territorii, ubonensis*, and *vietnamiensis* (Martina P et al., Int J Syst Evol Microbiol. 2018 January; 68(1):14-20.).

As a result of analysis, various bacteria belonging to the *Burkholderia cepacia* complex exhibited a high ability to decompose oil and fat and/or fatty acid, so that bacteria belonging to the *Burkholderia cepacia* complex are expected to be particularly useful.

Example 22: Symbiotic System Using Other Combinations

The alternative strains identified in Examples 8 and 21 were additionally used, wherein a KH-1 strain, a KH-1AL1 strain, or a KH-1AL3 strain alone was compared with mixed culture wherein 1/10 of the cell count of each of these strains was replaced with a KH-2 strain, a KH-2AL1 strain, or a KH-2AL3 strain to test the ability to decompose oil and fat in the same manner as Example 17.

A KH-1 strain, a KH-1AL1 strain, or a KH-1AL3 strain alone or a combination of these strains and a KH-2 strain, a KH-2AL1 strain, or a KH-2AL3 strain was added to an inorganic salt medium (composition described above, a pH of 7) comprising canola oil (Nissin canola oil, Nissin Oilio, Tokyo, Japan) at a final concentration of 1% (v/v) so that the total cell concentration would be $2 \times 10^6$ cells/mL and cultured at 15° C. Culture supernatant obtained when cultured for 48 hours was analyzed by using an oil entity content measuring reagent kit (Kyoritsu Chemical Check Lab, Tokyo, Japan) (measuring reagent kit using a method of measuring poly(N-isopropylacrylamide) extracted substances) in the same manner as described above.

(Result)

The following table shows the result under each condition.

TABLE 2

| Residual oil entity content percentage (%) in comparison to that as of start of culture | | | | |
|---|---|---|---|---|
| | Mixing ratio* | KH-1 | KH-1AL1 | KH-1AL3 |
| — | 1:0 | 50 | 37 | 59 |
| KH-2 | 9:1 | 20 | 19 | 32 |
| KH-2AL1 | 9:1 | 16 | 21 | nd |
| KH-2AL3 | 9:1 | 24 | nd | nd |

*KH-1 or its alternative strain:KH-2 or its alternative strain (cell count ratio)
nd = not determined All of the *Burkholderia* bacteria of the present disclosure were observed to have a further improved ability to decompose oil and fat when combined with the *Yarrowia* yeast of the present disclosure. In this manner, a combination of a *Burkholderia* bacterium and a *Yarrowia* yeast of the present disclosure achieves an unexpectedly excellent ability to decompose oil and fat.

Example 23: Decomposition of Trans Fatty Acid-Containing Oil and Fat by Lipase

Activity to decompose trielaidin by the first and second lipases of the KH-1 strain and activity to decompose trielaidin by the first and second lipases of the KH-2 strain of Example 19 are studied.

The first lipase of the KH-1 strain, the second lipase of the KH-1 strain, the first lipase of the KH-2 strain, and the second lipase of the KH-2 strain are purified from a culture of the KH-1 strain and/or the KH-2 strain or a culture of an *E. coli* strain transfected to express a lipase of interest by hydrophobic column chromatography or the like. These purified lipases and trielaidin are mixed to study decomposition of trielaidin.

Both the first and second lipases of the KH-1 strain and the first and second lipases of the KH-2 strain were demonstrated to decompose trielaidin, which is a trans triglyceride. In the symbiotic system of the present disclosure, expression of the first and second lipases in the KH-1 strain and the first and second lipases in the KH-2 strain can be improved (Example 19). Thus, it is expected that various oils and fats including trans fatty acid-containing oil and fat are efficiently decomposed.

Example 24: Confirmation Test

Decomposition of oil and fat may be confirmed by oil entity content analysis, thin-layer chromatography analysis, or the like as in Example 3 besides gas chromatography analysis described above.

Culture supernatant is obtained in the same manner as Example 20. The culture supernatant is mixed with canola oil and the mixture is incubated. The culture supernatant of a symbiotic system of a KH-1 strain and a KH-2 strain exhibits strong lipase activity compared to the culture supernatant from the KH-1 strain alone.

Besides the mixing ratios of a *Burkholderia bacterium* and a *Yarrowia* yeast tested in Example 17, microorganisms are added so that the cell count ratio would be, for example, 19:1, 1:19, or the like and cultured at 15° C. or 28° C. In the same manner as described above, superior oil and fat decomposition to that of either of the microorganisms alone can be confirmed.

A growth curve for each of the microorganisms, a *Burkholderia bacterium* and a *Yarrowia* yeast, is prepared and the amount of microorganisms obtained in a predetermined time (e.g., 24 hours) is calculated from the result. The amounts of each microorganism that can be prepared within a predetermined time are combined to measure the ability to decompose oil and fat. A combination that achieves an ability to decompose oil and fat greater than the ability to decompose oil and fat calculated from a value of an ability to decompose oil and fat in single culture of each of the *Burkholderia bacterium* and the *Yarrowia* yeast achieves an excellent ability to decompose oil and fat.

A *Burkholderia bacterium* and a *Yarrowia* yeast are simultaneously grown by mixed culture. Mixed culture is sampled every fixed time and the microorganism concentration of each microorganism is calculated, thereby calculating a cell concentration ratio of microorganisms in mixed culture. The ability to decompose oil and fat at the mixing ratio is studied by using the mixed culture obtained after culture for fixed time (e.g., 24 hours). It is confirmed that the ability to decompose oil and fat is greater than the ability to decompose oil and fat calculated from a value of an ability to decompose oil and fat in single culture of each of the *Burkholderia bacterium* and the *Yarrowia* yeast.

Example 25: Acquisition of an Additional Alternative Strain of a *Burkholderia bacterium*/a *Yarrowia* Yeast which is Useful in a Symbiotic System An alternative strain of a microorganism that can be used in the combination of microorganisms of the present disclosure can be obtained in the following manner.

A dilution series is prepared by adding PBS to various isolation sources such as a microorganism storage library, soil, river, lake, or activated sludge, and the dilution series is spread over an inorganic salt agar medium comprising canola oil as the sole carbon source. The agar medium after inoculation is subjected to stationary culture at 15° C. or 28° C., thereby obtaining colonies. Among these colonies, colonies around which a clear zone is formed are mainly picked out, inoculated into a canola oil-supplemented inorganic salt medium with a KH-1 strain, a KH-1AL1 strain, a KH-1AL3 strain, a KH-2 strain, a KH-2AL1 strain, or a KH-2AL3 strain, and cultured at 15° C. or 28° C. After the culture, the degree of decomposition of oil and fat in the culture supernatant is analyzed by thin-layer chromatography, thereby obtaining a microorganism having a superior ability to decompose oil and fat compared to the KH-1 strain, KH-1AL1 strain, KH-1AL3 strain, KH-2 strain, KH-2AL1 strain, or KH-2AL3 strain alone.

Example 26: Use within an Apparatus

A *Burkholderia bacterium* and a *Yarrowia* yeast are cultured in the same manner as the Examples described above to prepare the undiluted culture solution. This is diluted to prepare a microbial formulation. This is refrigerated in a microorganism storage tank of an automatic amplifying and adding apparatus as seed microorganisms. The seed microorganisms are automatically inoculated at a suitable amount into an inorganic salt medium in a culture amplification tank of the apparatus, and cultured until the number of microorganism becomes the same cell concentration as the microbial formulation. This is administered to oil entity treatment water at an amount suitable relative to the amount of wastewater from an oil entity decomposition and treatment tank so that the microorganism concentration of decomposing microorganism in the oil entity treating water is adjusted to a concentration of interest, and wastewater from a food factory discharging wastewater containing a large amount of oil and fat is decomposed and treated. As a result, a significant reduction in the normal hexane value is observed compared to a control without addition of a microorganism.

Example 27: Additional Examples of Applications

A suitable amount of *Burkholderia bacterium* and *Yarrowia* yeast is inoculated into an extinguishing type of food waste disposer for treatment at a suitable temperature. The normal hexane value in wastewater discharged from the food waste disposer is measured. A significant reduction in the value is observed compared to a control with no addition of microorganisms.

Oily sludge collected by floatation is added to a culture tank, and a suitable amount of inorganic salt medium is added. A suitable amount of *Burkholderia bacterium* and *Yarrowia* yeast is inoculated thereto and incubated at a suitable temperature while agitating and aerating. Subsequently, the amount of decomposition/decrease of oily sludge is studied by measuring the amount of oil entity content according to the normal hexane value in the treated solution or by measuring the weight of the residue comprising oil entity as the main component which remains after moisture is evaporated. As a result, significant decomposition of oily sludge is observed compared to a control with no addition of microorganisms.

Carriers such as charcoal, various plastics, and ceramic fragments are added to a grease trap, and a suitable amount of *Burkholderia bacterium* and *Yarrowia* yeast is automatically added every day after the end of business day at a restaurant. Water is collected before the start of business over time to analyze the normal hexane value. A significant reduction in the normal hexane value is observed compared to a control without addition of microorganisms, and an effect is observed on the appearance of the grease trap itself such as reduced adhesion or floating of oil entity.

(Note)

As described above, the present disclosure is exemplified by the use of its preferred embodiments. However, it is understood that the scope of the present invention should be interpreted solely based on the Claims. It is also understood that any patent, any patent application, and any references cited herein should be incorporated herein by reference in the same manner as the contents are specifically described herein.

The present application claims priority to Japanese Patent Application No. 2019-163252 filed to the Japan Patent Office on Sep. 6, 2019 and Japanese Patent Application No. 2020-001744 filed to the Japan Patent Office on Jan. 8, 2020. The entire content thereof is incorporated herein by reference.

INDUSTRIAL APPLICABILITY

The present disclosure provides a microorganism having an ability to decompose ester (e.g., oil and fat) and/or fatty acid and a composition comprising the same. Burden on the environment due to wastewater from food factories containing a large amount of ester (e.g., oil and fat) and/or fatty acid and the like can be reduced by using such a microorganism or composition. The present disclosure also provides a combination of microorganisms having an ability to decompose oil and fat and/or fatty acid. Burden on the environment due to wastewater from food factories containing a large amount of oil and fat and/or fatty acid and the like can be reduced by using such a combination of microorganisms.

REFERENCE TO DEPOSITED BIOLOGICAL MATERIAL

KH-1 (NITE BP-02731)
KH-1AL1 (NITE BP-02977)
KH-1AL2 (NITE BP-02978)
KH-1AL3 (NITE BP-02979)
KH-2 (NITE BP-02732)
KH-2AL1 (NITE BP-03091)
KH-2AL3 (NITE BP-03092)

SEQUENCE LISTING FREE TEXT

SEQ ID NO: 1 mature base sequence of the first lipase of the KH-1 strain
SEQ ID NO: 2 mature amino acid sequence of the first lipase of the KH-1 strain
SEQ ID NO: 3 mature base sequence of the second lipase of the KH-1 strain
SEQ ID NO: 4 mature amino acid sequence of the second lipase of the KH-1 strain
SEQ ID NO: 5 mature sequence of a representative base sequence of the first lipase of the KH-2 strain
SEQ ID NO: 6 mature sequence of a representative amino acid sequence of the first lipase of the KH-2 strain
SEQ ID NO: 7 mature sequence of a representative base sequence of the second lipase of the KH-2 strain
SEQ ID NO: 8 mature sequence of a representative amino acid sequence of the second lipase of the KH-2 strain

The invention claimed is:

1. A method of treating oil and fat or fatty acid, comprising contacting oil and fat or fatty acid with a combination of a *Yarrowia* yeast which produces lipase and a *Burkholderia* bacterium which secretes lipase.

2. The method of claim 1, wherein the *Yarrowia* yeast is *Yarrowia lipolytica*.

3. The method of claim 1, wherein the *Burkholderia* bacterium is a bacterium in the genus *Burkholderia*.

4. The method of claim 1, wherein the *Burkholderia* bacterium is one of *Burkholderia arboris*, *Burkholderia ambifaria*, and *Burkholderia cepacia* complex.

5. The method of claim 1, wherein the combination of a *Burkholderia* bacterium and a *Yarrowia* yeast has a higher ability to decompose oil and fat or fatty acid than an ability to decompose oil and fat or fatty acid calculated from a value of an ability to decompose oil and fat or fatty acid of single culture of each of the *Burkholderia* bacterium and the *Yarrowia* yeast.

6. The method of claim 1, wherein a cell count of the *Burkholderia* bacterium: a cell count of the *Yarrowia* yeast is 1:20 to 20:1.

7. The method of claim 1, wherein at least one of the *Burkholderia* bacterium and the *Yarrowia* yeast has an ability to decompose fatty acid at 15° C.

8. The method of claim 1, wherein the combination is comprised in an oil entity decomposing agent.

9. The method of claim 1, further comprising contacting the oil and fat or fatty acid with an oil entity treating component.

10. A method of decomposing and removing oil entity, comprising causing a combination to act on a subject of treatment, wherein the combination is a combination of a *Yarrowia* yeast which produces lipase and a *Burkholderia* bacterium which produces lipase, wherein the *Yarrowia* yeast is capable of decomposing oil and fat.

11. The method of claim 1, wherein a cell count of the *Burkholderia* bacterium: a cell count of the *Yarrowia* yeast is 1:9 to 9:1.

* * * * *